(12) United States Patent
Miyajima

(10) Patent No.: US 7,626,112 B2  
(45) Date of Patent: Dec. 1, 2009

(54) MUSIC EDITING APPARATUS AND METHOD AND PROGRAM

(75) Inventor: Yasushi Miyajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 159 days.

(21) Appl. No.: 11/958,702

(22) Filed: Dec. 18, 2007

(65) Prior Publication Data

US 2009/0019995 A1 Jan. 22, 2009

(30) Foreign Application Priority Data

Dec. 28, 2006 (JP) ............... P2006-354334

(51) Int. Cl.  
*A63H 5/00* (2006.01)  
*G10H 1/26* (2006.01)  
*G10H 5/00* (2006.01)

(52) U.S. Cl. ............ 84/609; 84/610; 84/612; 84/649; 84/650; 84/652

(58) Field of Classification Search .......... None  
See application file for complete search history.

(56) References Cited

U.S. PATENT DOCUMENTS

| | | | | |
|---|---|---|---|---|
| 6,888,999 | B2* | 5/2005 | Herberger et al. | 386/65 |
| 7,030,311 | B2* | 4/2006 | Brinkman et al. | 84/625 |
| 7,081,580 | B2* | 7/2006 | Brinkman et al. | 84/609 |
| 7,319,185 | B1* | 1/2008 | Wieder | 84/609 |
| 2002/0166440 | A1* | 11/2002 | Herberger et al. | 84/625 |
| 2009/0044689 | A1* | 2/2009 | Komori et al. | 84/625 |
| 2009/0133568 | A1* | 5/2009 | Miyajima et al. | 84/625 |

FOREIGN PATENT DOCUMENTS

JP 2006-84748 3/2006

* cited by examiner

*Primary Examiner*—Marlon T. Fletcher  
(74) *Attorney, Agent, or Firm*—Finnegan, Henderson, Farabow, Garrett & Dunner, L.L.P.

(57) ABSTRACT

There is provided a music editing apparatus for remix reproducing a plurality of sound materials, each formed from part or the entirety of a music piece, in combination, including a reproduction pattern control section, a reproduction speed control section; and a pitch control section.

11 Claims, 39 Drawing Sheets

FIG.10

| BAR/BEAT NUMBER | VALUE INDICATIVE OF mth BEAT OF nth BAR IS SET |
|---|---|
| ATTRIBUTE | TYPES OF ATTRIBUTE SUCH AS BEAT INFORMATION, MELODY INFORMATION AND CHORD INFORMATION AND DETAIL DATA RELATING TO ATTRIBUTES OF THE TYPES ARE SET |
| SAMPLE POSITION | SAMPLE POSITION IN MUSIC DATA IS SET |

FIG.11

| BAR/BEAT | ATTRIBUTE | SAMPLE POSITION |
|---|---|---|
| 11 | 01800001 | 23190 |
| 12 | 01000001 | 65280 |
| 13 | 01000001 | 83200 |
| 14 | 01000001 | 100416 |
| 21 | 01800001 | 118400 |
| 22 | 01000001 | 136192 |

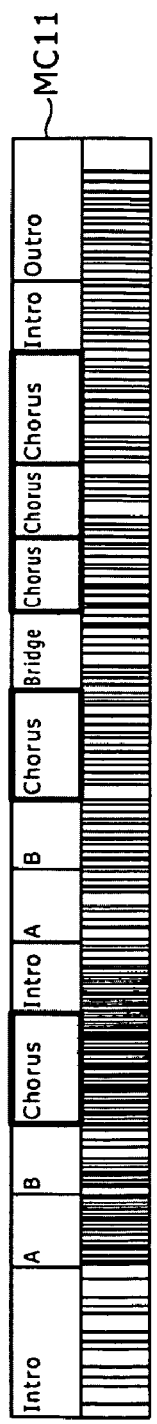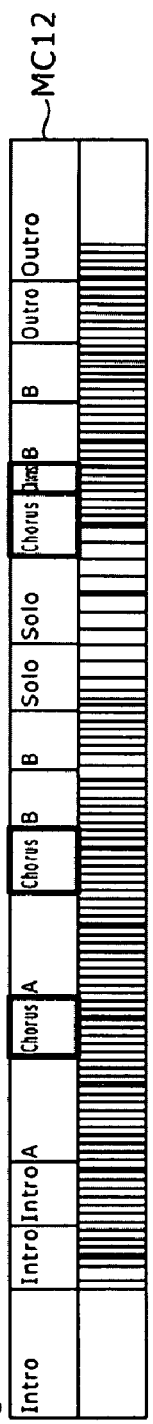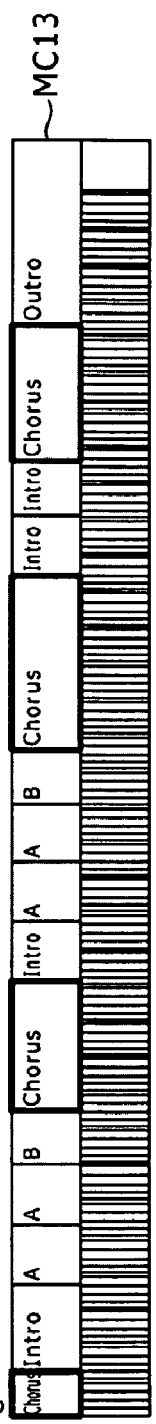
FIG. 22

FIG. 23
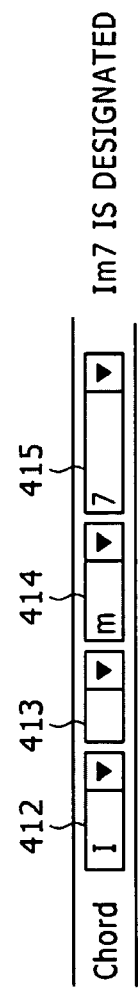
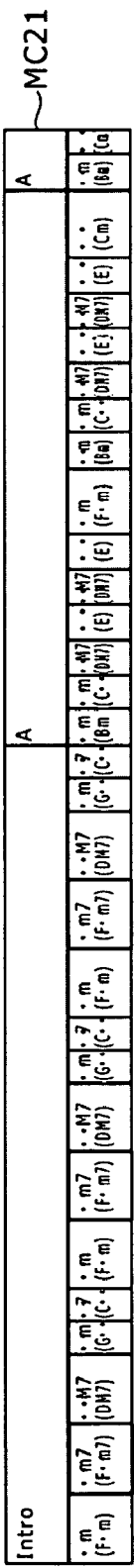
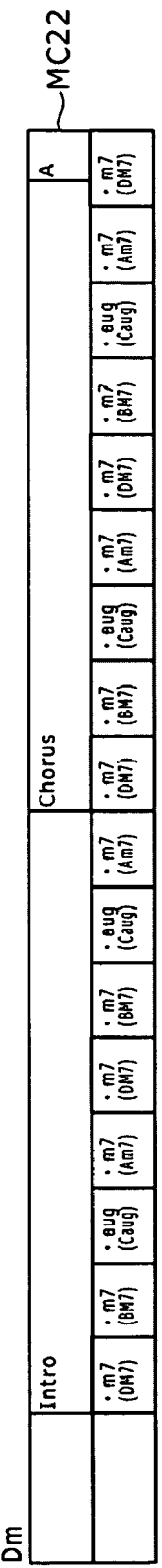
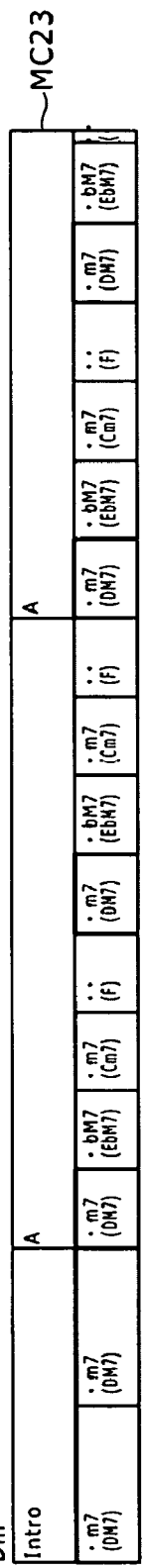

FIG.30

|     | 1  | 2  | 3  | 4  | 5  | 6 | 7  | 8  | 9  | 10 | 11 | 12 |
|-----|----|----|----|----|----|---|----|----|----|----|----|----|
| 1   | 10 |    |    |    |    |   |    |    |    |    |    |    |
| 2   |    | 10 |    |    |    |   |    |    |    |    |    |    |
| 3   |    |    | 10 |    |    |   |    |    |    |    |    |    |
| 4   |    |    |    | 10 |    |   |    |    |    |    |    |    |
| 5   | 5  |    |    |    | 5  | 5 |    |    |    |    |    |    |
| 6   |    | 5  | 5  |    |    | 5 | 5  |    |    |    |    |    |
| 7   |    |    |    | 10 | 10 |   |    |    |    |    |    |    |
| 8   | 5  |    |    |    |    |   | 10 |    |    |    |    |    |
| 9   |    |    |    |    |    |   |    | 10 |    |    |    |    |
| 10  |    |    |    |    |    |   |    |    | 10 | 10 |    |    |
| 11  | 5  | 5  |    |    | 5  | 5 |    | 5  |    |    | 10 | 5  |
| 12  |    |    |    |    |    |   |    |    |    | 10 |    | 10 |

• BLANK PLACE INDICATES 0

FIG. 31

|    | 1  | 2  | 3  | 4  | 5  | 6  | 7  | 8  | 9  | 10 | 11 | 12 |
|----|----|----|----|----|----|----|----|----|----|----|----|----|
| 1  | 10 |    |    |    |    |    |    |    |    |    |    |    |
| 2  | 10 | 10 |    |    |    |    |    |    |    |    |    |    |
| 3  |    |    | 10 |    |    |    |    |    |    |    |    |    |
| 4  | 5  |    |    | 10 |    |    |    |    |    |    |    |    |
| 5  | 5  | 5  |    |    | 10 |    |    |    |    |    |    |    |
| 6  |    | 5  | 5  |    |    | 10 |    |    |    |    |    |    |
| 7  |    |    |    | 5  |    |    | 10 |    |    |    |    |    |
| 8  |    |    |    |    |    |    |    | 10 |    |    |    |    |
| 9  |    |    |    |    | 5  |    |    |    | 10 |    |    |    |
| 10 | 5  | 5  | 5  | 5  |    | 5  | 5  |    |    | 10 |    |    |
| 11 |    |    |    |    |    |    |    |    |    |    | 10 |    |
| 12 |    |    |    |    |    |    |    |    |    |    |    | 10 |

· BLANK PLACE INDICATES 0

FIG. 32

|     | C  | C•  | D  | D•• | E  | F  | F• | G  | G• | A  | A• | B  |
| --- | -- | --- | -- | --- | -- | -- | -- | -- | -- | -- | -- | -- |
|     | 1  | 2   | 3  | 4   | 5  | 6  | 7  | 8  | 9  | 10 | 11 | 12 |
| C 1 | 10 |     |    |     |    |    |    |    |    |    |    |    |
| C 2 |    | 10  |    |     |    |    |    |    |    |    |    |    |
| D 3 |    |     | 10 |     |    |    |    |    |    |    |    |    |
| D 4 |    |     |    | 10  |    |    |    |    |    |    |    |    |
| E 5 |    |     |    |     | 10 |    |    |    |    |    |    |    |
| F 6 |    |     |    |     |    | 10 |    |    |    |    |    |    |
| F 7 |    |     |    |     |    |    | 10 |    |    |    |    |    |
| G 8 |    |     |    |     |    |    |    | 10 |    |    |    |    |
| G 9 |    |     |    |     |    |    |    |    | 10 |    |    |    |
| A 10|    |     |    |     |    |    |    |    |    | 10 |    |    |
| A 11|    |     |    |     |    |    |    |    |    |    | 10 |    |
| B 12|    |     |    |     |    |    |    |    |    |    |    | 10 |

• •BLANK PLACE INDICATES 0

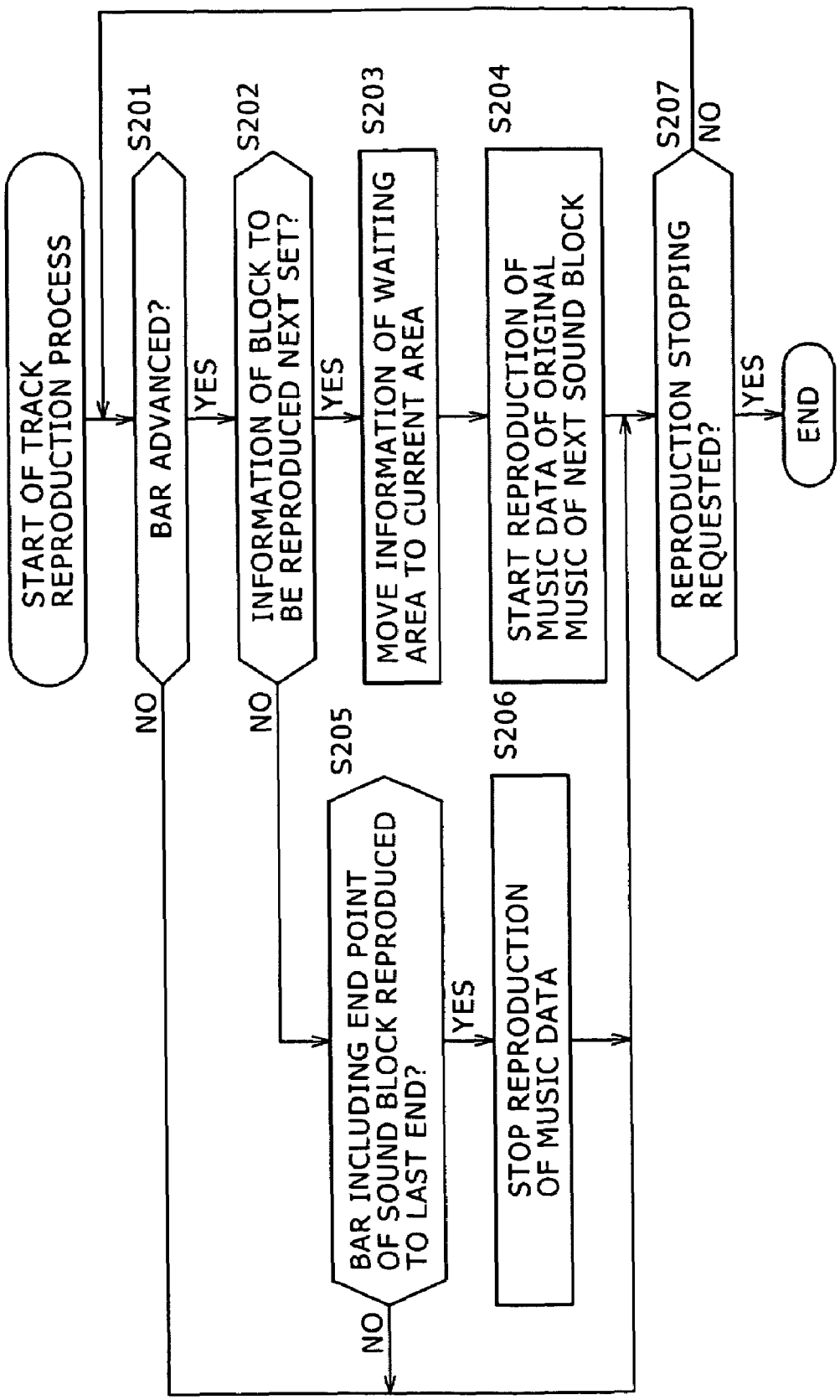

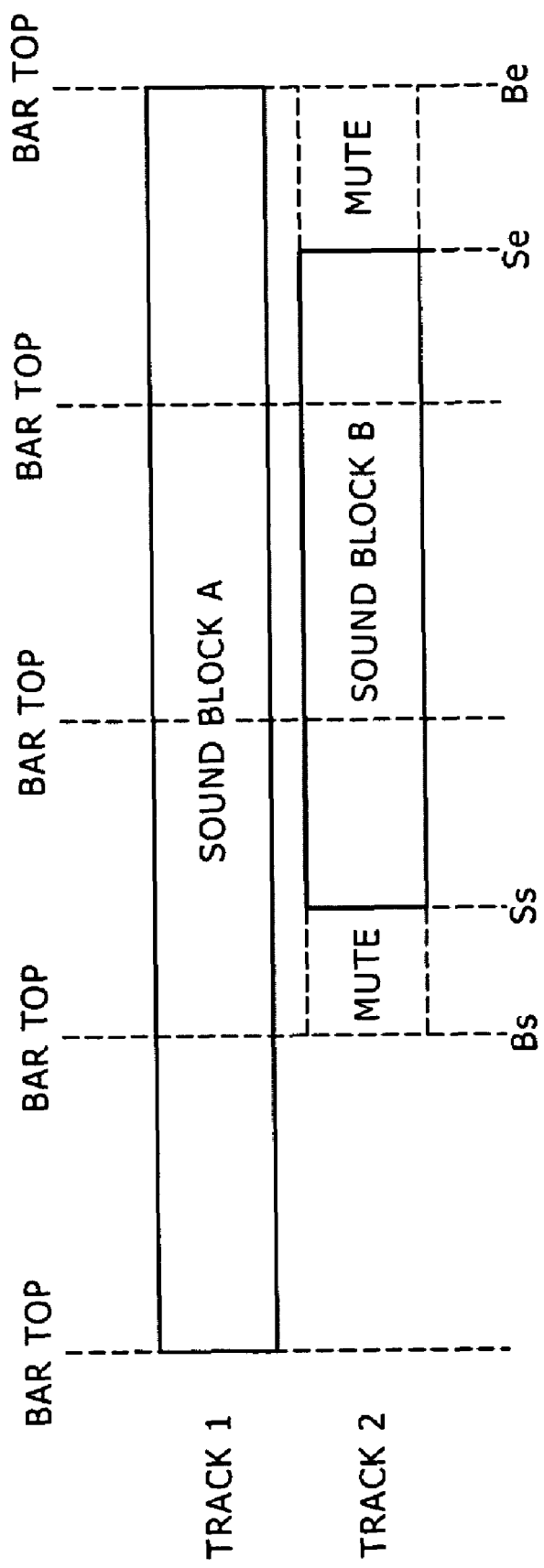

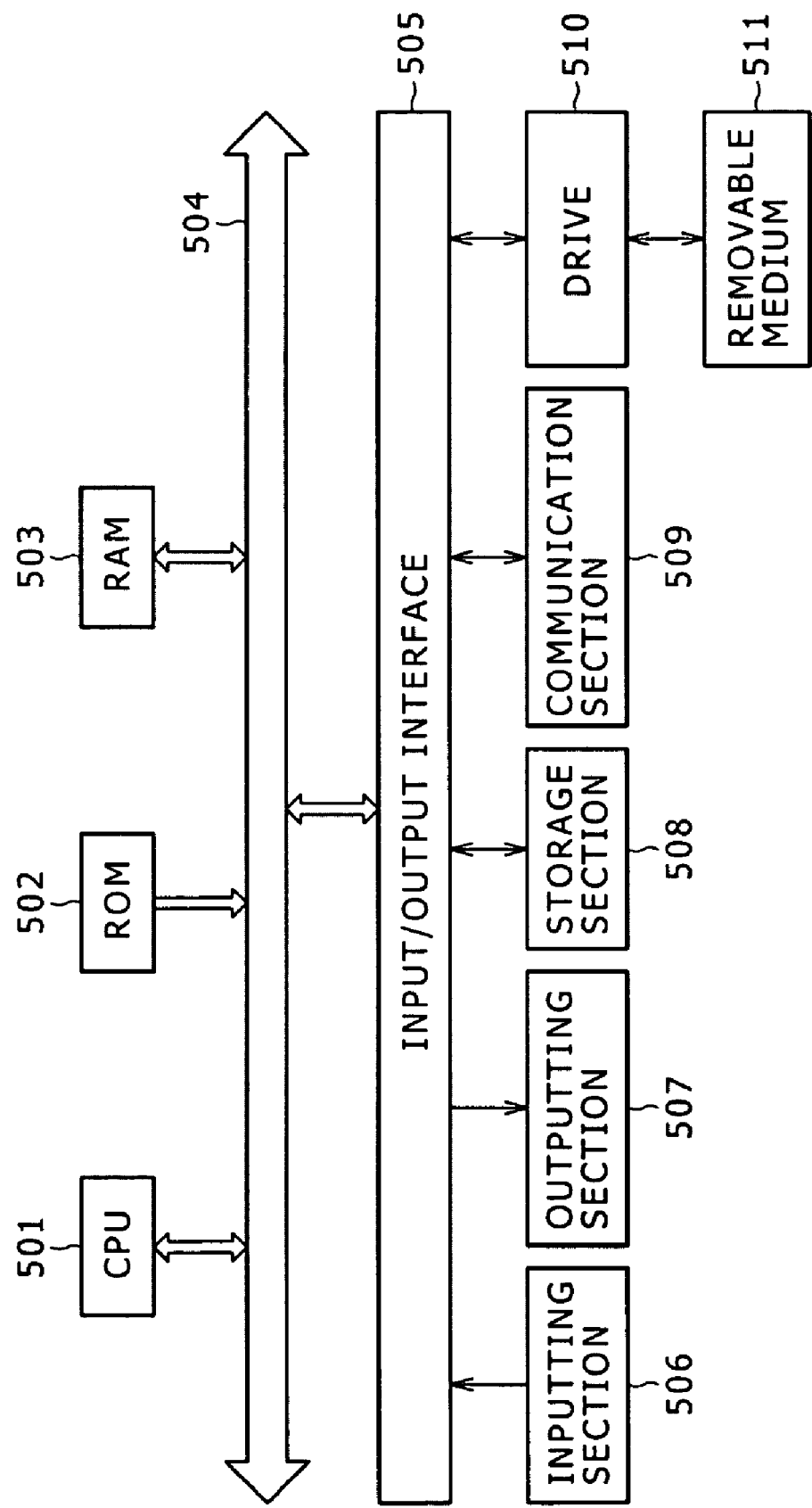

MUSIC EDITING APPARATUS AND METHOD AND PROGRAM

CROSS REFERENCES TO RELATED APPLICATIONS

The present invention contains subject matter related to Japanese Patent Application JP 2006-354334 filed in the Japan Patent Office on Dec. 28, 2006, the entire contents of which being incorporated herein by reference.

BACKGROUND OF THE INVENTION

1. Field of the Invention

This invention relates to a music editing apparatus and method and a program, and more particularly to a music editing apparatus and method and a program wherein a plurality of sound materials are remix reproduced in combination.

2. Description of the Related Art

In recent years, an audio apparatus of the memory type wherein music data are stored into a memory such as a flash memory or a hard disk and reproduced has spread widely, and it has become part of a daily life for a user to carry a large amount of music data. The audio apparatus of the memory type allows the user to reproduce a large number of music pieces continuously and successively without exchanging the recording medium. Therefore, the user can not only enjoy music pieces in a unit of an album in an existing manner but also enjoy music pieces, which the user wants to enjoy, readily in an arbitrary order in such a manner that the user enjoys music pieces stored in the memory in a shuffled order across albums or enjoys only favorite music pieces registered in a playlist.

However, with the existing memory type audio apparatus, the user can only reproduce individual music pieces as they are in a unit of a music piece but cannot enjoy given music contents as they are.

Meanwhile, those people who enjoy remix music are increasing in recent years. Such remix music is produced by a disk jockey (DJ) or the like connecting a sound material formed from part or the entirety of a music piece to another sound material so that the sound materials may be reproduced and enjoyed as a single continuous music piece. Recently, also a label company for only remix music has appeared together with increase of the demand for remix music. Further, in recent years, a method called mash-up wherein a plurality of sound materials are blended to re-construct a generally different music piece has assumed greater prominence as one of remix techniques.

Thus, a technique for allowing a general user to perform remix of music pieces using a personal computer or the like has been developed recently. A reproduction apparatus of the type described is disclosed, for example, in Japanese Patent Laid-Open No. 2006-84748.

SUMMARY OF THE INVENTION

FIG. 1 of the accompanying drawings illustrates an example of a procedure where a remix work is performed using a personal computer. Referring to FIG. 1, beats are extracted from digital music data 11 sampled with a predetermined sampling frequency, and desired ranges of the music data 11 are cut out as sound materials and combined. Then, while an operator actually confirms the sound with its ears, it performs adjustment of the reproduction speed (time stretch: temporal expansion or contraction) of the individual sound materials in order to adjust the tempos of the sound materials to each other. Further, adjustment of the pitch (pitch shift) of sounds of the sound materials is performed in order to adjust the keys of the sound materials to each other, and then the sound materials are reproduced.

In this manner, the remix work requires deep musical knowledge and requires very much time and labor. Further, since the difficulty in work is high, a resulting music piece is frequently low in completeness in that it provides an unnatural and unfamiliar feeling to the listener.

Therefore, it is desirable to provide a music editing apparatus and method and a program by which a plurality of sound materials can be combined readily to produce a music piece of high completeness.

According to an embodiment of the present invention, there is provided a music editing apparatus for remix reproducing a plurality of sound materials, each formed from part or the entirety of a music piece, in combination, including a reproduction pattern control section configured to control, based on remix pattern data including the combination of the sound materials and information relating to the sound materials, the position and the timing at which music data of the original music pieces of the sound materials are reproduced such that the sound materials are reproduced in the combination indicated by the remix pattern data, a reproduction speed control section configured to control, based on the value of original tempos which are tempos in the original music pieces of the sound materials indicated by the remix pattern data, the reproduction speed of the sound materials so that the tempos of the sound materials are adjusted to a predetermined master tempo, and a pitch control section configured to control, based on the difference between original keys which are keys in the original music pieces of the sound materials indicated by the remix pattern data and a predetermined master key and the control amount for the reproduction speed, the pitch of sound of the sound materials so that the keys of the sound materials are adjusted to the master key.

The music editing apparatus may be configured such that metadata of each of the music pieces includes beat information indicative of the position of bars of the music piece in the corresponding music data while the remix pattern data includes information indicative of the position of bars and the beat at which the sound materials are disposed on a time axis upon the remix reproduction, and the reproduction pattern control section controls the position and the timing at which the music data are to be reproduced based on the beat information and the remix pattern data so that the top of a bar including a start point of each of the sound materials on the time axis and the top of a bar including the start point of the sound material in the music data are synchronized with each other.

In this instance, the music editing apparatus may be configured such that the beat information includes information representative of the position of the beat of the music pieces in the music data, and the reproduction pattern control section mutes, based on the beat information and the remix pattern data, the sound volume of the reproduction sound of the music data from the top of the bar including the start point of the sound material on the time axis to the beat at the start point of the sound material.

The music editing apparatus may be configured such that metadata of each of the music pieces includes chord information indicative of chord progressions of the music pieces and the position of chords in the corresponding music data, the music editing apparatus further including a similarity calculation section configured to calculate a similarity between the chord progressions between two ones of the sound materials based on the chord information.

In this instance, the music editing apparatus may further include a search section configured to search, based on the similarly, for any one of the sound materials suitable for reproduction in an overlapping relationship with a designated one of the sound materials or for any one of the sound materials suitable for reproduction in a connected relationship to a designated one of the sound materials.

Or, each of the chords indicated by the chord information may be represented based on a relative position of the root of the chord with respect to the keynote of the scale of the sound material.

Or else, the metadata may further include beat information indicative of the position of the beat of the music pieces in the music data, and the similarity calculation section may compare the chords of two ones of the sound materials with each other in a unit of a beat based on a similarity matrix which defines the similarity between different chords to calculate the similarity. In this instance, the similarity matrix may be configured such that, where two chords coincide with each other or have a relationship of substitute chords to each other, the similarity between the chords is set higher than that where two chords do not coincide with each other nor have a relationship of substitute chords to each other.

Or otherwise, the music editing apparatus may be configured such that, where both of the two sound materials are of the major or of the minor, the similarity calculation section calculates the similarity based on the relative position of the root of the chords with respect to the keynote of the scale of the sound materials, but where one of the two sound materials is of the major and the other sound material is of the minor, the similarity calculation section calculates the similarity based on the pitch of actual sounds of the chords.

According to another embodiment of the present invention, there are provided a music editing method for remix reproducing a plurality of sound materials, each formed from part or the entirety of a music piece, in combination, and a program for causing a computer to execute a music editing process for remix reproducing a plurality of sound materials, each formed from part or the entirety of a music piece, in combination, including the steps of controlling, based on remix pattern data including the combination of the sound materials and information relating to the sound materials, the position and the timing at which music data of the original music pieces of the sound materials are reproduced such that the sound materials are reproduced in the combination indicated by the remix pattern data, controlling, based on the value of original tempos which are tempos in the original music pieces of the sound materials indicated by the remix pattern data, the reproduction speed of the sound materials so that the tempos of the sound materials are adjusted to a predetermined master tempo, and controlling, based on the difference between original keys which are keys in the original music pieces of the sound materials indicated by the remix pattern data and a predetermined master key and the control amount for the reproduction speed, the pitch of sound of the sound materials so that the keys of the sound materials are adjusted to the master key.

In the music editing apparatus and method and the program, based on remix pattern data including a combination of sound materials and information relating to the sound materials, the position and the timing at which music data of the original music pieces of the sound materials are reproduced are controlled such that the sound materials are reproduced in the combination indicated by the remix pattern data. Then, based on the value of original tempos which are tempos in the original music pieces of the sound materials indicated by the remix pattern data, the reproduction speed of the sound materials is controlled so that the tempos of the sound materials are adjusted to a predetermined master tempo. Further, based on the difference between original keys which are keys in the original music pieces of the sound materials indicated by the remix pattern data and a predetermined master key and the control amount for the reproduction speed, the pitch of sound of the sound materials is controlled so that the keys of the sound materials are adjusted to the master key.

With the music editing apparatus and method and the program, the tempos and the keys of the sound materials can be adjusted to each other. Further, a plurality of sound materials can be combined simply to produce a music piece of high completeness.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 10 is a view illustrating an example of a data configuration of metadata;

FIG. 11 is a view illustrating a particular example of metadata;

FIG. 22 is a schematic view illustrating emphasized display of a melody block;

FIG. 23 is a schematic view illustrating emphasized display of a chord;

FIG. 30 is a view illustrating an example of a similarity matrix for the major;

FIG. 31 is a view illustrating an example of a similarity matrix for the minor;

FIG. 32 is a view illustrating an example of a similarity matrix where the scale is different;

FIG. 41 is a flow chart illustrating a track reproduction process;

FIG. 42 is a diagrammatic view illustrating a period of time within which a sound block is to be reproduced; and FIG. 43 is a block diagram showing an example of a configuration of a personal computer.

DETAILED DESCRIPTION OF THE PREFERRED EMBODIMENT

Figure 1:
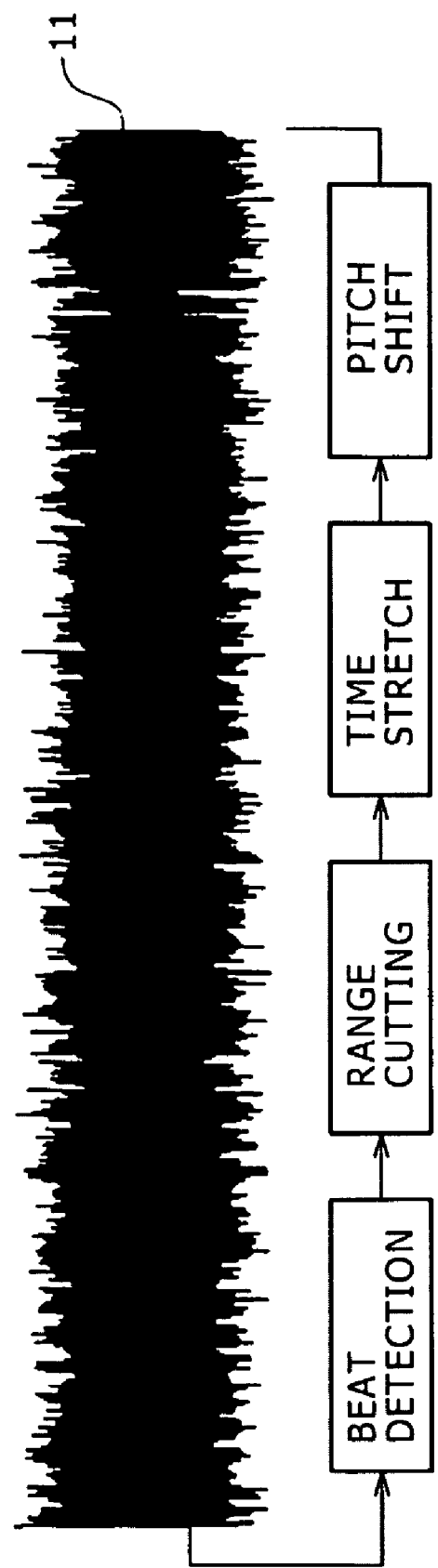
FIG. 1 is a diagrammatic view illustrating an example of a procedure of an existing remix work.

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

According to an embodiment of the present invention, there is provided a music editing apparatus (for example, a music editing system 101 of FIG. 2) for remix reproducing a plurality of sound materials, each formed from part or the entirety of a music piece, in combination, including a reproduction pattern control section (for example, a reproduction pattern control section 263 of FIG. 7) configured to control, based on remix pattern data including the combination of the sound materials and information relating to the sound materials, the position and the timing at which music data of the original music pieces of the sound materials are reproduced such that the sound materials are reproduced in the combination indicated by the remix pattern data, a reproduction speed control section (for example, a reproduction speed control section 261 of FIG. 7) configured to control, based on the value of original tempos which are tempos in the original music pieces of the sound materials indicated by the remix pattern data, the reproduction speed of the sound materials so that the tempos of the sound materials are adjusted to a predetermined master tempo, and a pitch control section (for example, a pitch control section 262 of FIG. 7) configured to control, based on the difference between original keys which are keys in the original music pieces of the sound materials indicated by the remix pattern data and a predetermined master key and the control amount for the reproduction speed, the pitch of sound of the sound materials so that the keys of the sound materials are adjusted to the master key.

The music editing apparatus (for example, a music editing system 101 of FIG. 2) may be configured such that metadata of each of the music pieces includes chord information indicative of chord progressions of the music pieces and the position of chords in the corresponding music data and may further include a similarity calculation section (for example, a similarity calculation section 241 of FIG. 7) configured to calculate a similarity between the chord progressions between two ones of the sound materials based on the chord information.

The music editing apparatus (for example, a music editing system 101 of FIG. 2) may further include a search section (for example, a score calculation section 242 of FIG. 7) configured to search, based on the similarly, for any one of the sound materials suitable for reproduction in an overlapping relationship with a designated one of the sound materials or for any one of the sound materials suitable for reproduction in a connected relationship to a designated one of the sound materials.

Figure 37:
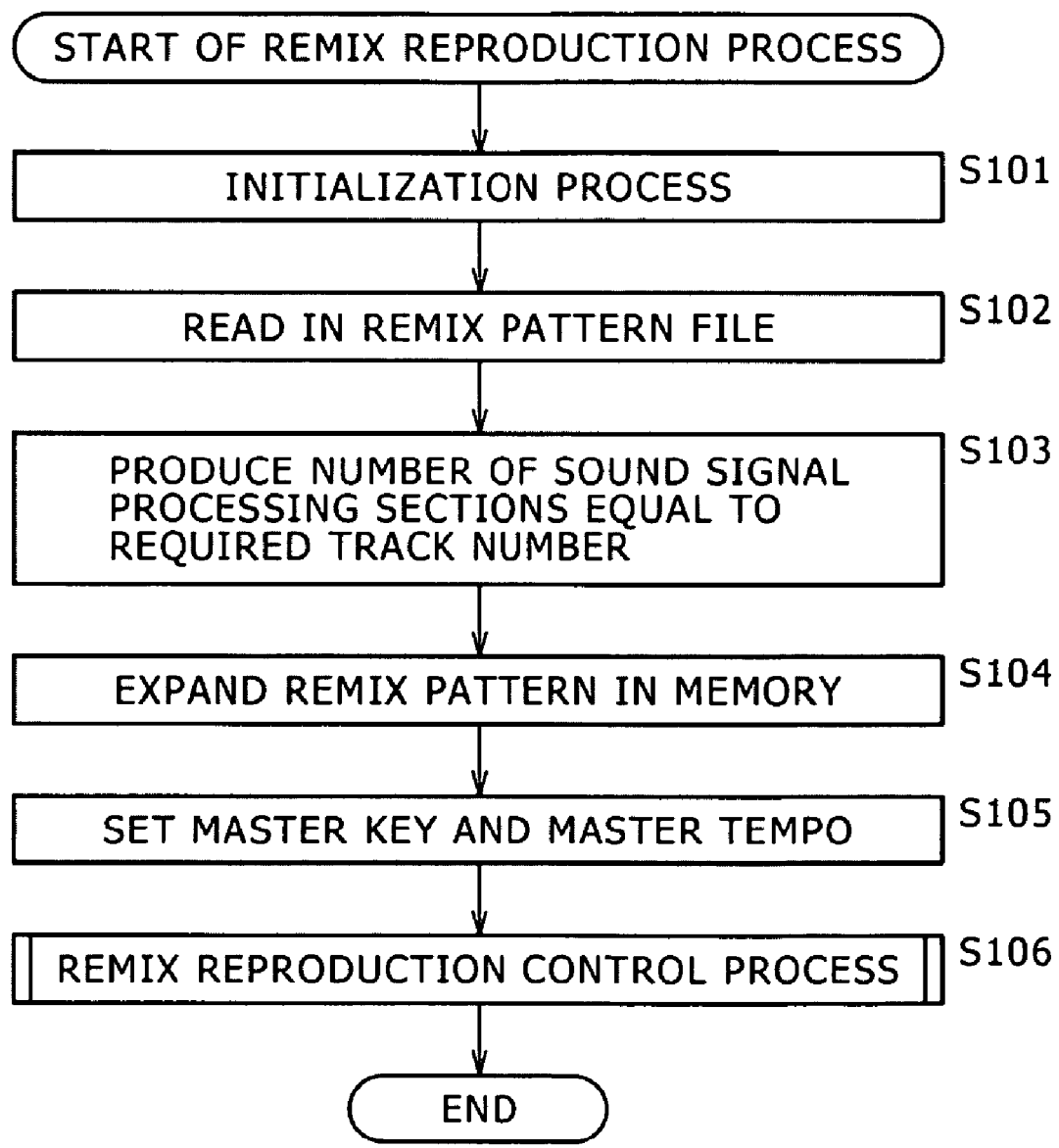
FIG. 37 is a flow chart illustrating a remix reproduction process.
Figure 38:
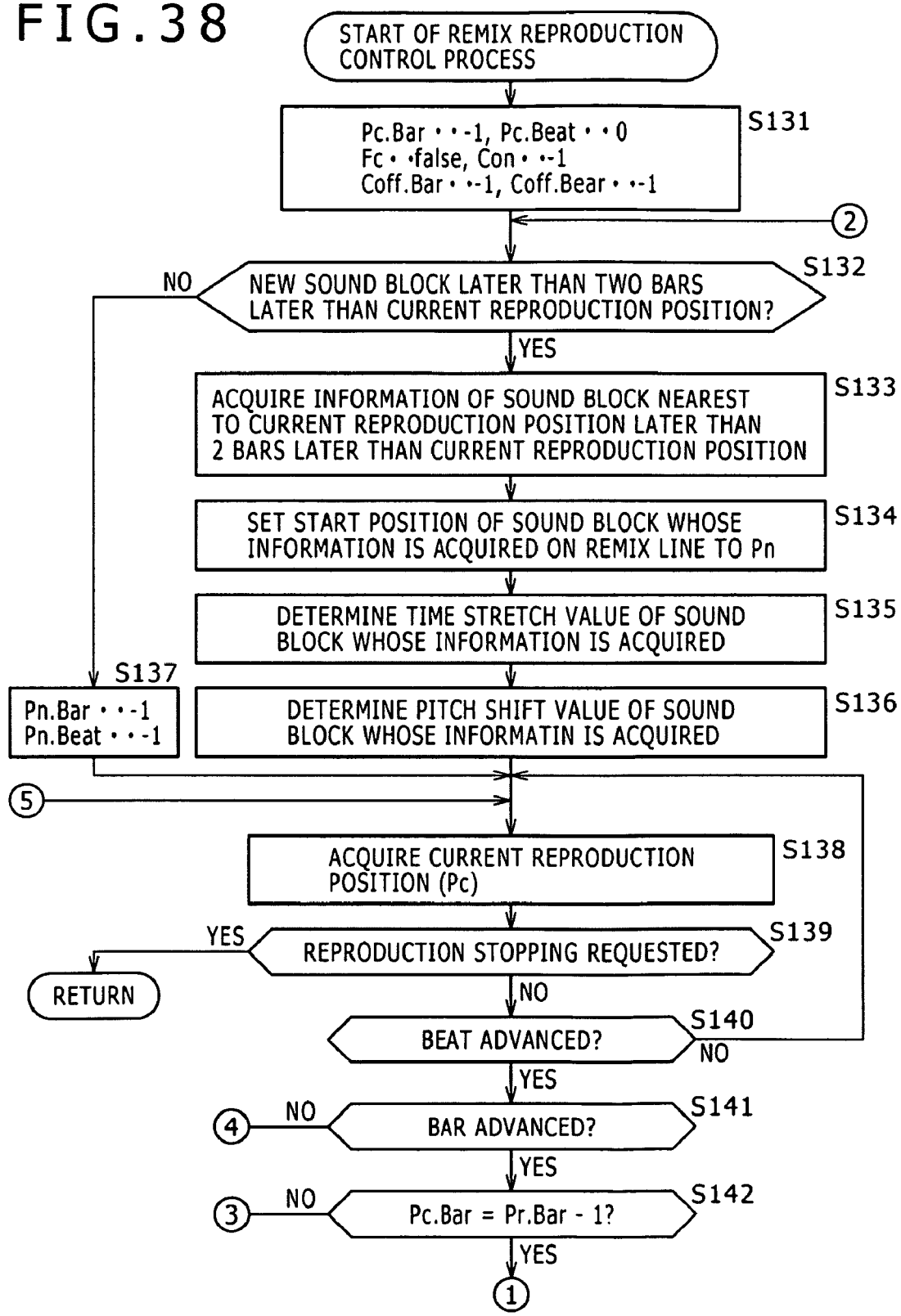
FIGS. 38, 39 and 40 are flow charts illustrating a remix reproduction control process.
Figure 39:
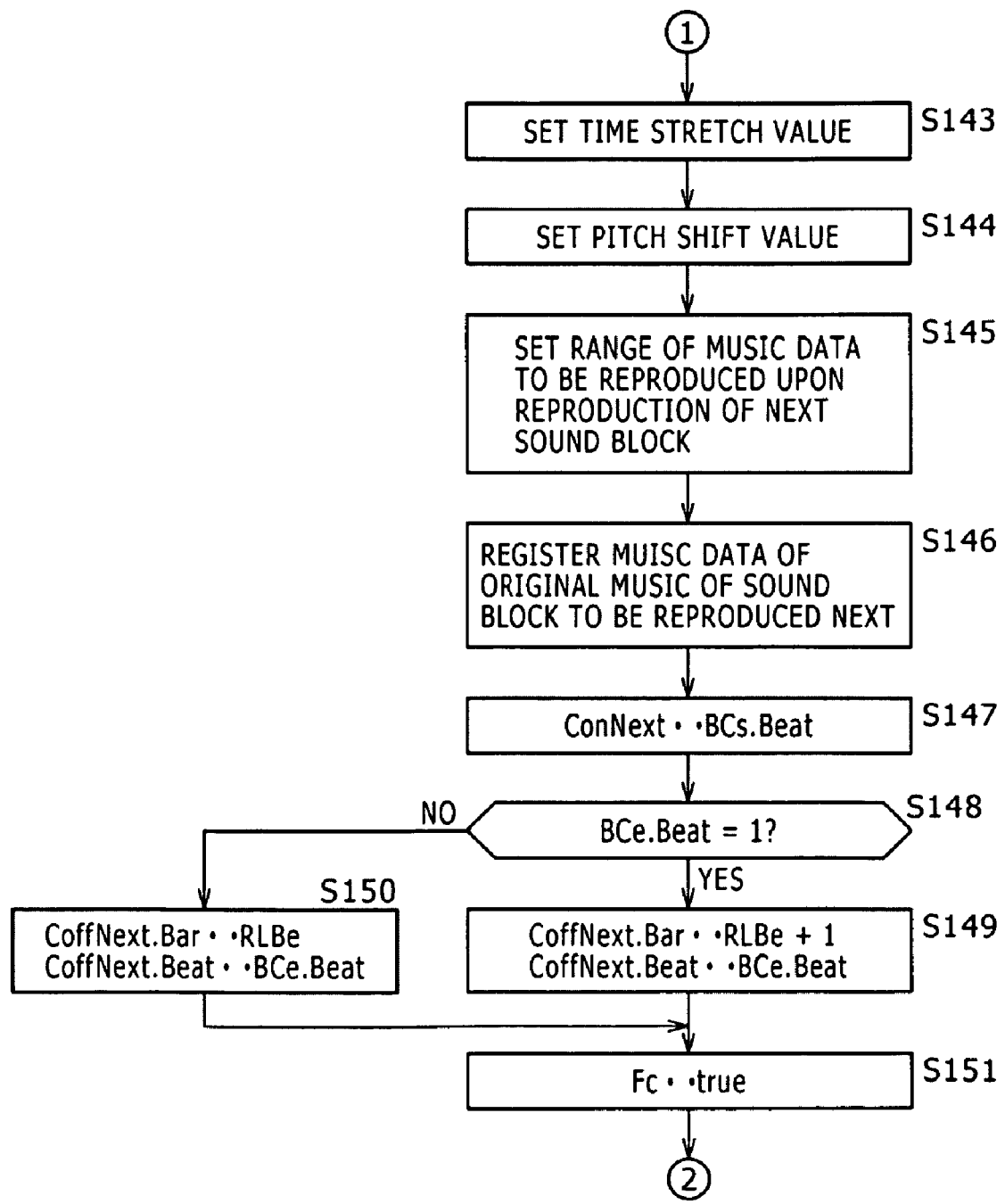

According to another embodiment of the present invention, there are provided a music editing method for remix reproducing a plurality of sound materials, each formed from part or the entirety of a music piece, in combination, and a program for causing a computer to execute a music editing process for remix reproducing a plurality of sound materials, each formed from part or the entirety of a music piece, in combination, including the steps of controlling, based on remix pattern data including the combination of the sound materials and information relating to the sound materials, the position and the timing at which music data of the original music pieces of the sound materials are reproduced such that the sound materials are reproduced in the combination indicated by the remix pattern data (for example, steps S132 to S134 and S137 to S142 of FIG. 37, steps S145 and S151 of FIG. 39 and steps S155 to S162 of FIG. 40), controlling, based on the value of original tempos which are tempos in the original music pieces of the sound materials indicated by the remix pattern data, the reproduction speed of the sound materials so that the tempos of the sound materials are adjusted to a predetermined master tempo (for example, step S135 of FIG. 38 and step S143 of FIG. 39), and controlling, based on the difference between original keys which are keys in the original music pieces of the sound materials indicated by the remix pattern data and a predetermined master key and the control amount for the reproduction speed, the pitch of sound of the sound materials so that the keys of the sound materials are adjusted to the master key (for example, step S136 of FIG. 38 and step S144 of FIG. 39).

In the following, a preferred embodiment of the present invention is described with reference to the accompanying drawings.

Figure 2:
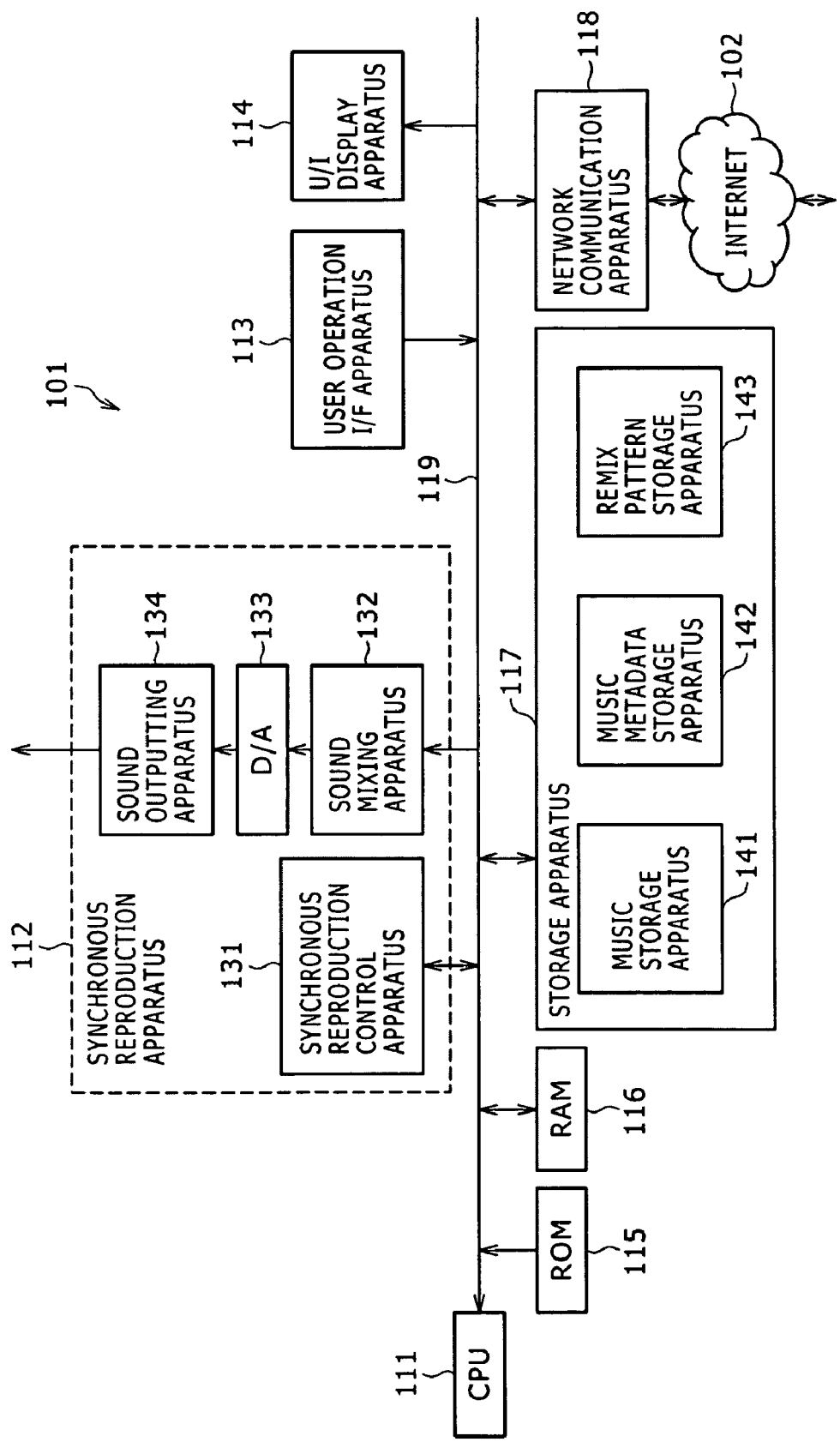
FIG. 2 is a block diagram showing a music editing system to which the present invention is applied.

FIG. 2 shows a music editing system 101 to which the present invention is applied.

Referring to FIG. 2, the music editing system 101 is formed as an apparatus which performs remix editing of combining a plurality of sound materials to produce a pattern (hereinafter referred to as remix pattern) for producing one music piece (hereinafter referred to as remix music piece) and remix reproduction of reproducing sound materials in combination based on a remix pattern.

Figure 3:
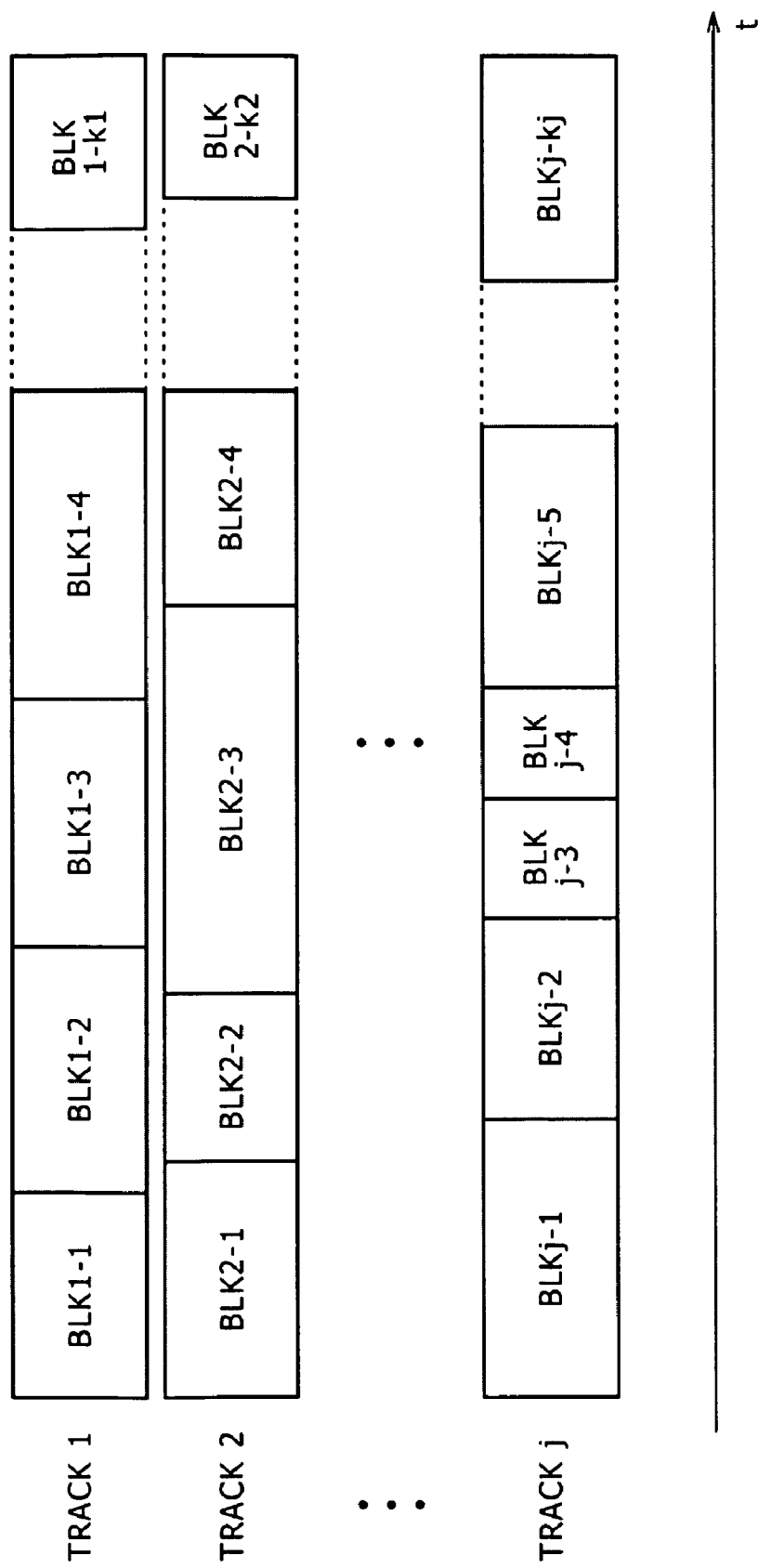
FIG. 3 is a diagrammatic view illustrating an example of a remix line.
Figure 4:
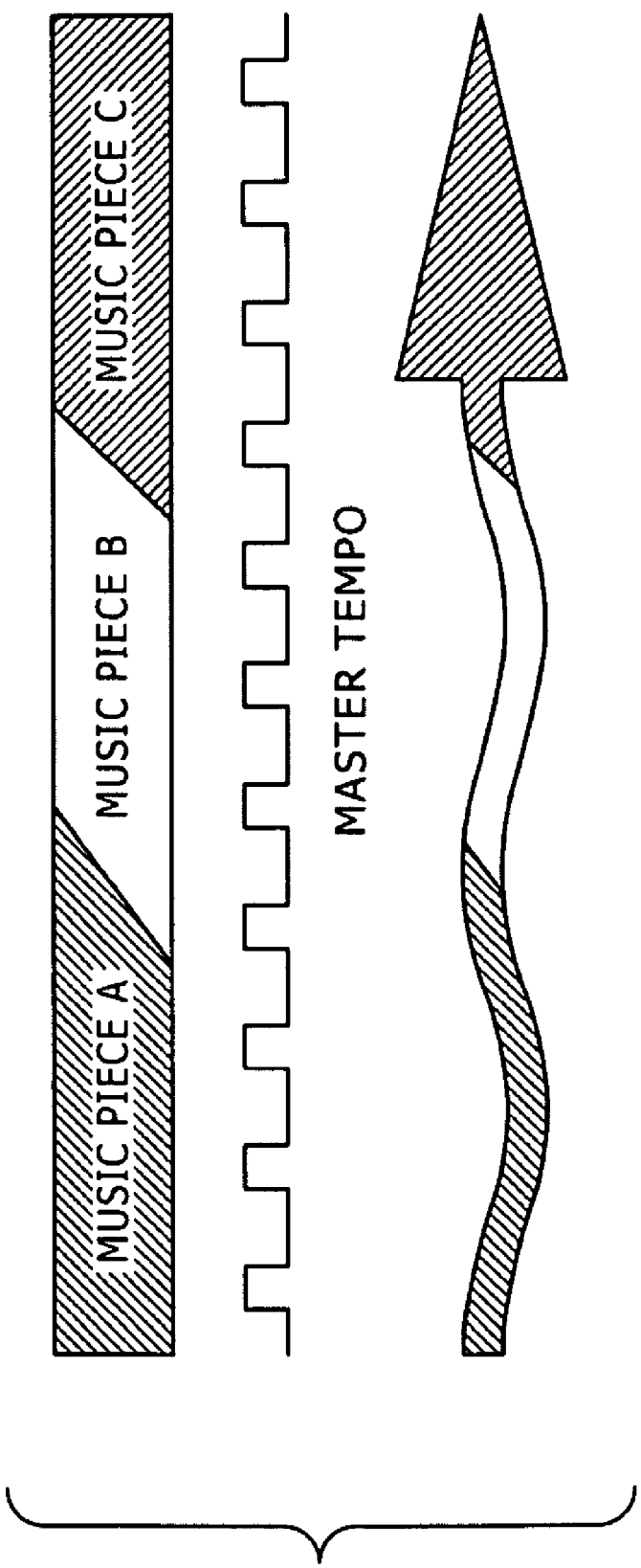
FIG. 4 is a waveform diagram illustrating a time stretch.

The remix editing is performed by disposing sound materials on tracks of a remix line formed from a plurality of tracks, and the remix reproduction is performed by reproducing tracks simultaneously along the same time axis and synthesizing the sound of the tracks. FIG. 3 shows an example of a remix line formed from j tracks from track 1 to track j. Referring to FIG. 3, the axis of abscissa indicates the time axis, that is, the time axis upon remix reproduction, and sound materials disposed on the same track are reproduced in order from the left in FIG. 3 while a plurality of sound materials disposed at the same position on the time axis direction on different tracks are reproduced simultaneously.

The remix pattern described above indicates a pattern of sound materials disposed on a remix line, that is, a combination of sound materials in the time axis direction and the track direction, or in other words, a pattern wherein sound materials are overlapped and/or connected. Further in other words, the remix pattern indicates the order and the timing in reproduction of sound materials.

It is to be noted that a sound material disposed on each track of a remix line is hereinafter referred to particularly also as sound block. In FIG. 3, blocks BLK1-1 to BLKj-kj correspond to sound blocks.

Further, in the following description, not only a completed music piece but also a material (for example, a loop material) which is formed entirely or partly from reproduced effect sound, short frames or the like used as a sound material is referred to as music piece.

Figure 5:
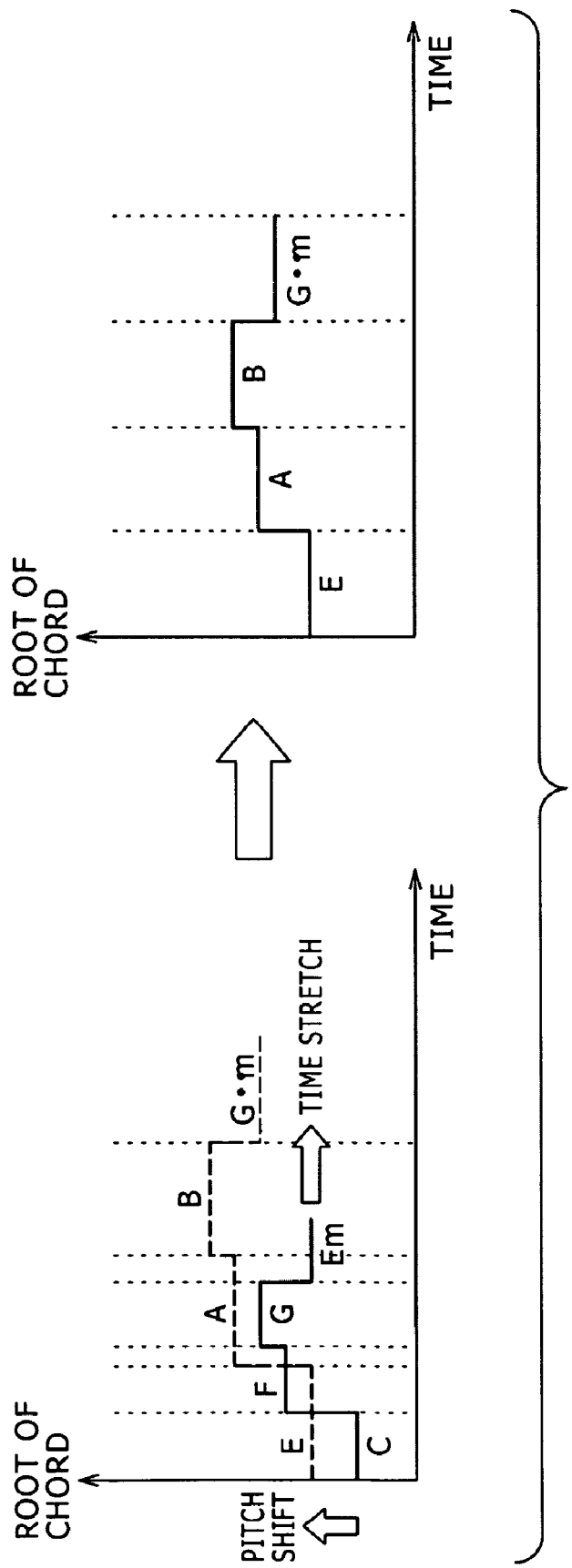
FIG. 5 is a diagram illustrating a pitch shift.

When the music editing system 101 performs remix reproduction, it performs adjustment of the reproduction speed of sound materials, that is, the time stretch, so that the tempos of sound materials extracted from music pieces A to C having different tempos from one another are adjusted to the tempo on the time axis of the remix line (the last-mentioned tempo is hereinafter referred to as master tempo). However, even if the sound materials are reproduced with the tempos thereof adjusted, depending upon the combination of chord progressions of the sound materials, a discord may be produced and may not sometimes sound aurally agreeable. Therefore, the music editing system 101 performs adjustment of the pitch of sound, that is, the pitch shift, in addition to the time stretch so that the keys of a plurality of sound materials having different keys are adjusted to a key set by the user or the like (the last-mentioned key is hereinafter referred to as master key) as seen from FIG. 5.

In this manner, the music editing system 101 produces remix music pieces such that the beats and the keys of a plurality of sound materials are adjusted so that the remix music pieces can sound natural on the auditory sense without providing an unfamiliar feeling as if they originally were a single music piece.

Referring back to FIG. 2, the music editing system 101 includes a central processing unit (CPU) 111, a synchronous reproduction apparatus 112, a user operation interface (I/F) apparatus 113, a user interface (U/I) display apparatus 114, a ROM (Read Only Memory) 115, a RAM (Random Access Memory) 116, a storage apparatus 117 and a network communication apparatus 118. The CPU 111, synchronous reproduction apparatus 112, user operation interface apparatus 113, user interface display apparatus 114, ROM 115, RAM 116, storage apparatus 117 and network communication apparatus 118 are connected to each other by a bus 119.

The CPU 111 executes a predetermined program to control processing of the components of the music editing system 101 based on an instruction of a user and so forth inputted thereto through the user operation interface apparatus 113.

The synchronous reproduction apparatus 112 performs a reproduction process of music data stored in a music storage apparatus 141 under the control of the CPU 111. The synchronous reproduction apparatus 112 includes a synchronous reproduction control apparatus 131, a sound mixing apparatus 132, a digital/analog conversion apparatus (D/A) 133 and a sound outputting apparatus 134.

The synchronous reproduction control apparatus 131 parallelly reproduces music data stored in the music storage apparatus 141 corresponding to tracks of a remix line and supplies a plurality of sound signals of different systems (tracks) to the sound mixing apparatus 132 under the control of the CPU 111. Further, the synchronous reproduction control apparatus 131 supplies information representative of the reproduction position of the music data on the time axis of the remix line to the CPU 111.

The sound mixing apparatus 132 synthesizes a plurality of sound signals of the different systems from the synchronous reproduction control apparatus 131 and supplies a resulting sound signal to the digital/analog conversion apparatus 133 under the control of the CPU 111.

The digital/analog conversion apparatus 133 converts the digital sound signal supplied thereto from the sound mixing apparatus 132 into an analog sound signal and supplies the analog sound signal to the sound outputting apparatus 134.

The sound outputting apparatus 134 amplifies the analog sound signal from the digital/analog conversion apparatus 133 and outputs the analog sound signal to an outputting apparatus such as a speaker or a headphone.

The user operation interface apparatus 113 is formed, for example, from keys, buttons, a mouse, a keyboard and so forth, and accepts a processing instruction from the user and supplies information representative of the instruction to the relevant components of the music editing system 101.

The user interface display apparatus 114 is formed from a display apparatus such as, for example, an LCD (Liquid Crystal Display) unit and LEDs (Light Emitting Diodes). The user interface display apparatus 114 displays an operation screen image, a processing situation and so forth of the music editing system 101 such as, for example, an editing screen image upon remix editing or a reproduction screen image upon remix reproduction under the control of the CPU 111.

The ROM 115 has stored therein various control programs to be executed by the CPU 111 and various data.

The RAM 116 is used as a working area of the CPU 111 and so forth.

The storage apparatus 117 includes a music storage apparatus 141, a music metadata storage apparatus 142 and a remix pattern storage apparatus 143.

The music storage apparatus 141 is formed from a storage apparatus or a recording apparatus such as, for example, a flash memory or a hard disk and stores music data of various music pieces. For example, music data are digital sound data of the PCM (Pulse Code Modulation) type sampled with a predetermined sampling frequency and are stored in a form compressed in accordance with a predetermined method as occasion demands.

The music metadata storage apparatus 142 is formed from a storage apparatus or a recording apparatus such as, for example, a flash memory or a hard disk and stores metadata of music pieces. It is to be noted that details of metadata are hereinafter described with reference to FIGS. 8 to 14.

It is to be noted that music data and metadata corresponding to the same music piece are associated with each other, for example, using a music piece ID for uniquely identifying each music piece or like information. Or, where music data are of a format such as the MP3 (MPEG Audio Layer-3) format, fringe data (metadata) may be stored as an ID3 tag into the same file.

The remix pattern storage apparatus 143 is formed from a storage apparatus such as, for example, a flash memory or a hard disk and stores a remix pattern file in which remix pattern data including a combination of sound materials on a remix line and information relating to each sound material are recorded. It is to be noted that details of remix pattern data are hereinafter described with reference to FIG. 15.

It is to be noted that the music storage apparatus 141, music metadata storage apparatus 142 and remix pattern storage apparatus 143 may be formed from individually different storage apparatus from one another or may be formed from two or one storage apparatus in which the three storage apparatus are involved.

The network communication apparatus 118 communicates with a different apparatus through a network such as the Internet 102 to transmit and receive various data. For example, the network communication apparatus 118 may download music data, metadata of such music data and a remix pattern file from a server or a system of another user connected to the Internet 102 and may transmit a remix pattern file produced by the user using the music editing system 101 to the different server or system connected to the Internet 102.

Figure 6:
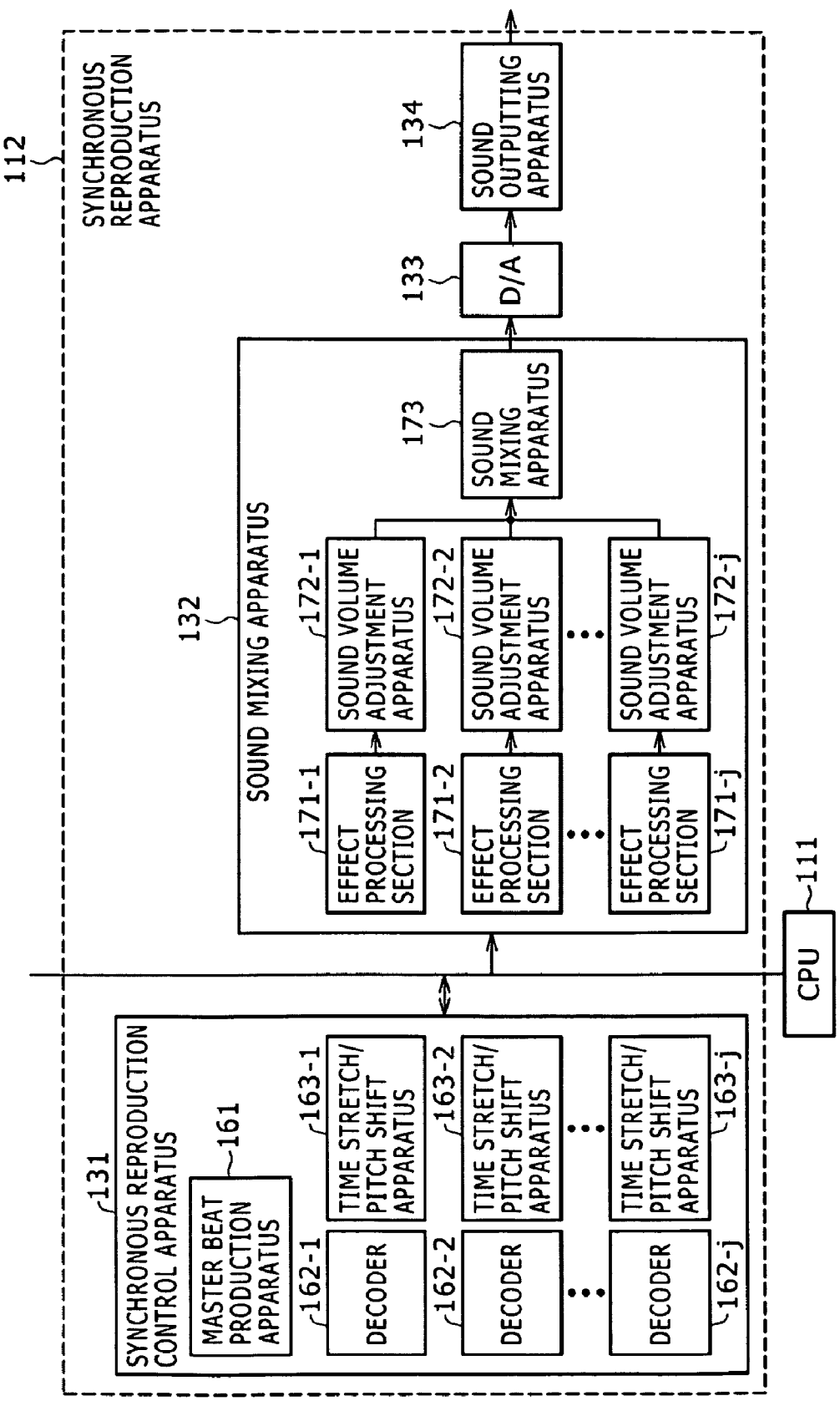
FIG. 6 is a block diagram showing details of a configuration of a synchronous reproduction apparatus shown in FIG. 2.

FIG. 6 shows a detailed configuration of the synchronous reproduction control apparatus 131 and the sound mixing apparatus 132 of the synchronous reproduction apparatus 112.

The synchronous reproduction control apparatus 131 includes a master beat production apparatus 161, decoders 162-1 to 162-*j* and time stretch/pitch shift apparatus 163-1 to 163-*j*. Meanwhile, the sound mixing apparatus 132 includes effect processing sections 171-1 to 171-*j*, sound volume adjustment apparatus 172-1 to 172-*j* and a sound mixing apparatus 173.

The decoders 162-1 to 162-*j*, time stretch/pitch shift apparatus 163-1 to 163-*j*, effect processing sections 171-1 to 171-*j* and sound volume adjustment apparatus 172-1 to 172-*j* cooperate in a one-by-one corresponding relationship to form a set which performs processing for a corresponding one of tracks. For example, the decoder 162-1, time stretch/pitch shift apparatus 163-1, effect processing section 171-1 and sound volume adjustment apparatus 172-1 cooperatively form one set which performs processing corresponding to one track. Accordingly, the synchronous reproduction apparatus 112 of FIG. 6 is configured so as to reproduce music data (sound materials) of j systems (tracks) simultaneously and synthesize the reproduced music data.

It is to be noted that, in the description hereinafter given, where there is no necessity to identify the decoders 162-1 to 162-*j* from each other, each of them is referred to merely as decoder 162. Similarly, where there is no necessity to identify the time stretch/pitch shift apparatus 163-1 to 163-*j* from each other, each of them is referred to merely as time stretch/pitch shift apparatus 163. Further, where there is no necessity to identify the effect processing sections 171-1 to 171-*j* from each other, each of them is referred to merely as effect processing section 171. Furthermore, where there is no necessity to identify the sound volume adjustment apparatus 172-1 to 172-*j* from each other, each of them is referred to merely as sound volume adjustment apparatus 172.

The master beat production apparatus 161 produces a master beat, which is a clock signal, based on a master tempo set by the user or the like and supplies the produced master beat to the relevant components of the synchronous reproduction apparatus 112. The master beat production apparatus 161 produces a bar signal, which is a clock signal adjusted to the timing of the top of a bar of a remix line, based on a beat of the remix line set by the user or the like and supplies the produced bar signal to the relevant components of the synchronous reproduction apparatus 112. For example, where the rhythm of the remix line is set to the simple quadruple time, the master beat production apparatus 161 outputs one bar signal every time a master beat is outputted for four clocks (four beats). Further, the master beat production apparatus 161 supplies information representing at what beat in what bar the reproduction of the remix line is at present.

A decoder 162 and a time stretch/pitch shift apparatus 163 which form one set form a sound signal production section which performs reproduction of music data stored in the music storage apparatus 141 in accordance with the position of the bar and the beat on the time axis on the remix line indicated by the master beat and the bar signal using metadata of the music pieces under the control of the CPU 111.

The decoders 162-1 to 162-*j* individually acquire music data from the music storage apparatus 141 and decode the music data, which are in a form compressed in accordance with a predetermined method such as the MP3 (MPEG Audio Layer-3) method or the ATRAC (Adaptive Transform Acoustic Coding), using metadata of the music pieces under the control of the CPU 111. then, the decoders 162-1 to 162-*j* supply the decoded music data as sound signals of the PCM system to the time stretch/pitch shift apparatus 163-1 to 163-*j*, respectively.

The time stretch/pitch shift apparatus 163-1 to 163-*j* individually perform time stretch and pitch shift processes for sound signals from the decoders 162-1 to 162-*j*, respectively, to vary the reproduction speed and the pitch of sound of the sound signals under the control of the CPU 111. Then, the time stretch/pitch shift apparatus 163-1 to 163-*j* supplies resulting sound signals to the effect processing sections 171-1 to 171-*j*, respectively.

The effect processing sections 171-1 to 171-*j* individually perform such effect processes as low-pass filter, high-pass filter, band-pass filter, vocal cancel, reverb, delay, distortion and maximization processes for sound signals from the time stretch/pitch shift apparatus 163-1 to 163-*j*, respectively, under the control of the CPU 111. Then, the effect processing sections 171-1 to 171-*j* supply resulting sound signals to the sound volume adjustment apparatus 172-1 to 172-*j*, respectively.

The sound volume adjustment apparatus 172-1 to 172-*j* individually adjust the sound volume of sound signals from the effect processing sections 171-1 to 171-*j*, respectively, under the control of the CPU 111 and supply resulting sound signals to the sound mixing apparatus 173.

The sound mixing apparatus 173 synthesizes the sound signals from the sound volume adjustment apparatus 172-1 to 172-*j* and supplies a synthesized sound signal to the digital/analog conversion apparatus 133.

It is to be noted that some or all of the functions of the synchronous reproduction apparatus 112 may be implemented by software.

Figure 7:
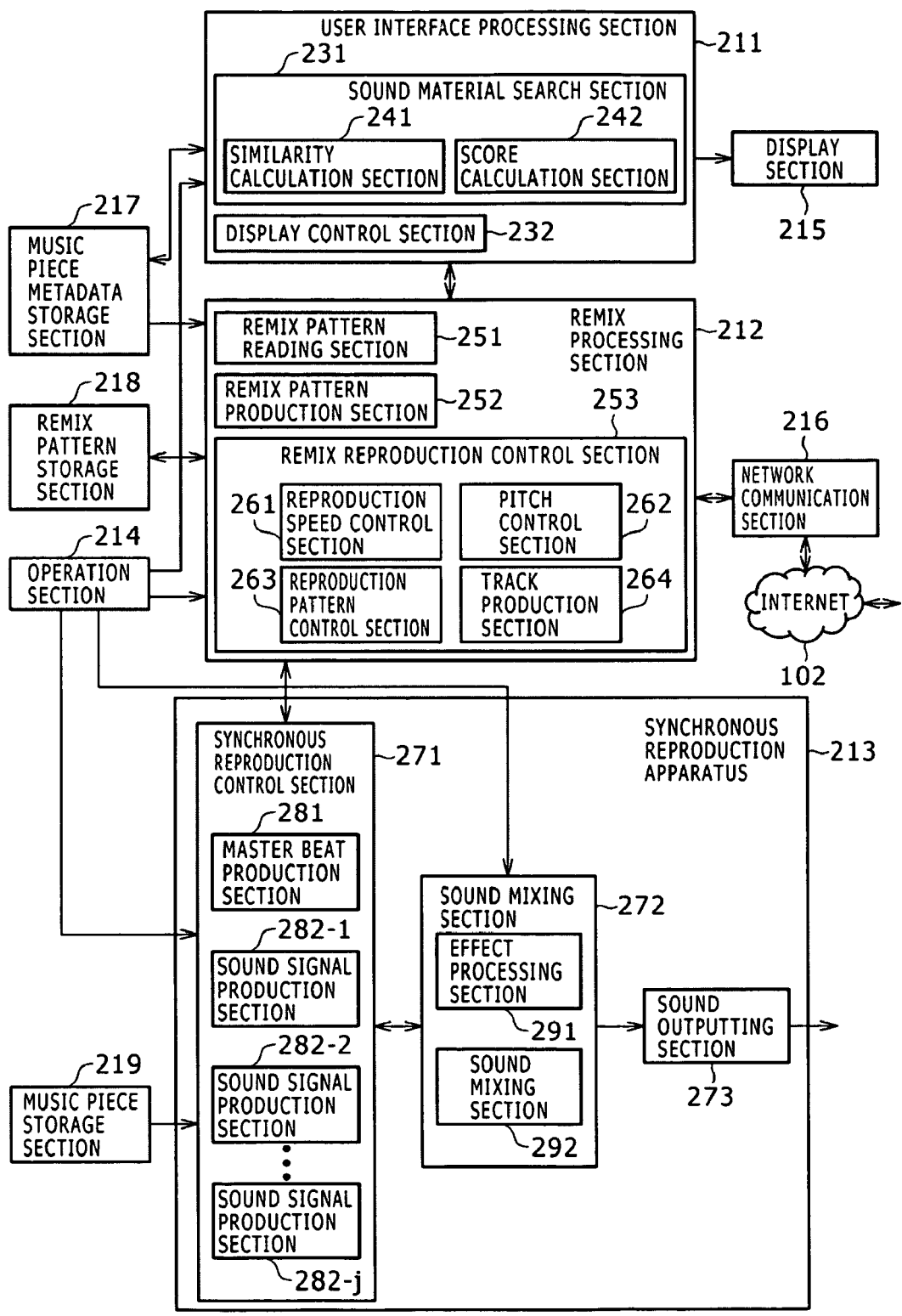
FIG. 7 is a block diagram showing a functional configuration of the music editing system.

FIG. 7 shows an example of a functional configuration of the music editing system 101. Referring to FIG. 7, where the music editing system 101 is viewed from the point of view of the function, the music editing system 101 includes a user interface processing section 211, a remix processing section 212, and a synchronous reproduction section 213. The music editing system 101 further includes an operation section 214, a display section 215, a network communication section 216, a music piece metadata storage section 217, a remix pattern storage section 218 and a music piece storage section 219.

The user interface processing section 211 is implemented by a predetermined control program executed by the CPU 111 and performs processing relating to the user interface of the music editing system 101. The user interface processing section 211 includes a sound material search section 231 and a display control section 232.

Figure 28:
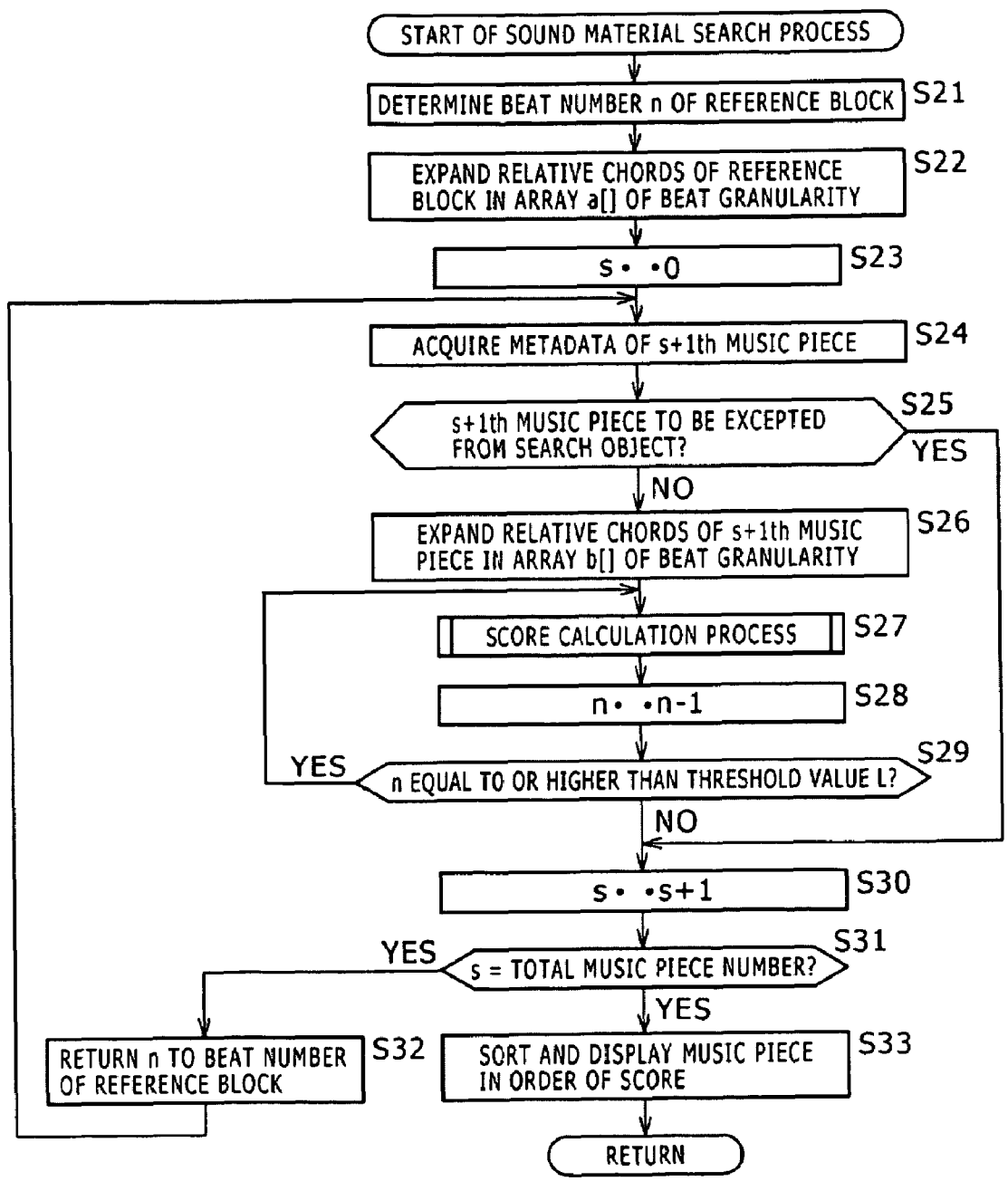
FIG. 28 is a flow chart illustrating a sound material search process.
Figure 29:
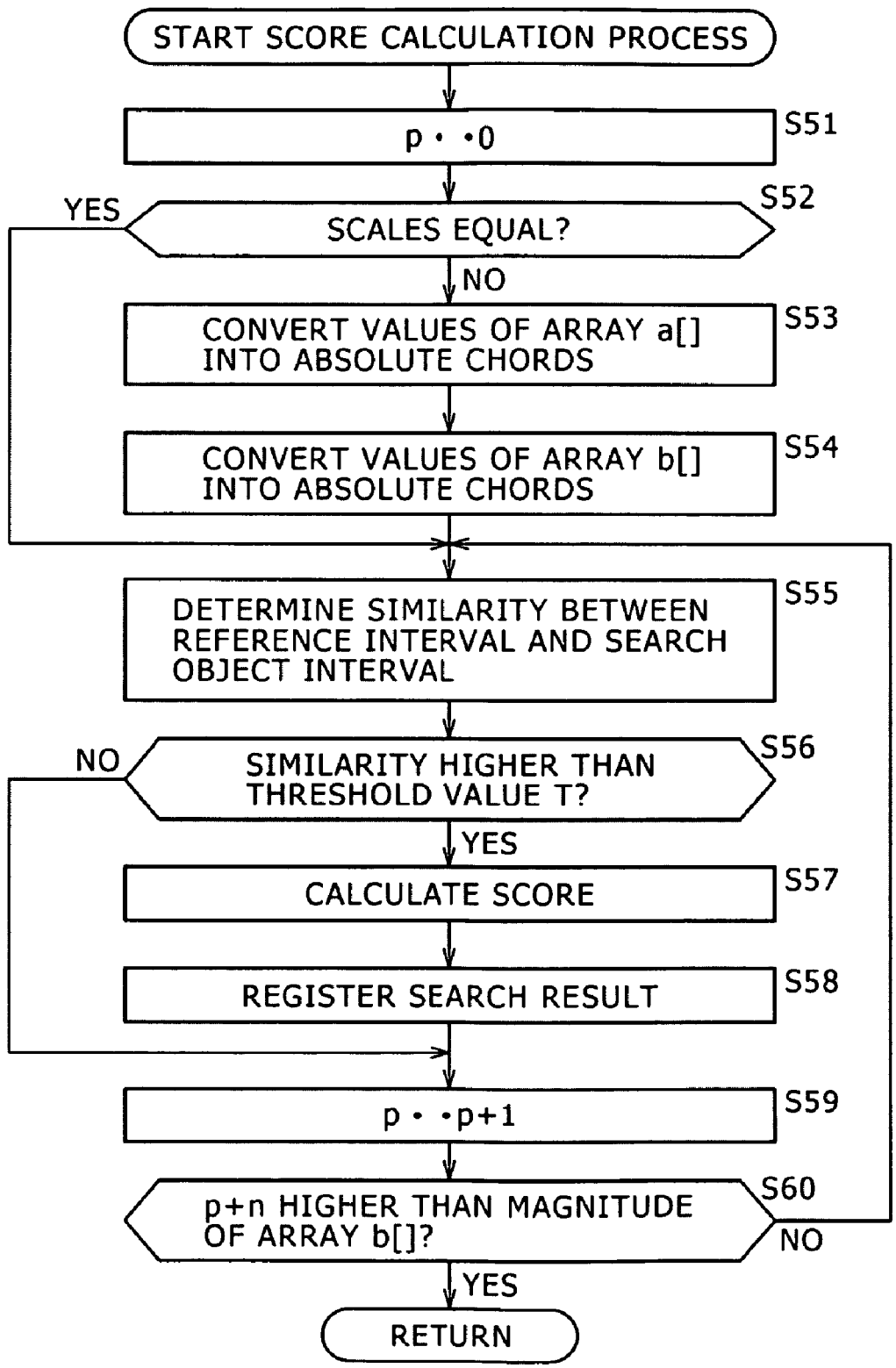
FIG. 29 is a flow chart illustrating a score calculation process.

The sound material search section 231 searches for a sound material suitable for reproduction in an overlapping relationship with a designated sound material or a sound material suitable for reproduction in a contiguous relationship to a designated sound material as hereinafter described with reference to FIGS. 28 and 29 and so forth. The sound material search section 231 includes a similarity calculation section 241 and a score calculation section 242.

The similarity calculation section 241 calculates the similarity in chord progression between two sound materials based on metadata of music pieces as hereinafter described with reference to FIGS. 28 and 29 and so forth. Then, the similarity calculation section 241 supplies information representative of the calculated similarity to the score calculation section 242.

The score calculation section 242 searches for a sound material suitable for reproduction in an overlapping relationship with a designated sound material or a sound material suitable for reproduction in a contiguous relationship to a designated sound material based on the similarity calculated by the similarity calculation section 241 as hereinafter described with reference to FIGS. 28 and 29 and so forth. Then, the score calculation section 242 calculates a score representative of the degree of coincidence with regard to the searched out sound material. The score calculation section 242 stores information representative of the searched out sound material and the calculated score into the music piece metadata storage section 217.

The remix processing section 212 is implemented by a predetermined control program executed by the CPU 111 and performs processing relating to remix editing and remix reproduction. The remix processing section 212 includes a remix pattern reading section 251, a remix pattern production section 252 and a remix reproduction control section 253.

The remix pattern reading section 251 reads in a remix pattern file from the remix pattern storage section 218, shapes the read in remix pattern data so as to have a predetermined format and supplies the remix pattern data of the predetermined format into the RAM 116.

Figure 16:
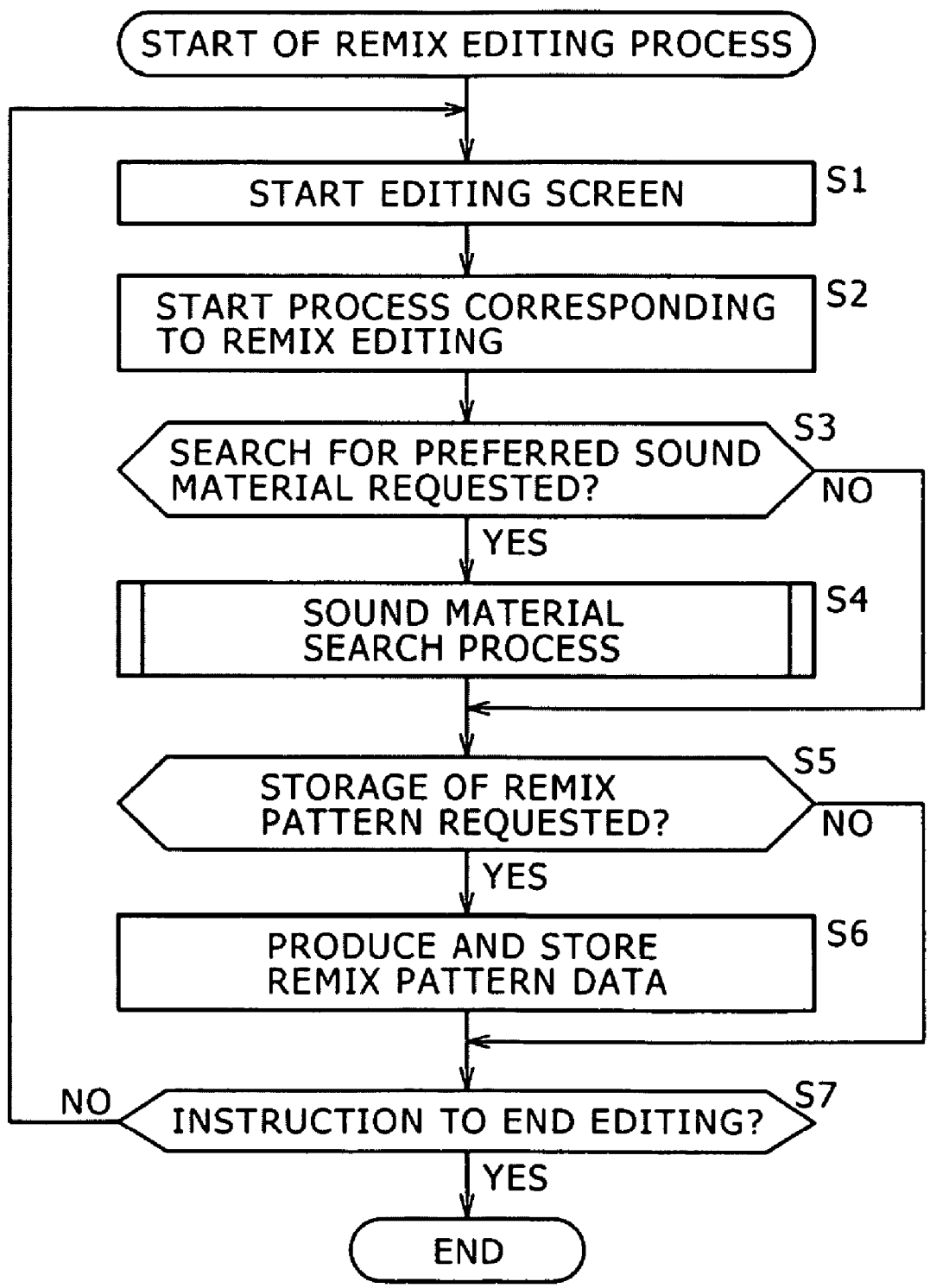
FIG. 16 is a flow chart illustrating a remix editing process.

The remix pattern production section 252 produces remix pattern data from a remix pattern produced by remix editing performed by the user and metadata of individual music pieces as hereinafter described with reference to FIG. 16 and so forth. The remix pattern production section 252 stores the produced remix pattern data into the remix pattern storage section 218.

The remix reproduction control section 253 controls the synchronous reproduction section 213 on the real time basis based on metadata of music pieces and remix pattern data such that remix reproduction is performed based on the remix pattern indicated by the remix pattern data. The remix reproduction control section 253 includes a reproduction speed control section 261, a pitch control section 262, a reproduction pattern control section 263 and a track production section 264.

The reproduction speed control section 261 controls the reproduction speed of sound materials from sound signal production sections 282-1 to 282-*j* based on remix pattern data such that the tempo of the sound materials is adjusted to the master tempo based on an original tempo which is a tempo of original music pieces from which the sound materials are extracted as hereinafter described with reference to FIGS. 38 to 40 and so forth.

The pitch control section 262 controls the pitch of reproduction sound of sound materials from the sound signal production sections 282-1 to 282-*j* based on remix pattern data such that the key of the music sounds is adjusted to the master key based on the difference between original keys of original music pieces of the sound materials and the master key and the control amount of the reproduction speed by the reproduction speed control section 261 as hereinafter described with reference to FIGS. 38 to 40 and so forth.

The reproduction pattern control section 263 supplies music data and metadata to the sound signal production sections 282-1 to 282-*j* and controls the reproduction position of the reproduction timing of music data of original music pieces of the sound materials from the sound signal production sections 282-1 to 282-*j* based on the metadata of the music pieces and the remix pattern data such that the sound materials are reproduced in accordance with a remix pattern indicated by the remix pattern data.

The track production section 264 produces a number of sound signal production sections 282 equal to the number of tracks used in remix reproduction. More particularly, the track production section 264 starts processing of, for example, a number of decoders 162 and time stretch/pitch shift apparatus 163 equal to the number of tracks used in remix reproduction.

The synchronous reproduction section 213 is implemented by the synchronous reproduction apparatus 112 shown in FIG. 2 and includes a synchronous reproduction control section 271, a sound mixing section 272 and a sound outputting section 273. The synchronous reproduction control section 271 is implemented by the synchronous reproduction control apparatus 131 shown in FIG. 2 and includes a master beat production section 281 and sound signal production sections 282-1 to 282-*j*. The master beat production section 281 is implemented by the master beat production apparatus 161 shown in FIG. 6 while the sound signal production sections 282-1 to 282-*j* are implemented by the decoders 162-1 to 162-*j* and the time stretch/pitch shift apparatus 163-1 to 163-*j* shown in FIG. 6, respectively. The sound mixing section 272 is implemented by the sound mixing apparatus 132 shown in FIG. 2 and includes a effect processing section 291 and a sound mixing section 292. The effect processing section 291 is implemented by the effect processing sections 171-1 to 171-*j* and the sound volume adjustment apparatus 172-1 to 172-*j* shown in FIG. 6 while the sound mixing section 292 is implemented by the sound mixing apparatus 173 shown in FIG. 6. The sound outputting section 273 is implemented by the digital/analog conversion apparatus 133 and the sound outputting apparatus 134 shown in FIG. 2.

The operation section 214, display section 215, network communication section 216, music piece metadata storage section 217, remix pattern storage section 218 and music piece storage section 219 are implemented by the user operation interface apparatus 113, user interface display apparatus 114, network communication apparatus 118, music metadata storage apparatus 142, remix pattern storage apparatus 143 and music storage apparatus 141 shown in FIG. 2, respectively.

It is to be noted that, when the processing of the music editing system 101 is described, the description is given with reference to the block diagram of FIG. 7.

Figure 8:
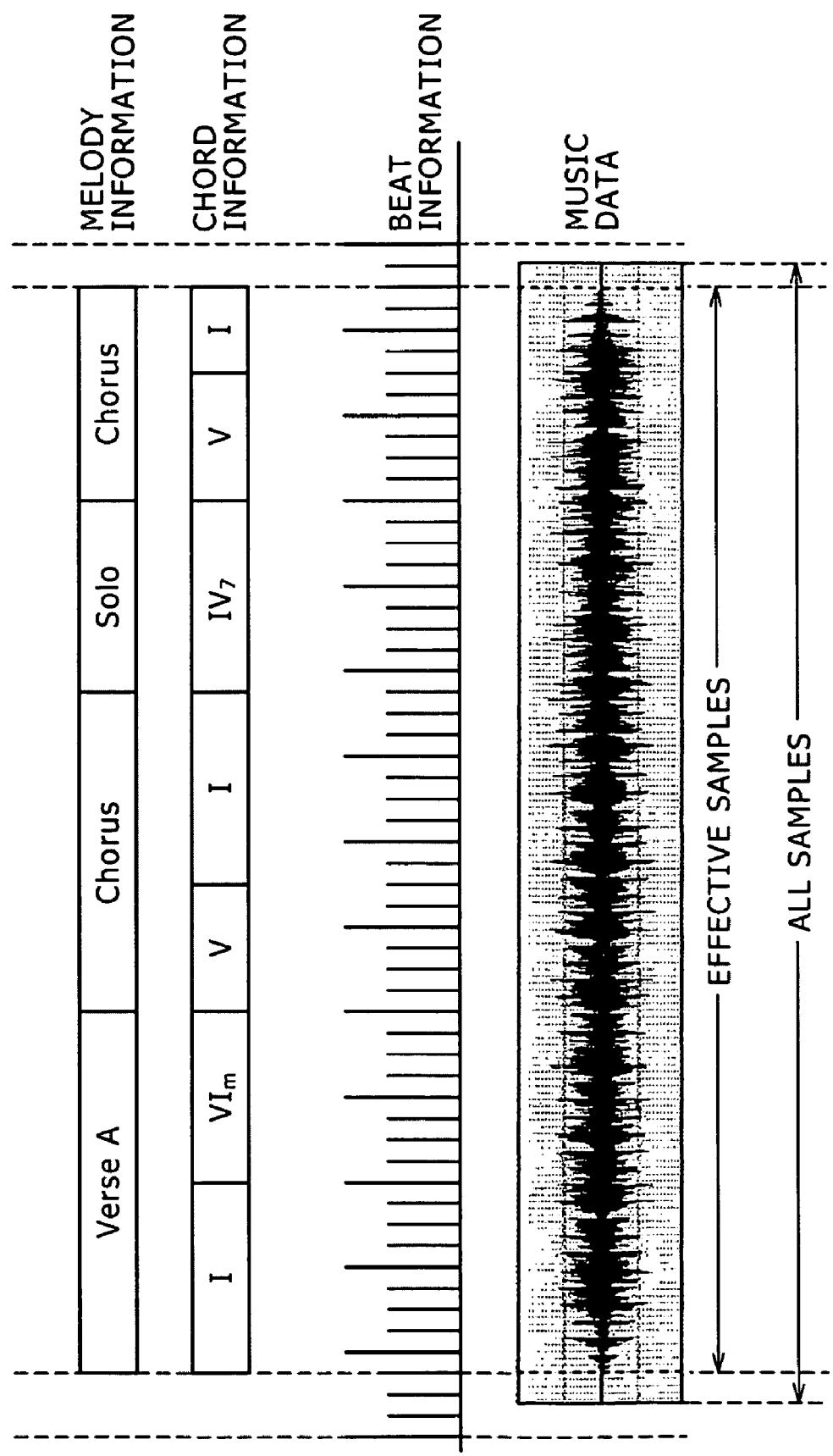
FIG. 8 is a waveform diagram illustrating beat information, chord information and melody information.

Now, details of metadata are described with reference to FIGS. 8 and 14. The metadata are data representative of a characteristic of a music piece, a corresponding relationship between music data and a construction of a music piece and so forth and includes beat information, chord information and melody information. Here, the beat information, chord information and melody information are described with reference to FIG. 8. It is to be noted that a waveform diagram at a lower portion in FIG. 8 indicates the waveform of music data, and a range indicated by effective samples from within a range indicated by all samples is a range within which data of a music piece are recorded actually.

The beat information indicates the position of a bar and a beat in music data. More particularly, the beat information indicates the sample position or the like, in music data, of a beat at the top of each bar of the music piece (such beat is hereinafter referred to also as bar top) and a beat intermediately of each bar and so forth. In FIG. 8, the position of each bar top in the music data is indicated by a vertical long line shown on the left side of the characters "Beat information" while the position of each beat other than those at the bar top is indicated by a vertical short line. It is to be noted that FIG. 8 illustrates an example of beat information of a music piece of the simple quadruple time, and a bar top appears at every four bits.

By the beat information, the position of the bar top and each beat in the music data can be specified in a unit of a sample, and an arbitrary interval of the music data can be designated in a unit of a bar or a beat. Further, it is possible to use the beat information to determine an average BPM (Beat Per Minute), which is an average tempo within an arbitrary interval of the music data, in accordance with the following expression (1):

$$\text{Average BPM} = Bn \times Fs \div Sn \times 60 \quad (1)$$

where Bn represents the beat number within the interval, Fs the sampling rate of the music data, and Sn the sample number within the interval.

The chord information represents the chord progressions of the music piece and further represents the position of each chord in the music data. More particularly, as seen in FIG. 8, the chord information indicates the type of each chord appearing in the music piece, the sample position of each chord in the music data and so forth. By the chord information, the position of the chords in the music data can be specified in a unit of a sample, and an arbitrary interval of the music data can be designated in a unit of a chord. Further, based on the chord information and the beat information, the position of the chords in the music piece can be specified in a unit of a beat.

It is to be noted that the type of a chord indicated by the chord information is represented not by the chord name but by a relative position of the root of the chord with respect to the keynote of the scale of the music piece. More particularly, each chord is represented by the chord name wherein a portion of the pitch name of the root thereof is rewritten into a numerical value such as, for example, I, I♯ (or II♭), II, II♯ (or III♭), III, III♯ (or IV♭), IV, IV♯ (or V♭), V, V♯ (or VI♭), VI, VI♯ (or VII♭), VII or VII♯ (or I♭) (and ♯ or ♭ as occasion demands) based on the pitch degree which is a relative position between the keynote of the scale and the root of the chord.

Figure 9:
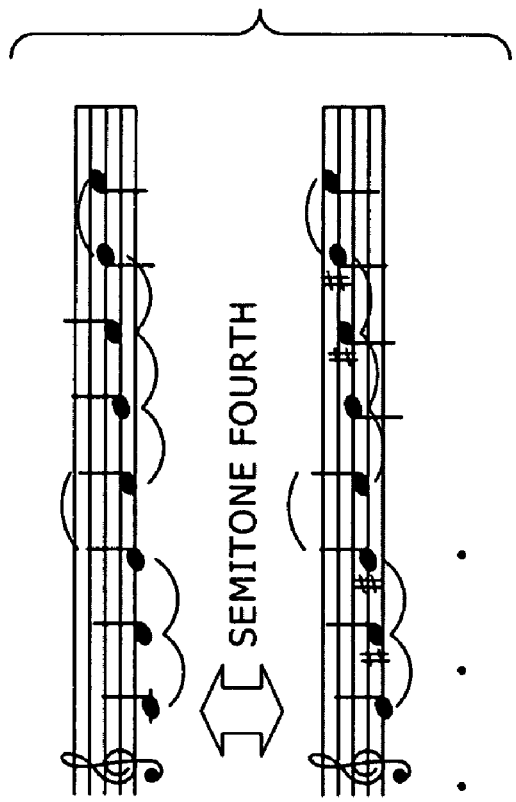
FIG. 9 is a view illustrating a relative key and an absolute key.

For example, where the type of a chord is represented by its chord name, it is difficult to discriminate whether or not chord progressions of C, F, G and Am in the key of C major whose keynote is C on the upper side in FIG. 9 and chord progressions of E, A, B and C♯m in the key of E major whose keynote is E on the lower side in FIG. 9 are similar to each other where the keys are adjusted.

On the other hand, if the type of a chord is represented based on the relative position between the keynote of the scale and the root of the chord, then the two chord progressions are represented as the same I, IV, V and VIm. Accordingly, it is easy to understand that, if the pitch of the chords on the upper side is raised by four semitones to transpose to the key of E major or otherwise the pitch of the chords on the lower side is lowered by four semitones to transpose to the key of C major, then the code progressions coincide with each other. In other words, the relationship in chord progression between sound materials having different tonalities from each other becomes definite, and it becomes definite whether or not the chord progressions of two sound materials are similar to each other when the key is changed. Accordingly, in a process of a computer or the like, it becomes easy to determine the similarity in chord progression between two sound sources where the key is changed.

It is to be noted that, in order to distinguish a chord represented by a chord name and a chord represented based on the relative position of the root of the chord to the keynote of the scale from each other, the former is sometimes referred to as absolute chord and the latter is sometimes referred to as relative chord. Further, to represent the type of a chord in the absolute chord is referred to as absolute representation, and to represent the type of a chord in the relative chord is referred to as relative representation. Furthermore, in the following description, a value represented by a numeral representing the relative position of the root of a relative chord to the keynote of the scale and ♯ or ♭ added to the numeral as occasion demands is hereinafter referred to as frequency.

Referring back to FIG. 8, the melody information indicates melody expansion of the music piece and indicates the position of an element (hereinafter referred to as melody block) of each melody which constructs the music piece in the music data. More particularly, as seen in FIG. 8, the melody information indicates the type of each melody block appearing in the music piece such as introduction (Intro), A melody (Verse A), B melody (Verse B), catchy part (Chorus), intermezzo (Interlude), solo (Solo) or ending (Outro), the sample position of each melody block in the music data, and so forth. By the melody information, the position of each melody block in the music data can be specified in a unit of a sample, and an arbitrary interval of the music data can be designated in a unit of a melody block. Further, the position of each melody block in the music piece can be specified in a unit of a beat based on the melody information and the beat information.

FIG. 10 illustrates an example of a data structure of the metadata, and FIG. 11 illustrates a particular example of the metadata. In the example illustrated in FIG. 11, the metadata includes a bar/beat number, an attribute and a sample position.

To the bar/beat number, a value representative of the position of a beat in the music piece is set. For example, in the case of the mth beat of the nth bar, the values of n and m are set to the bar/beat number. For example, in the example illustrated in FIG. 11, the first row indicates data of the first beat of the first bar, and the lowermost row indicates data of the second beat of the second row. It is to be noted that n is an integer equal to or greater than 1 and, in the case of a music piece of the simple kuple time, m is an integer within a range from 1 to k.

To the attribute, the type of an attribute of the beat information, melody information or chord information and detailed data relating to the attribute of the type are set. For example, where the attribute represents the chord information, a numerical value representing that the type of the attribute is the chord information and a numerical value representing the type of the chord at the position indicated by the sample position are set.

To the sample position, the position of a sample unit of the music data to which the metadata corresponds is set.

It is to be noted that, as regards the melody information, only the start position of each melody block is registered in the metadata, but as regards the chord information, only the start position of each chord is registered. However, information regarding the type of a melody block and the type of a chord for each beat may be registered in the metadata.

Further, in addition to the information described above, information which does not vary on the time axis such as the sampling frequency and the quantization bit number is registered as information of the entire music piece into the metadata. Furthermore, also information of the key and the scale of the music piece is registered into the metadata. It is to be noted that, where the key and the scale or the rhythm varies intermediately of the music piece, information of the sample position at which the variation occurs, and the key and the scale or the type of the rhythm is registered into the metadata.

Figure 12:
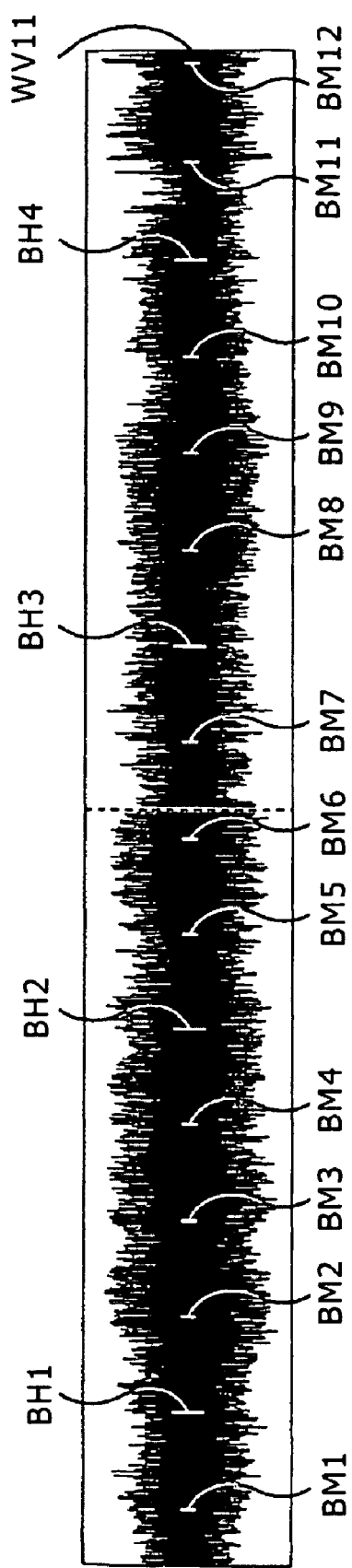
FIG. 12 is a view showing an example of display of beat information.
Figure 13:
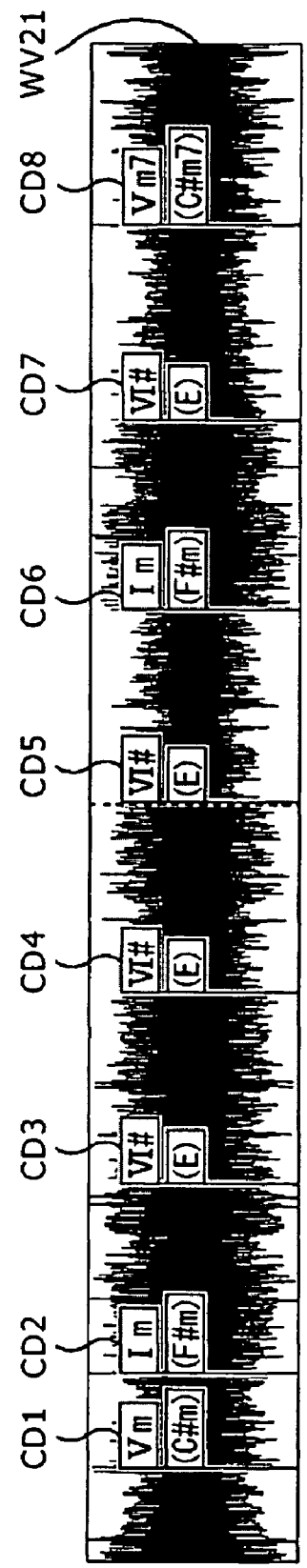
FIG. 13 is a view showing an example of display of chord information.
Figure 14:
FIG. 14 is a view showing an example of display of melody information.

FIGS. 12 to 14 illustrate examples of a display image of the metadata.

FIG. 12 shows an example of a display image where the beat information is displayed. In the example of FIG. 12, lines BH1 to BH4 each indicating the position of the bar head and lines BM1 to MB12 each indicating the position of a beat other than the bar head are shown in an overlapping relationship with a waveform WV11 of the music data. In order to make it possible to distinguish the position of the bar heads and the position of the other beats from each other, the lines BH1 to BH4 are displayed longer than the lines BM1 to BM12.

FIG. 13 shows an example of a display image where the chord information is displayed. In the example of FIG. 13, flags CD1 to CD8 each indicative of the start position of a chord are displayed in an overlapping relationship with a waveform WV21 of the music data. On the upper side of each flag, the type of the relative chord of the chord is indicated, and on the lower side of each flag, the type of the absolute chord of the chord determined from the frequencies of the key, scale and relative chord are displayed.

FIG. 14 shows an example of a display image where the melody information is displayed. In the example of FIG. 14, flags ML1 to ML4 each indicative of the start position of a melody block are displayed in an overlapping relationship with a waveform WV31 of the music data. At each flag, a character or a mark representative of the type of the melody block is displayed. The flag ML1 indicates the start position of the A melody and the flag ML2 indicates the start position of the B melody, and each of the flags ML3 and ML4 indicates the start position of a catchy part.

Now, details of the remix pattern data are described with reference to FIG. 15.

Figure 15:
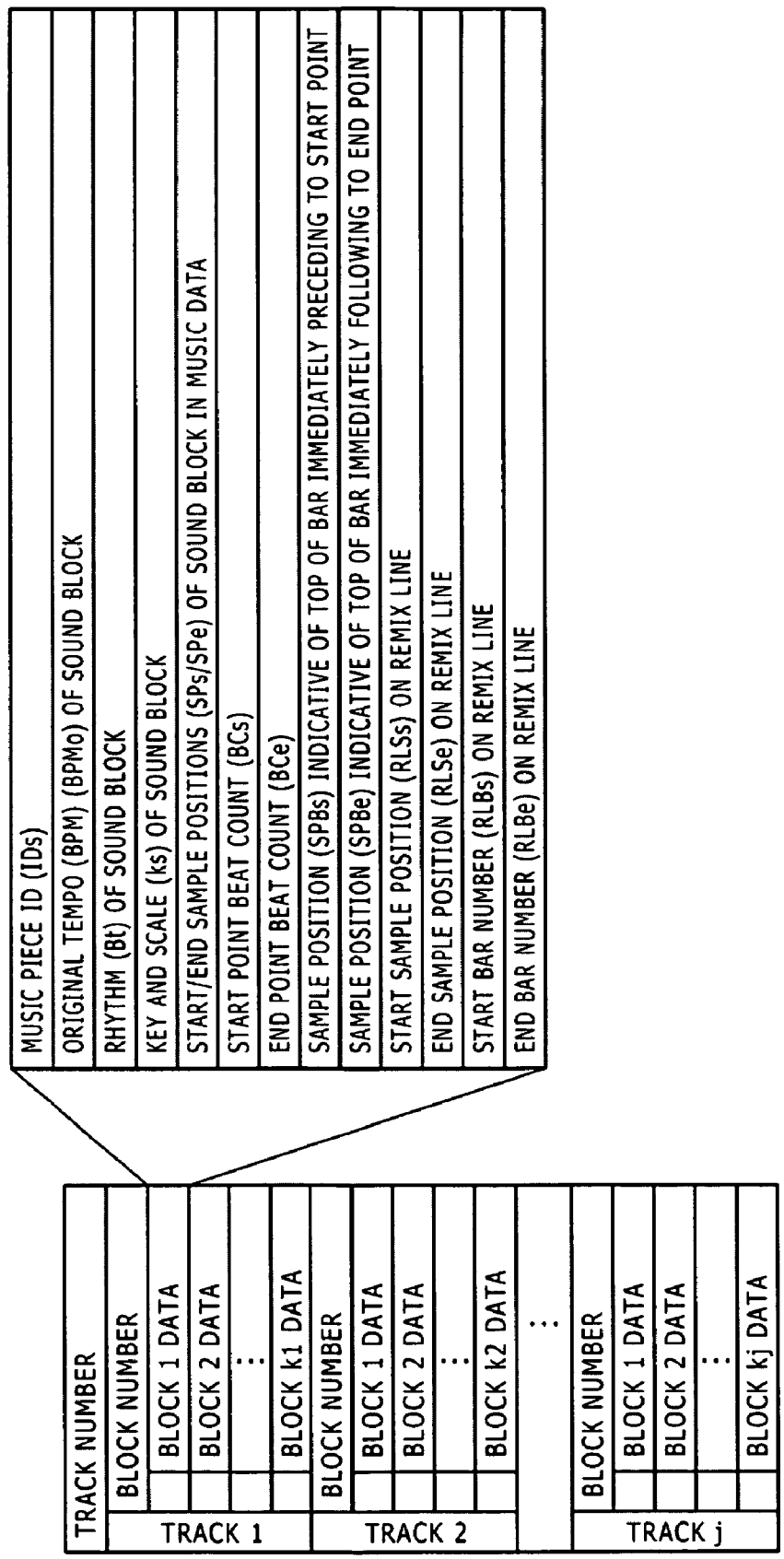
FIG. 15 is a view illustrating an example of a data configuration of remix pattern data.

FIG. 15 illustrates an example of the data structure of remix pattern data. Referring to FIG. 15, the remix pattern data illustrated include a track number representative of the number of tracks to be used and a number of track data equal to the number of tracks. Each track data includes a block number representative of the number of sound blocks included in the track, and a number of block data equal to the number of blocks. Further, each block data includes a music piece ID (IDs), an original tempo (BPMo) of the sound block, a rhythm (Bt) of the sound block, a key and scale (ks) of the sound block, start/end sample positions (SPs/SPe) of the sound block in the music data, a start point beat count (BCs), an end point beat count (BCe), a sample position (SPBs) indicative of the top of the bar immediately preceding to the start point, a sample position (SPBe) indicative of the top of the bar immediately following the end point, a start sample position (RLSs) on the remix line, an end sample position (RLSe) on the remix line, a start bar number (RLBs) on the remix line and an end bar number (RLBe) on the remix line.

IDs indicates an ID for uniquely specifying a music piece of an extraction source of the sound block, that is, the original music.

BPMo indicates an average BPM (Meat Per Minute) within the sound block in the original music piece.

Bt indicates the rhythm in the sound block in the original music piece. For example, such information as 4/4 (four-four time) or 3/4 (three-four time) is set to Bt.

ks indicates the key and the scale in the sound block in the original music piece. For example, such information as C major or A minor is set to ks. This information can be used to convert a relative chord in the sound block into an absolute chord.

SPs indicates the sample position at the start point of the sound block in the music data of the original music piece. SPe indicates the sample position at the end point of the sound block in the music data of the original music piece.

BCs indicates the position of the beat at the start point of the sound block in the original music piece. In particular, BCs indicates the bar and the beat of the original music piece at which the sound block starts. BCs is a variable of a structure having a Bar and a Beat as members, and the bar number of the start point of the sound block in the original music piece is set to BCs.Bar while the beat number of the start point of the sound block in the original music piece is set to BCs.Beat.

BCe indicates the position of the beat at the end point of the sound block in the original music piece. In particular, BCe indicates the bar and the beat of the original music piece at which a next sound block starts. Accordingly, the range from a beat indicated by BCs to another beat immediately preceding to the beat indicated by BCe is the range of the sound block in the original music piece. BCe is a variable of a structure having a Bar and a Beat as members, and the bar number of a beat immediately following the end point of the sound block in the original music piece is set to BCe.Bar while the beat number of a beat immediately following the end point of the sound block in the original music piece is set to BCe.Beat.

SPBs indicates the sample position of the top of a bar, which includes the start point of the sound block in the original music piece, in the music data. For example, where the value of BCs.Bar is set to 1, that is, where the sound block starts from the top of a bar, the sample position of a beat indicated by BCs.Bar and BCs.Beat is set to SPBs. On the other hand, where the value of BCs.Bar is set to 2, that is, where the sound block starts from the second beat of a bar, the sample position of the first beat of a bar indicated by BCs.Bar is set to SBPs.

SPBe indicates the sample position of the top of a bar, which is positioned immediately following the end point of the sound block in the original music piece, in the music data. In other words, the sample position of the top of a bar next to the bar which includes the end point of the sound block is set.

RLSs indicates the position of a sample from which the sound block starts on the remix line. It is to be noted that, to RLSs, a sample position after each sound block on the remix line is time-stretched in conformity with the master tempo is set.

RLSe indicates the position of a sample at which the sound block ends on the remix line. It is to be noted that, to RLSe, a sample position after each sound block on the remix line is time-stretched in conformity with the master tempo is set.

RLBs indicates the bar number of a bar from which the sound block is started on the remix line.

RLBe indicates the bar number of a bar from which the sound block is ended on the remix line.

Now, processing of the music editing system 101 is described with reference to FIGS. 16 to 42.

First, a remix editing process executed by the music editing system 101 is described with reference to a flow chart of FIG. 16. It is to be noted that this process is started, for example, when a starting instruction of a remix editing process is inputted through the operation section 214 by the user.

At step S1, the display section 215 displays an editing screen under the control of the display control section 232.

Figure 17:
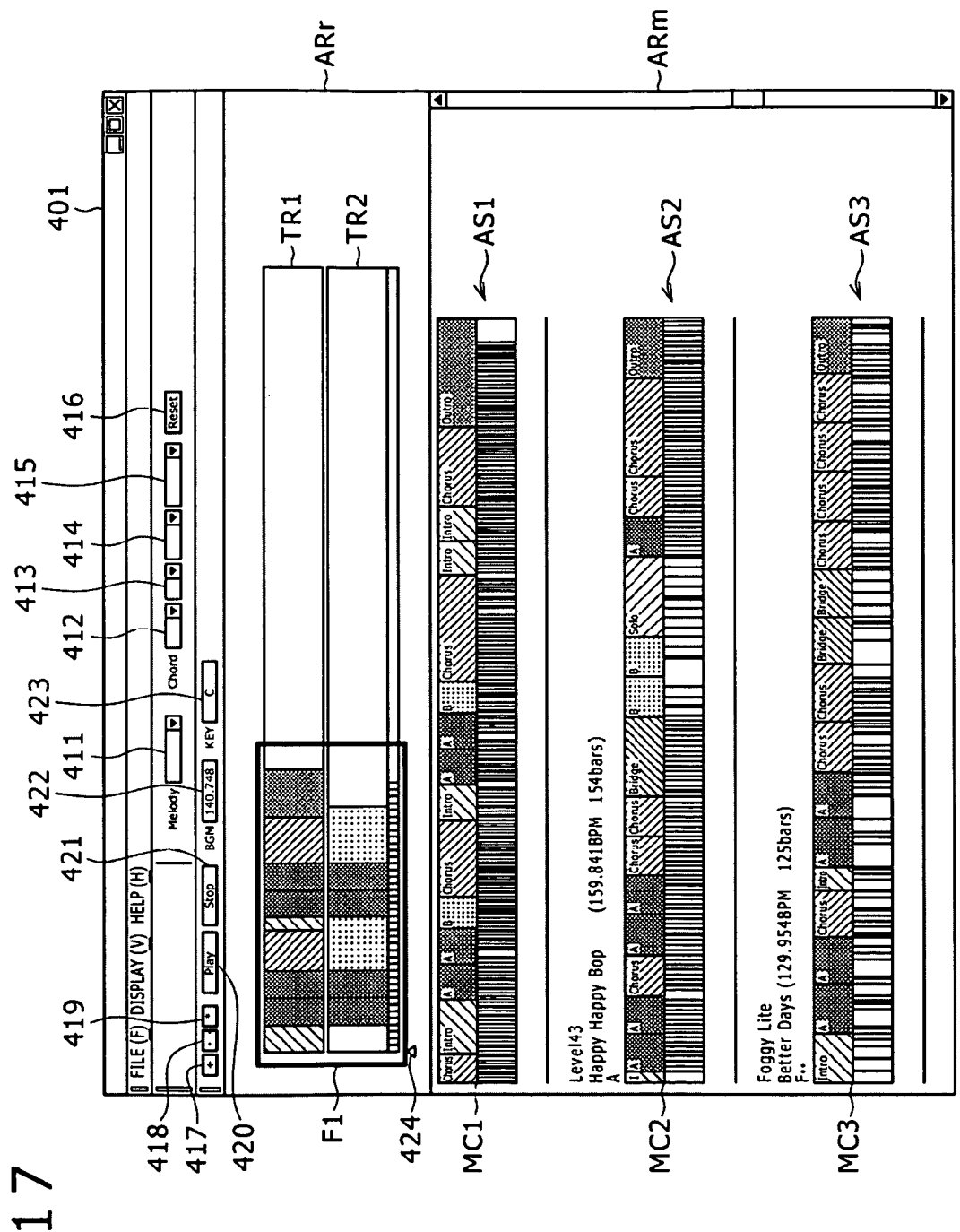
FIG. 17 is a schematic view showing an example of an editing screen image.

FIG. 17 shows an example of an editing screen image for performing remix editing. At an uppermost stage of a window 401 shown in FIG. 17, list boxes 411 to 415, buttons 416 to 421 and text boxes 422 and 423 are displayed in addition to buttons for performing an operation of the window 401.

The list boxes 411 to 415 are used to designate a search condition upon searching for a melody block or a chord as hereinafter described. The button 416 is used to reset the substance of the list boxes 411 to 415.

The buttons 417 to 419 are used to increase, decrease or restore the display size of music piece expansion charts MC1 to MC3 in a music piece list area ARm.

The button 420 is used to perform remix reproduction based on a remix line displayed in an remix area ARr, and the button 421 is used to stop the remix reproduction.

The button 422 is used to input a set value for the master tempo of the remix line.

The button 423 is used to input a set value for the master key of the remix line.

The window 401 includes two areas including the remix area ARr and the music piece list area ARm.

The remix area ARr is an area for performing working for remix editing, and a remix line is displayed visually in the remix area ARr. More particularly, tracks included in the remix line are displayed in a juxtaposed relationship in the vertical direction. The axis of abscissa of the tracks indicates the time axis direction, and the time elapses toward the right side.

FIG. 17 illustrates an example where a remix line is formed from two tracks, and two tracks including a track TR1 and another track TR2 are displayed in the remix area ARr. It is to be noted that, where the track number is so great that all tracks cannot be displayed at a time in the remix area ARr, the display image in the remix area ARr is scrolled so that all tracks can be displayed.

Figure 18:
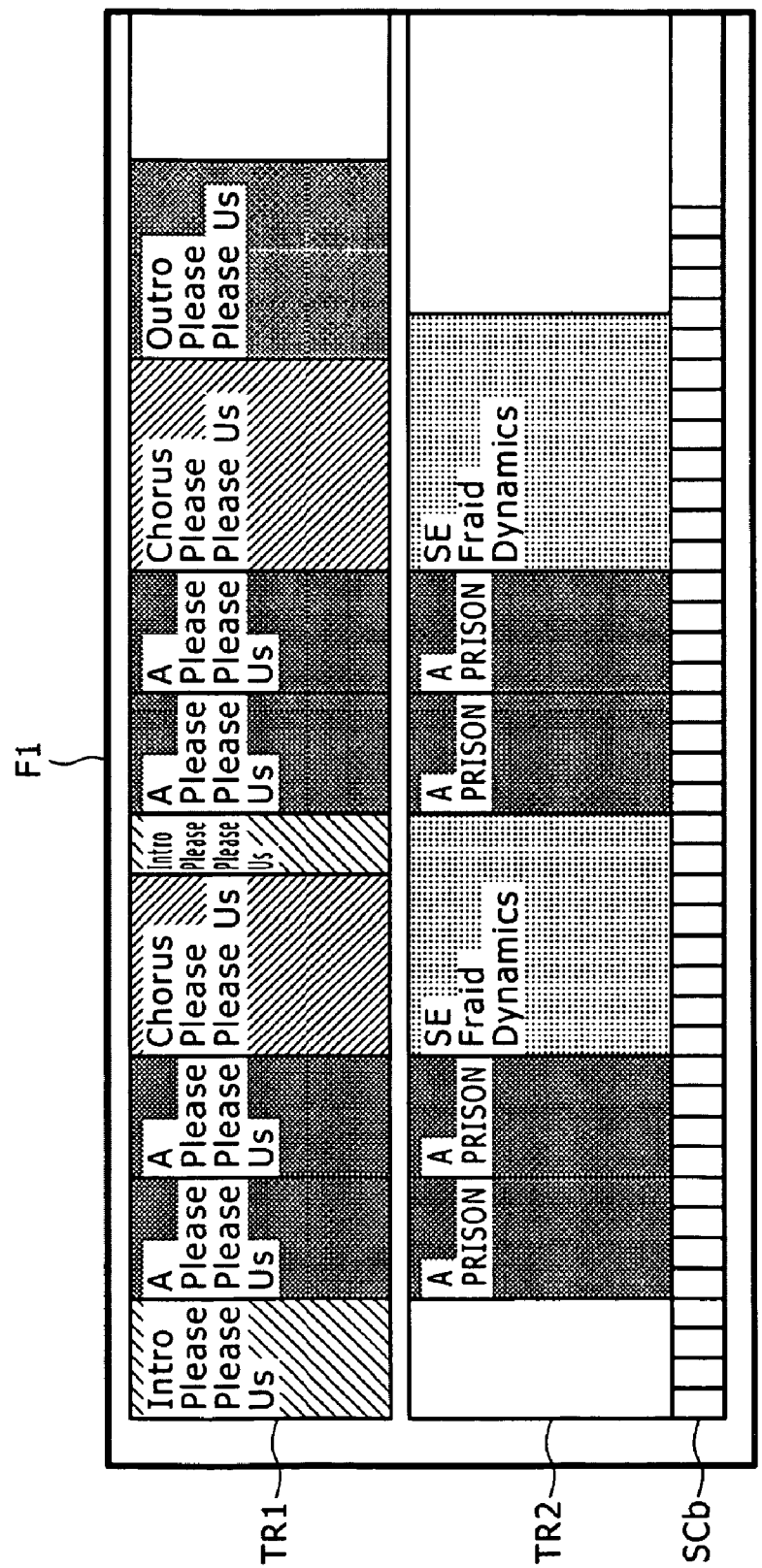
FIG. 18 is an enlarged view of tracks in a remix area in a display portion of the editing screen image shown in FIG. 17.

FIG. 18 is an enlarged view of a region of the remix area ARr shown in FIG. 17 which is surrounded by a framework F1. Referring to FIG. 18, in each track shown, sound blocks disposed in the track are displayed in a juxtaposed relationship in a time series from the left to the right. In each sound block, the music piece name of the original music piece of the sound block and the type of the melody block of the sound block are displayed. Further, each sound block is displayed in a color which indicates the type of the melody block thereof.

It is to be noted that, in FIG. 18, individual types of melody blocks are indicated by patterns therein.

The horizontal width of each sound block is set to a length corresponding to the number of beats included in the sound block. In particular, even if reproduction time periods of sound blocks in the original music piece are different, if the number of beats is equal among the sound blocks, then the sound blocks are displayed with an equal width. Consequently, even if the original tempo is different among the sound blocks, the positional relationship in the time axis direction of the sound blocks where the sound blocks are reproduced in accordance with the master tempo can be grasped clearly. Further, below the lowermost track, gradations SCb representative of the positions of bars on the remix line are displayed.

Below the gradations SCb, a pointer 424 (FIG. 17) indicative of the reproduction position of the remix line at present is displayed.

Referring back to FIG. 17, in the music piece list area ARm, a table of information relating to music pieces to which metadata are applied is displayed. In the music piece list area ARm, music piece areas corresponding to individual music pieces are juxtaposed in a vertical direction. In FIG. 17, three music piece areas including music piece areas AS1 to AS3 are displayed. It is to be noted that, where the number of music pieces is so great that all music piece areas corresponding to the music pieces cannot be displayed at a time in the music piece list area ARm, the display in the music piece list area ARm is scrolled so that the music piece areas corresponding to all music pieces can be displayed.

In each music piece area, information corresponding to a music piece such as, for example, a music piece name, an artist name, an average tempo (BPM), a bar number, a key and a scale and so forth is displayed. Further, in each music piece area, a music piece expansion chart indicative of melody expansion and chord progressions of a music piece is displayed. In FIG. 17, the music piece expansion chart MC1 is displayed in the music piece area AS1 and the music piece expansion chart MC2 is displayed in the music piece area AS2 while the music piece expansion chart MC3 is displayed in the music piece area AS3. The axis of the music piece expansion chart indicates the time axis direction, and the time elapses toward the right side.

Figure 19:
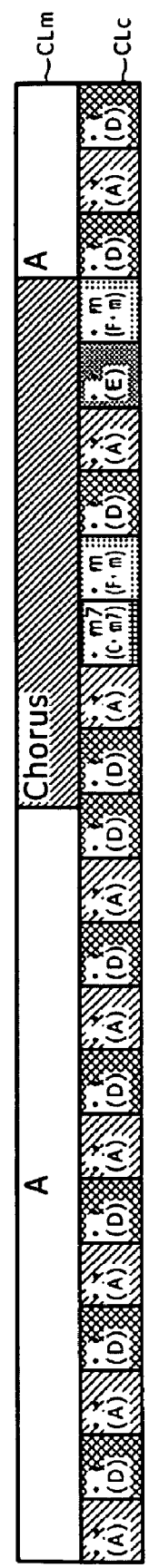
FIG. 19 is an enlarged view of a music expansion chart shown in FIG. 17.

FIG. 19 illustrates part of the music piece expansion chart in an enlarged scale. Referring to FIG. 19, in a melody block area CLm at an upper stage of the music piece expansion chart, melody blocks which form a music piece are displayed in a juxtaposed relationship in a time series from the left to the right in an order in which the memory blocks appear based on metadata of the corresponding music piece. In each block of the melody block area CLm, the type of the melody block is indicated, and different colors are used for different types of melody blocks. It is to be noted that, in FIG. 19, individual types of melody blocks are indicated by patterns therein. Further, the horizontal width of each block of the melody block area CLm is set to a length corresponding to the number of beats included in the melody block.

In a chord progression area CLc at a lower stage of the music piece expansion chart, chords which form the music piece are displayed in a juxtaposed relationship in a time series from the left toward the right based on the metadata of the corresponding music piece. In each block of the chord progression area CLc, a type of a relative chord and a type of an absolute chord determined from the relative chord and the key of the sound block are displayed. Further, different colors are used for different types of relative chords of the blocks of the chord progression area CLc. It is to be noted that, in FIG.

19, individual types of relative chords are indicated by patterns therein. Further, the horizontal width of each block of the chord progression area CLc is set to a length corresponding to the number of beats included in the interval of the chord.

Figure 20:
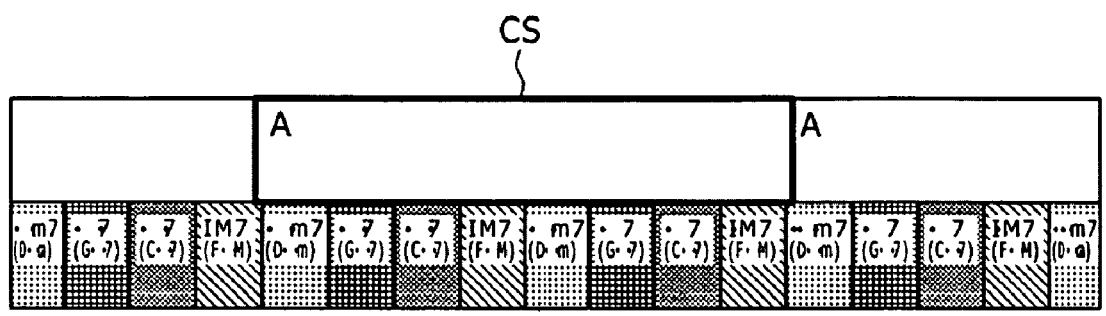
FIG. 20 is a view of the music expansion chart where a melody block is selected.
Figure 21:
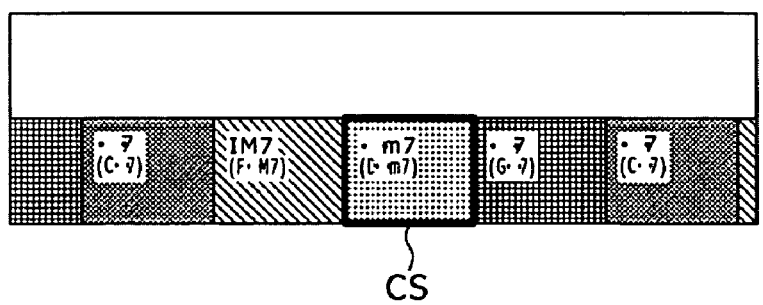
FIG. 21 is a view of the music expansion chart where a chord is selected.

Further, it is possible to select a desired block of the melody block area CLm using a cursor CS as seen in FIG. 20, or it is possible to select a desired block of the chord progression area CLc using a cursor CS as seen in FIG. 21.

Further, if a list box 411 is used as seen in FIG. 22 to designate a desired type of a melody block, then a block corresponding to the melody block of the designated type is displayed emphatically on the music piece expansion chart. It is to be noted that Chorus (catchy part) is designated as the type of a melody block, and in music expansion charts MC11 to MC13, blocks wherein the type of the melody block is Chorus are displayed emphatically.

Further, if list boxes 412 to 415 are used as seen in FIG. 23 to designate desired relative chords, then blocks corresponding to the relative chords of the designated type are displayed emphatically on the music piece expansion chart. For example, in FIG. 23, Im7 is designated as the type of a relative chord, and blocks wherein the type of the chord is Im7 are displayed emphatically on music expansion charts MC21 to MC23.

It is to be noted that, while, on the music expansion charts MC11 to MC13 of FIG. 22 and the music expansion charts MC21 to MC23 of FIG. 23, different colors are used for different types of melody blocks and different types of relative chords similarly as in FIG. 19 and so forth, in FIGS. 22 and 23, the patterns in the blocks are shown but not in a classified state in order to indicate each emphasized block clearly.

Further, the method of emphasizing each searched out block is not particularly limited to a predetermined method, but various methods may be used such as, for example, to display searched out blocks in a deep or bright color, to display the other blocks than searched out blocks in faint or dark color, to change the color of searched out blocks or to surround searched out blocks with framework lines. Further, an AND condition, an OR condition or the like may be used so that a plurality of types of melody blocks or chords may be searched in combination.

In this manner, music data can be handled in a unit of a melody block or a chord simply by using information of metadata. Accordingly, when compared with existing methods wherein sound is heard actually with ears or a waveform of music data is analyzed in accordance with a predetermined algorithm to perform a search, a range of music data corresponding to a desired chord or melody block can be searched more simply and accurately.

Referring back to FIG. 16, at step S2, the music editing system 101 starts a process corresponding to remix editing. In particular, the user would watch the editing screen image displayed on the display section 215 and operate the operation section 214 to select a desired portion of each music piece and dispose the selected portions at desired positions of the tracks of the remix line. The display section 215 updates the display substance of the editing screen image in response to the operation of the user based on information from the operation section 214.

Figure 24:
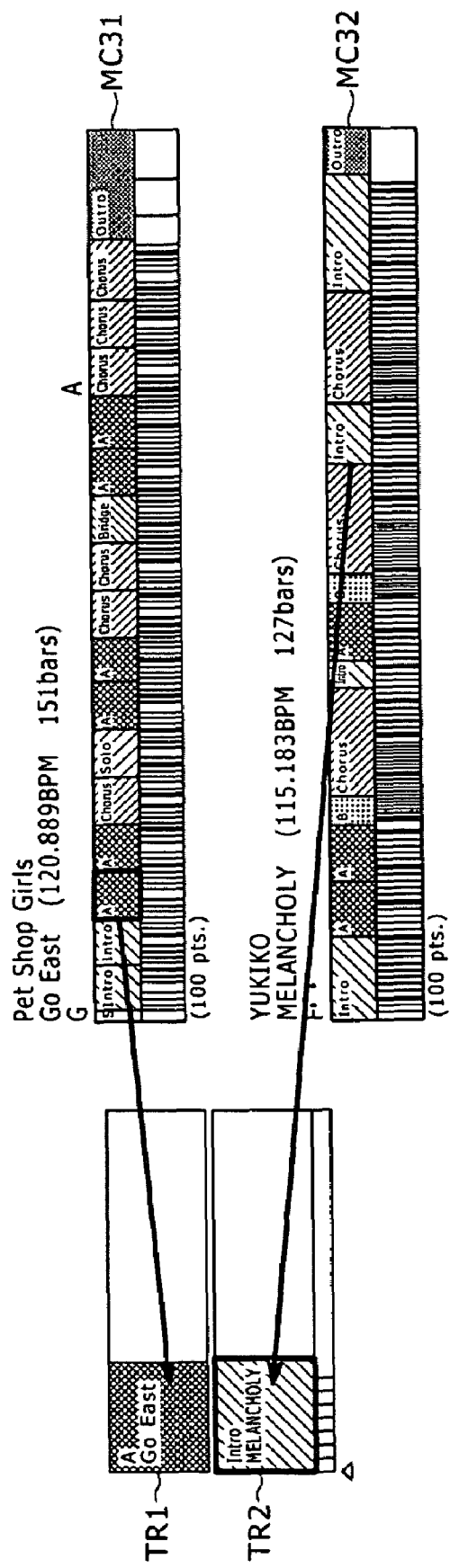
FIG. 24 is a schematic view illustrating a work of remix editing.
Figure 25:
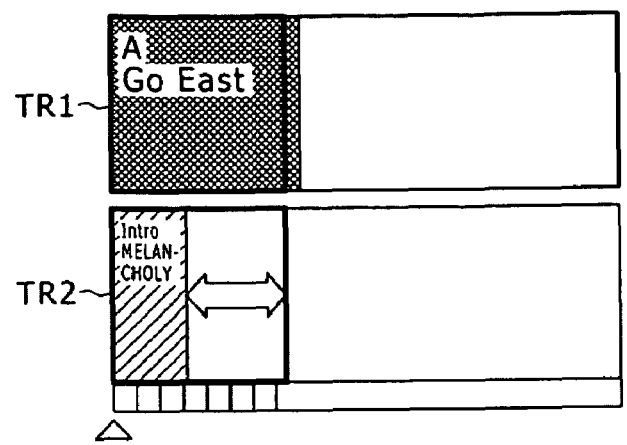
FIG. 25 is a schematic view illustrating an operation of changing the range to be included in a sound block.

For example, as seen in FIG. 24, the user can select a desired melody block as a sound material from within the melody block area in each of music expansion charts MC31 and MC32 and place the selected melody blocks at desired positions of the tracks TR1 and TR2 in the remix area ARr. It is to be noted that, in each of the sound blocks placed on the tracks TR1 and TR2, the type of the melody block corresponding to the sound block and the music piece name of the original music piece of the sound block are displayed. Further, as seed in FIG. 25, the user can narrow or widen the range included in each sound block placed on each track.

Figure 26:
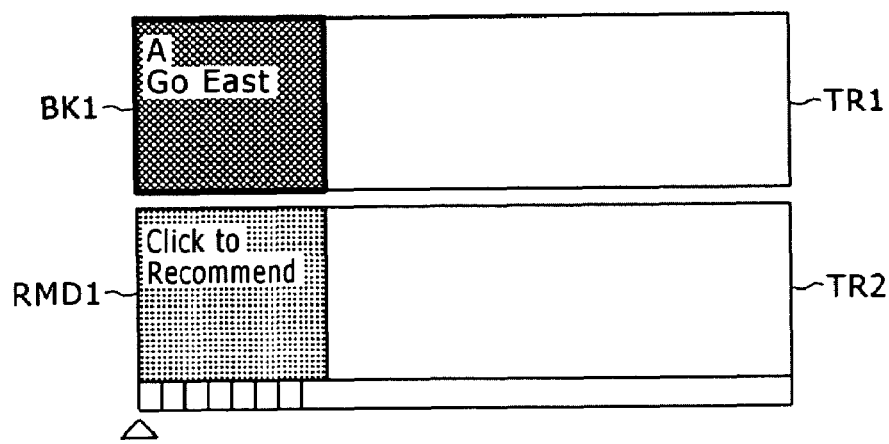
FIG. 26 is a schematic view illustrating an operation where overlapping sound material search is performed.

Referring back to FIG. 16, at step S3, the similarity calculation section 241 decides whether or not a request for search for a preferred sound material is issued. For example, if the user operates the operation section 214 to designate, as seen in FIG. 26, a sound block BK1 placed on the track TR1, designate an interval RMD1 of the track TR2 positioned at the same position in the time axis direction as the sound block BK1 and issue an instruction to search for a preferred sound material within the designated interval (hereinafter referred to as search interval) and the similarity calculation section 241 acquires the instruction from the operation section 214, then the similarity calculation section 241 decides that a request for search for a preferred sound material is issued. In this instance, the processing advances to step S4. In this instance, as hereinafter described, a search for a sound material which provides, when it is reproduced simultaneously with the sound block BK1, sound which harmonizes naturally with the sound block BK1 without giving an unfamiliar feeling is performed. Such search is hereinafter referred to as overlapping sound material search.

Figure 27:
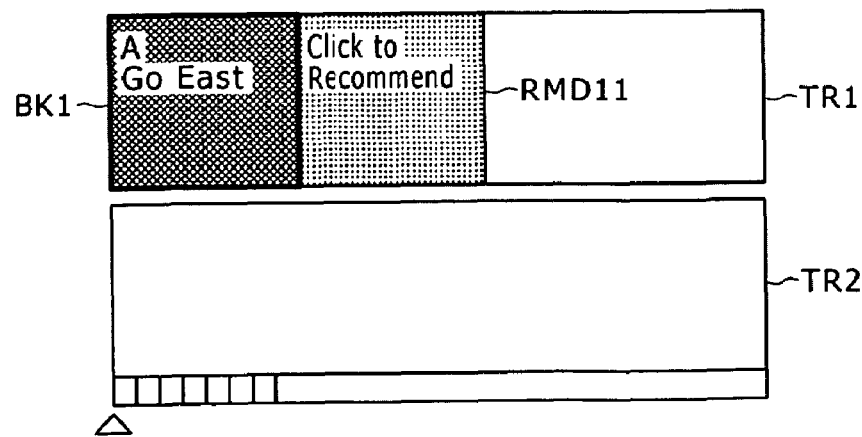
FIG. 27 is a schematic view illustrating an operation where connection sound material search is performed.

Further, if, for example, as seen in FIG. 27, the user operates the operation section 214 to designate the sound block BK1 placed on the track TR1, designate an interval RMD11 immediately following the sound block BK1 and issue an instruction to search for a preferred sound material within the designated search interval and the similarity calculation section 241 acquires the instruction from the operation section 214, then the similarity calculation section 241 decides that a request for search for a preferred sound material is issued. In this instance, the processing advances to step S4. In this instance, as hereinafter described, a search for a sound material which has chord progressions which sound naturally without giving an unfamiliar feeling when it is reproduced continuously to the sound block BK1 is performed. Such search is hereinafter referred to as connection sound material search.

It is to be noted that the sound block BK1 designated at step S3 is hereinafter referred to as designated block.

Referring back to FIG. 16, at step S4, the user interface processing section 211 executes a sound material search process. Here, details of the sound material search process are described with reference to a flow chart of FIG. 28.

At step S21, the similarity calculation section 241 determines a beat number n of a reference block. More particularly, when an overlapping sound material search is to be performed, the similarity calculation section 241 sets the designated block as a reference block and acquires metadata of an original music piece (hereinafter referred to as reference music piece) of the reference block from the music piece metadata storage section 217. Then, the similarity calculation section 241 determines the beat number n of the reference block based on the acquired metadata. On the other hand, when a connection sound material search is to be performed, the similarity calculation section 241 sets a melody block immediately following the designated block in the original music piece of the designated block as a reference block and acquires metadata of the reference music piece from the music piece metadata storage section 217. Then, the similarity calculation section 241 determines the beat number n of the reference block based on the acquired metadata.

At step S22, the similarity calculation section 241 expands relative chords in the reference block in an array a[ ] of the beat granularity. More particularly, the similarity calculation section 241 determines relative chords at beats of the reference block based on the metadata of the reference music piece and substitutes the determined relative chords into the array a[ ] of the length n. In particular, the relative chord at the top beat of the reference block is substituted into a[0], and the relative chord at the second beat is substituted into a[1]. Further, substitution is performed similarly until the relative chord at the last nth beat is substituted into a[n−1].

At step S23, the similarity calculation section 241 substitutes 0 into a variable s.

At step S24, the similarity calculation section 241 acquires metadata of the s+1th music piece (hereinafter referred to as search object music piece) from the music piece metadata storage section 217.

At step S25, the similarity calculation section 241 decides whether or not the s+1th music piece should be excepted from a search object. When the s+1th music piece, that is, the search object music piece, does not satisfy a predetermined exception condition, the similarity calculation section 241 decides that the n+1th music piece should not be excepted from a search object. In this instance, the processing advances to step S26.

At step S26, the similarity calculation section 241 expands relative chords of the s+1th music piece into an array b[ ] of the beat granularity. More particularly, the similarity calculation section 241 determines relative chords corresponding to beats of the search object music piece based on the metadata of the s+1th music piece, that is, the search object music piece and substitutes the determined relative chords into an array b[ ]. In particular, where the beat number of the search object music piece is m, the relative chord corresponding to the top beat of the search object music piece is substituted into b[0] and the relative chord corresponding to the second beat is substituted into b[1]. Further, substitution is performed similarly until the relative chord corresponding to the last mth beat is substituted into b[m−1].

At step S27, the sound material search section 231 executes a score calculation process. Here, details of the score calculation process are described with reference to FIG. 29.

At step S51, the similarity calculation section 241 substitutes 0 into a variable p.

At step S52, the similarity calculation section 241 decides whether or not the scales are equal. Here, the reference interval is an interval of the elements a[0] to a[n−1] of the array a[ ], and the search object interval is an interval of the elements b[p] to b[p+n−1] of the array b[ ]. If the similarity calculation section 241 decides based on the metadata of the reference music piece and the search object music piece that one of the reference interval and the search object interval exhibits the major while the other exhibits the minor, then it decides that the scales of the two music pieces are not equal to each other. In this instance, the processing advances to step S53.

At step S53, the similarity calculation section 241 converts the values of the array a[ ] into absolute chords.

At step S54, the similarity calculation section 241 converts the values of the array b[ ] into absolute chords.

On the other hand, if both of the reference interval and the search object interval exhibit the major or the minor at step S52, then the similarity calculation section 241 decides that the scales of the two music pieces are equal to each other. In this instance, the processes at steps S53 and S54 are skipped, and the processing advances directly to step S55.

At step S55, the similarity calculation section 241 determines the similarly between the reference interval and the search interval. The similarity calculation section 241 decides the similarity Rab between the reference interval and the search object interval in accordance with the following expressions (2) and (3):

$$Rab = \sum_{i=0}^{n-1} f(a[i], b[p+i]) \quad (2)$$

f(x,y)=0 where the frequencies of the relative chords or the roots of the absolute chords are same and two intervals exhibit a relationship of a major chord and a minor chord but $$f(x,y) = \text{Matrix}R[x][y] \text{ in any other case} \quad (3)$$

where MatrixR[x][y] indicates the value of the element at the xth row of the yth column of a predetermined similarity matrix which defines the similarity between the chords. The similarity matrix is a matrix which defines the similarity between chords, and a point based on the similarly between the chords is set at each place of the matrix. Here, several examples of the similarity matrix are described.

FIG. 30 shows an example of a similarity matrix used where both of the reference interval and the search object interval exhibit the major. It is to be noted that the row numbers and the column numbers of the similarity matrix of FIG. 30 are indicated by the frequencies of the relative chords. Accordingly, where the frequencies of the relative chords of the element a[i] and the element b[i+p] are equal to each other, the highest point, that is, 10 points, are provided. Further, taking the presence of substitute chords which provide similar sounds into consideration, where the relative chords of the element a[i] and the element b[i+p] have a relationship of substitute chords to each other, that is, where one of the elements is a relative chord and the other element is a substitute chord to the relative chord, or more strictly where the element a[i] and the element b[i+p] have a relationship of substitute chords to each other when the keys in the reference interval and the search object interval are adjusted to each other, 5 points are provided. For example, where the frequency of the relative chord of the element a[i] is I and the frequency of the relative chord of the element b[i+p] is III, 5 points are provided. In any other case which corresponds to a blank place in the matrix of FIG. 30, 0 point is provided.

FIG. 31 illustrates an example of the similarity matrix which is used where both of the reference interval and the search object period indicate the minor. It is to be noted that the row numbers and the column numbers of the similarity matrix of FIG. 31 are indicated by the frequencies of the relative chords similarly to those of the similarity matrix of FIG. 30. Also in the similarity matrix of FIG. 31, where the frequencies of the relative chords of the element a[i] and the element b[i+p] are equal to each other, the highest point of 10 is provided similarly as in the similarity matrix of FIG. 30. Further, where the relative chords of the element a[i] and the element b[i+p] have a relationship of substitute chords to each other, 5 points are provided. In any other case which corresponds to a blank place in the matrix of FIG. 31, 0 point is provided. It is to be noted, however, that, since substitute chords of the major and the minor are different from each other, the matrices of FIGS. 30 and 31 are different from each other.

FIG. 32 illustrates an example of the similarity matrix which is used where the scales in the reference interval and the search object interval are different from each other. The row numbers and the column numbers of the similarity matrix of FIG. 32 are indicated by the tone names of the roots of the absolute chords. In the similarity matrix of FIG. 32, where the roots of the absolute chords of the element a[i] and the element b[i+p] are same, 10 points are provided, but in any other case which corresponds to a blank place in the matrix of FIG. 32, 0 point is provided. In this manner, where the scales in the element a[i] and the element b[i+p] are different each other, the similarity is determined based on the absolute chords. This is because, where the scales in the element a[i] and the element b[i+p] are different from each other, even if the types of the relative chords are same, if the relative chords are converted into absolute chords, then the types of the chords become different from each other because of the difference in scale whereas, even if the types of the relative chords are different from each other, if the relative chords are converted into absolute chords, then the types of the chords sometimes become same as each other.

In this manner, where both of the reference interval and the search object interval exhibit the major or the minor, the similarity degree is calculated based on the relative positions of the roots of the chords with respect to the keynotes of the scales of the intervals. Then, where one of the two intervals indicates the major and the other interval indicates the minor, the similarity between the two intervals is calculated based on the pitches of actual tones of the chords.

It is to be noted that, as indicated by the expression (3) given hereinabove, where the scales in the reference interval and the search object interval are same, if the frequencies of the relative chords of the element a[i] and the element b[i+p] are equal and the chords have a relationship of a major chord and a minor chord therebetween, or where the scales in the reference interval and the search object interval are different from each other, if the roots of the absolute chords of the element a[i] and the element b[i+p] are same and the chords have a relationship of a major chord and a minor chord therebetween, then the point is set to 0. This is because, for example, even if the relative chords are the same chord of I, if one of the relative chords is the chord I while the other relative chord is the chord Im, then the third tone of the former becomes a tone of the major third from the root and the third tone of the latter becomes a tone of the minor third from the root, and since the two tones are different by one semitone, if the two chords are sounded simultaneously, then they sound as a dischord. It is to be noted that, where the frequencies of the relative chords or the roots of the absolute chords of the element a[i] and the element b[i+p] are different from each other, even if the two chords have a relationship of a major chord and a minor chord therebetween, they may not necessarily make a dischord, and therefore, the point is determined based on the similarity matrix.

It is to be noted that FIGS. 30 to 32 illustrate examples of the similarity matrix, and the similarity matrix is not limited to the examples. For example, the points to be provided may be classified more specifically based on the combination of chords. Or, the similarity matrix for the minor may be classified further finely based on detailed classifications of the scale such as a melodic minor scale, a harmonic minor scale or a natural minor scale. It is to be noted that, even if the types of the similarity matrix increase, if the similarity matrices are prepared once, then the similarity can be determined in accordance with the same expressions (2) and (3) given hereinabove.

Referring back to FIG. 29, at step S56, the similarity calculation section 241 decides whether or not the similarity exceeds a threshold value T. If it is decided that the similarity exceeds the threshold value T, that is, if the similarity in chord progression between the reference interval and the search object interval is high, then the processing advances to step S57.

At step S57, the score calculation section 242 calculates the score. In particular, the similarity calculation section 241 supplies the similarity calculated thereby to the score calculation section 242. The score calculation section 242 multiplies the received similarity by a weight based on, for example, a predetermined condition to calculate a score. For example, if the reference music piece and the reference music piece have an element which indicates that the similarity degree is low, for example, if the difference in tempo between the reference music piece and the search object music piece is higher than a predetermined threshold value or the scales of the reference music piece and the search object music piece are different from each other, then the similarity is multiplied by a weight lower than 1 so as to lower the similarity.

At step S58, the score calculation section 242 registers a result of the search. In particular, the score calculation section 242 classifies the search object intervals for which the score is calculated and the scores for individual music pieces and stores them into the music piece metadata storage section 217.

On the other hand, if it is decided at step S56 that the similarity does not exceed the predetermined threshold value, that is, if the similarity in chord progression between the reference interval and the search object interval is low, then the processes at steps S57 and S58 are skipped, and the processing advances directly to step S59. In other words, the score of the search object interval remains set to 0.

At step S59, the similarity calculation section 241 increments the value of the variable p by one.

At step S60, the similarity calculation section 241 decides whether or not p+n exceeds the magnitude m of the array b[ ]. If it is decided that p+n does not exceed the magnitude m of the array b[ ], that is, if the interval from the pth to the last beat of the search object music piece is longer than the beat number n in the reference interval, then the processing returns to step S55.

Figure 33:
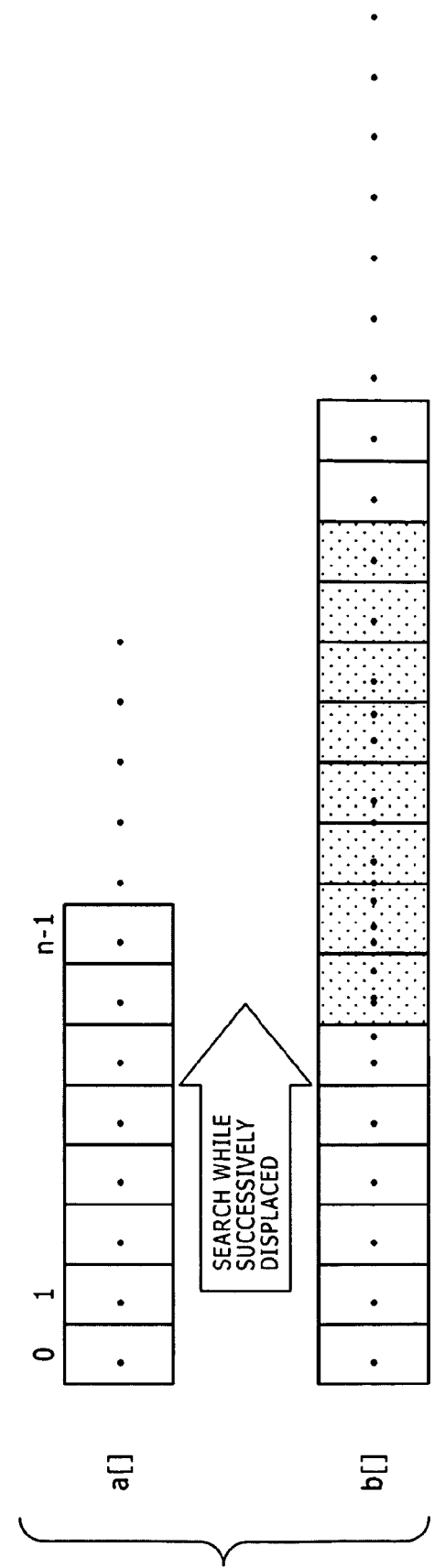
FIG. 33 is a view illustrating movement of a search object interval.

Thereafter, the processes at steps S55 to S60 are repetitively executed until after it is decided at step S60 that p+n exceeds the magnitude m of the array b[ ]. In particular, while the search object interval (interval from b[p] to b[p+n−1]) is successively shifted by one beat from the top of the array b[ ] as seen in FIG. 33, the score based on the similarity between each search object interval and the reference interval (interval from a[0] to a[n]) is calculated. Then, an interval of the search object music piece which exhibits a high similarity in chord progression to the reference interval.

If it is decided at step S60 that the value of p+n exceeds the magnitude of the array b[ ], that is, if the interval from the pth to the last beat of the search object music piece becomes lower than the beat number n in the reference interval, then the score calculation process is ended.

Referring back to FIG. 28, the similarity calculation section 241 decrements the value of n by one at step S28.

At step S29, the similarity calculation section 241 decides whether or not n is equal to or higher than a threshold value L. If it is decided that n is equal to or higher than the threshold value L, then the processing returns to step S27.

Thereafter, the processes at steps S27 to S29 are executed repetitively until after it is decided at step S29 that n is lower than the threshold value L. In particular, while the length of the reference interval is successively reduced by one beat until after the value of n becomes lower than the threshold value L, the search for an interval having a high similarity in chord progression to the reference interval is executed repetitively.

On the other hand, if it is decided at step S29 that n is lower than the threshold value L, then the processing advances to step S30.

Further, if the search object music piece satisfies the predetermined exception condition, then the similarity calculation section 241 decides at step S25 that the s+1th music piece should be excepted from a search object, and the processing advances to step S30 while the processes at steps S26 to S29 are skipped. It is to be noted that the condition of a music piece which should be excepted from a search object is set by the user as occasion demands, and is, for example, a music piece same as the reference music piece, a music piece which has a rhythm different from that of the reference music piece, and a music piece whose difference in tempo from the reference music piece is equal to or greater than a predetermined threshold value.

At step S30, the similarity calculation section 241 increments the value of s by one.

At step S31, the similarity calculation section 241 decides whether or not the value of s is equal to the total music piece number. If it is decided that the value of s is not equal to the total music number, that is, if the process is not yet completed for all music pieces whose metadata are stored in the music piece metadata storage section 217, then the processing advances to step S32.

At step S32, the similarity calculation section 241 returns the value of n to the beat number of the reference block.

Thereafter, the processing returns to step S24 so that the processes at steps S24 to S31 are repetitively executed until it is decided at step S31 that the value of s is equal to the total music piece number.

On the other hand, if it is decided at step S31 that the value of s is equal to the total music piece number, that is, if the process has been performed for all music pieces whose metadata are stored in the music piece metadata storage section 217, then the processing advances to step S33.

At step S33, the display section 215 sorts and displays the music pieces in the descending order of the score, and then the sound material research process is ended. More particularly, the display control section 232 reads out the score of all music pieces from the music piece metadata storage section 217 and totalizes the scores for the individual music pieces. The display section 215 re-arranges the music pieces in the music piece list area ARm in the descending order of the score and displays the music pieces of the re-arranged order under the control of the display control section 232.

Figure 34:
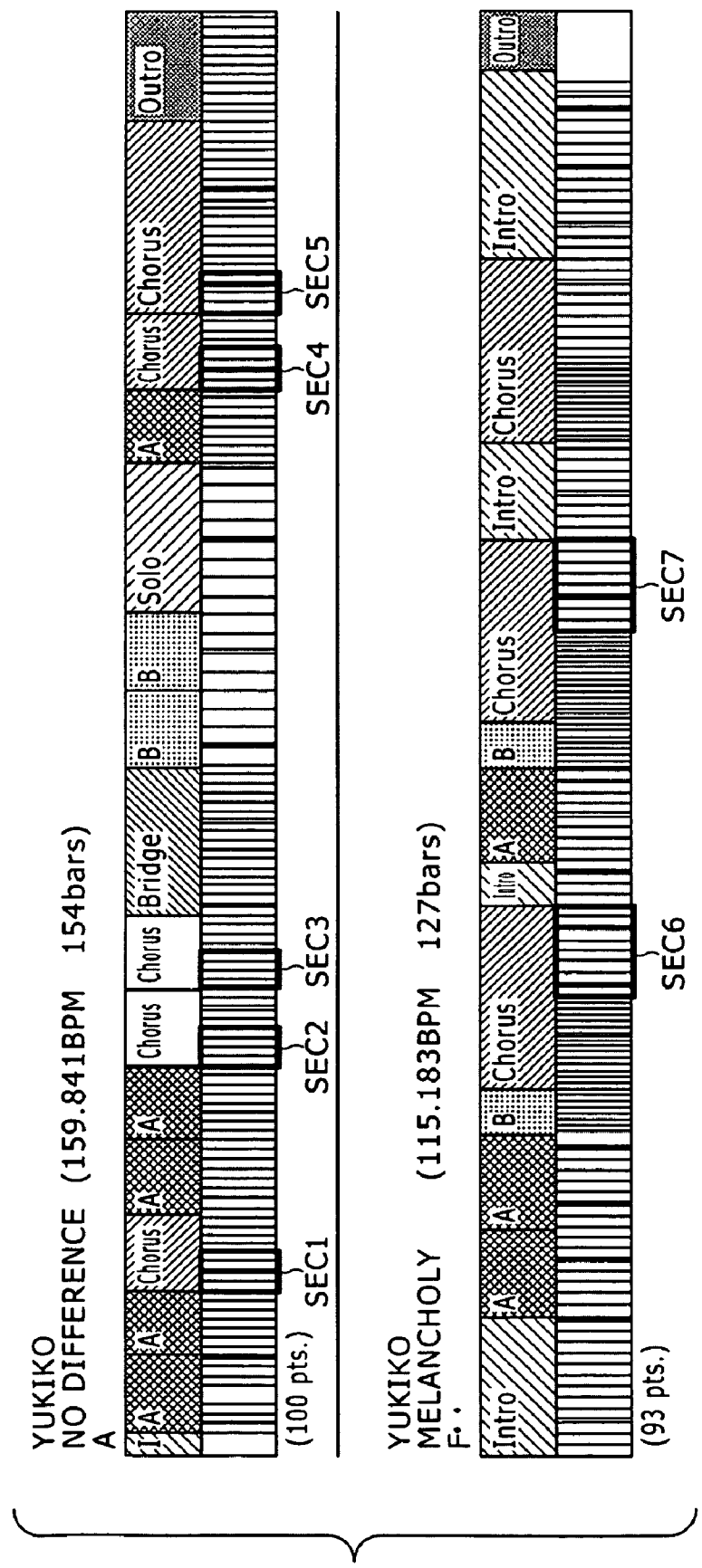
FIG. 34 is a schematic view showing an example of a display image of a search result of a sound material search.
Figure 35:
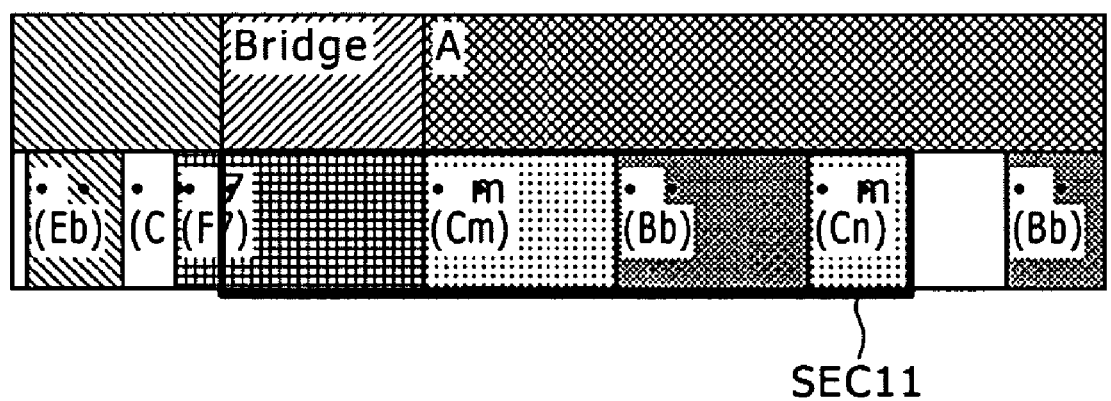
FIG. 35 is a schematic view showing another example of a display image of a search result of a sound material search.

At this time, as seen in FIG. 34, in the chord progression region of the music piece expansion chart, intervals SEC1 to SEC8 within which the score is equal to or higher than the predetermined threshold value are displayed emphatically. Further, at a left lower portion with respect to the music piece expansion chart, the total value of the score of the corresponding music piece is displayed. Furthermore, in order to distinguish those intervals wherein the score is calculated based on absolute chords from those intervals in which the score is calculated based on relative chords, for example, an underline is displayed within an interval SEC11 which is displayed emphatically as seen in FIG. 35.

As described above, sound materials which are suitable for reproduction in an overlapping relationship with a designated block or suitable for reproduction in a connected relationship to a designated block can be searched out simply from among a large number of music pieces without performing such a work as to actually confirm with the ears. Thereafter, the user can search out a sound material having sound which the user wants to represent from among the narrowed down candidates, for example, by actually disposing the candidates on the tracks and hearing them with the ears for confirmation.

Further, since the similarity is calculated taking the presence of a substitute chord into consideration as described above, even if the chord progressions of the search object interval do not coincide with those of the reference interval, a sound material having sound similar to that in the reference interval can be determined.

Furthermore, since the sound blocks of individual tracks are reproduced with the beat positions thereof adjusted, the similarity in chord progression between the reference interval and the search object interval can be determined by comparing the chord progressions in a unit of a beat without taking the reproduction time of the music piece in each interval into consideration.

It is to be noted that, while, in the embodiment described above, the chord progressions are compared with each other in a unit of a beat, the accuracy in comparison may be further raised by comparing the chord progressions in a unit of an eighth note, a sixteenth note or the like. In this instance, the chord progressions can be determined with a resolution such as a unit of an eighth note or a sixteenth note based on the sample position of each chord of metadata.

Referring back to FIG. 16, if it is decided at step S3 that a request for search for a preferred sound material is not issued, then the process at step S4 is skipped, and the processing advances to step S5.

At step S5, the remix pattern production section 252 decides whether or not a request to store the remix pattern is issued. For example, if the user wants to store the remix pattern produced in the remix area ARr and inputs an instruction to store the remix pattern into the remix pattern production section 252 through the operation section 214, then the remix pattern production section 252 decides that an instruction to store the remix pattern is issued, and the processing advances to step S6.

At step S6, the remix pattern production section 252 produces remix pattern data. In particular, the remix pattern production section 252 produces remix pattern data having the data structure described hereinabove with reference to FIG. 15 based on the remix pattern produced in the remix area ARr and the metadata of the original music piece of the sound blocks disposed in the remix pattern.

Figure 36:
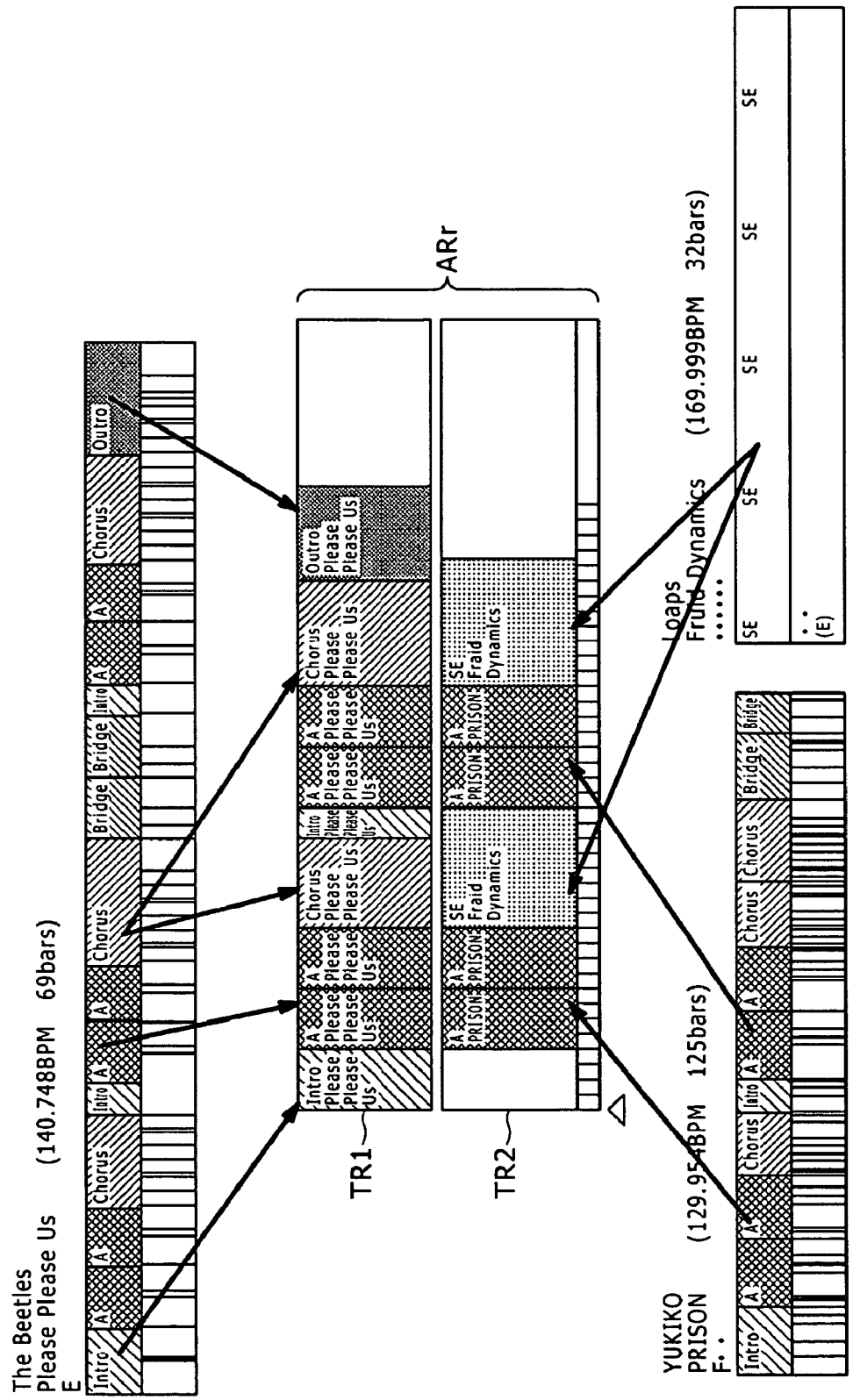
FIG. 36 is a schematic view illustrating an example of production of a remix pattern.

For example, where a remix pattern wherein sound materials extracted from three music pieces are disposed on tracks TR1 and TR2 in the remix area ARr as seen in FIG. 36 is produced, the track number of the remix pattern data of FIG. 15 is set to 2 and track data corresponding to the tracks TR1 and TR2 are produced. Further, the track number of track data on the track TR1 is set to 9 which is the number of sound blocks disposed on the track TR1, and nine sound block data are produced. The track number of track data on the track TR2 is set to 6 which is a number of sound blocks disposed on the track TR2, and six block data are produced. Then, in each of the items of the block data, metadata of the original music piece of each sound block and the value and so forth which are positioned on the position of each sound block on the remix line and so forth are set.

The remix pattern production section 252 produces a remix pattern file in which the produced remix pattern data are recorded and stores the produced remix pattern data into the remix pattern storage section 218.

Referring back to FIG. 16, if it is decided at step S5 that a request to store the remix pattern is not issued, then the process at step S6 is skipped, and the processing advances to step S7.

At step S7, the display control section 232 decides whether or not a request to end the editing process is issued. If it is decided that a request to end the editing process is not issued, then the processing returns to step S3 so that the processes at steps S3 to S7 are executed repetitively until after it is decided at step S7 that a request to end the editing is issued.

If, for example, the user inputs an instruction to end the editing process to the display control section 232 at step S7 through the operation section 214, then the display control section 232 decides that a request to end the editing process is issued, and ends the remix editing process.

In this manner, the user can produce a remix music piece simply by disposing desired portions of different music pieces at desired positions of individual tracks of the remix area ARr. It is to be noted that, while the user performs remix editing, the user can actually confirm the sound of the remix music piece by performing remix reproduction hereinafter described based on the remix pattern produced on the remix line.

Now, a remix reproduction process executed by the music editing system 101 is described with reference to a flow chart of FIG. 37. It is to be noted that the remix reproduction process is started, for example, when the user operates the operation section 214 to designate a desired one of remix pattern files stored in the remix pattern storage section 218 and inputs an instruction for remix preproduction based on remix pattern data recorded in the designated remix pattern file.

At step S101, the synchronous reproduction control section 271 and the sound mixing section 272 perform an initialization process. Consequently, the states of the synchronous reproduction control section 271 and the sound mixing section 272 are initialized.

At step S102, the remix pattern reading section 251 reads in a remix pattern file designated by the user. It is to be noted that, where a remix pattern file is not designated by the user, for example, the remix pattern reading section 251 selects a suitable one of the remix pattern files stored in the remix pattern storage section 218 and reads in the selected remix pattern file.

At step S103, the track production section 264 produces a number of sound signal production sections 282 equal to the required number of tracks. In other words, the track production section 264 produces a number of sound signal production sections 282 equal to the number of tracks indicated by the remix pattern data stored in the remix pattern file read in.

At step S104, the remix pattern reading section 251 expands the remix pattern into a memory. For example, the remix pattern reading section 251 shapes the read in remix pattern data so as to have a predetermined format and then expands the remix pattern data into the RAM 116.

At step S105, the remix reproduction control section 253 sets a master key and a master tempo. For example, the user would operate the operation section 214 to set values for the master key and the master tempo. The operation section 214 notifies the remix reproduction control section 253 of the set values for the master key and the master tempo.

The reproduction speed control section 261 sets the value of the master tempo to the master beat production section 281. Consequently, the master beat production section 281 starts production of a master tempo with the set master tempo.

The pitch control section 262 sets the value of the master key to the sound signal production sections 282.

It is to be noted that the master key and the master tempo may not be set by the user but, for example, the key and the tempo of a main music piece from among original music pieces of sound blocks disposed on the remix line (for example, a music piece designated by the user or an original music piece of the first sound block of the first track of the remix line) may be set as the master key and the master tempo, respectively. Or, for example, an average value of the original tempo in music piece blocks of a predetermined track (for example, the first track) of the remix line may be used as the master tempo.

The remix pattern reading section 251 calculates the values of the start sample positions (RLSs) on the remix line and the end sample positions (RLSe) on the remix line of the block data of the remix pattern data based on the ratio between the master tempo and the original tempo (BPMo) of the corresponding sound block. Then, the remix pattern reading section 251 rewrites the values described above with the thus calculated values.

At step S106, the remix processing section 212 executes a remix reproduction control process and then ends the remix reproduction process. Here, details of the remix reproduction control process are described with reference to flow charts of FIGS. 38 to 40.

Figure 40:
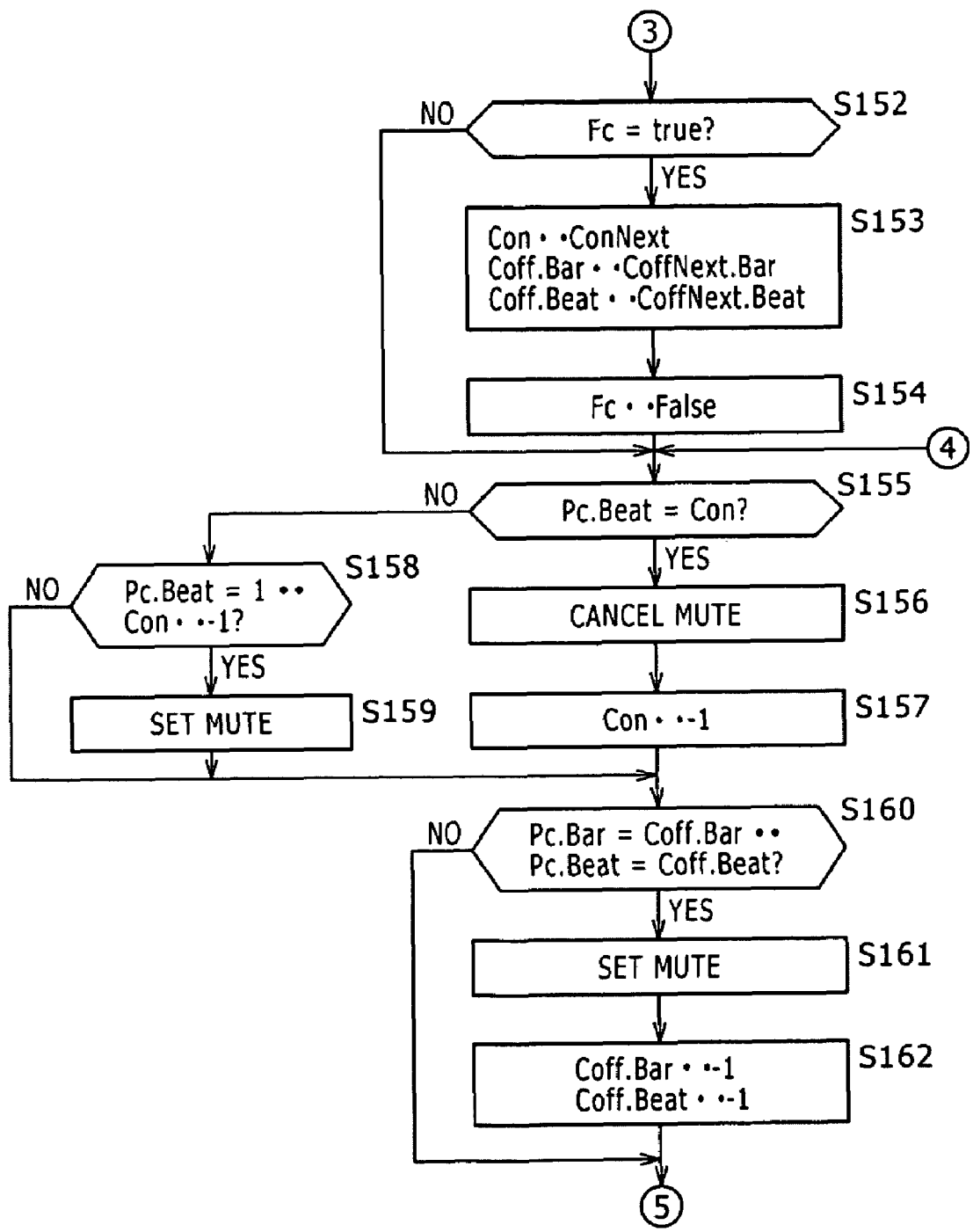

It is to be noted that the flow charts of FIGS. 38 to 40 illustrate a process executed for one track, and actually, the process illustrated in FIGS. 38 to 40 is executed parallelly for a number of tracks of the remix line. Further, in the description given below with reference to FIGS. 38 to 40, a sound signal production section 282 is one of the sound signal production sections which corresponds to an object of processing in the description given below with reference to the flow charts.

Referring first to FIG. 38, at step S131, the reproduction pattern control section 263 sets the value of PC.Bar to −1, sets the value of Pc.Beat to 0, sets the value of Fc to false, sets the value of Con to −1, sets the value of Coff.Bar to −1, and sets the value of Coff.beat to −1.

Pc is a variable of a structure which has Bar and Beat as members thereof. Every time the master beat production section 281 produces a master beat, when the value of Pc.Beat is lower than the rhythm number of the remix line, the master beat production section 281 increments the value of Pc.Bar by one and increments the value of Pc.Bar by one. Thus, Pc is a variable which represents what numbered bar the reproduction position of the remix line at present is.

Fc represents a flag indicative of whether or not changeover of a sound block should be performed. If the value of Fc is set to true, this signifies that changeover of a sound block should be performed at a timing at which the reproduction position of the remix line advances to a next bar, but if the value of Fc is set to false, this signifies that changeover of a sound block is not performed at a timing at which the reproduction position of the remix line advances to a next bar.

Con represents a variable to which the beat number of the start point of the sound block is set. It is to be noted that, where the value of Con is set to −1, this indicates that Con is in an initialized state and has no particular value set therein.

Coff is a variable of a structure having Bar and Beat as members thereof, and the position of a beat immediately following the end point of a sound block in the remix line is set to Coff. In particular, the bar number of a beat immediately following the end point of a sound block is set to Coff.Bar, and the beat number of a beat immediately following the end point of the sound block is set to Coff.Beat. It is to be noted that, where Coff.Bar and Coff.Beat are reset to −1, this indicates that Coff is in an initialized state and has no particular value set therein.

Further, the reproduction pattern control section 263 sets the rhythm of the remix line to the master beat production section 281. It is to be noted that the rhythm of the remix line may be, for example, set by the user or may be registered in advance in the remix line data. Or the rhythm of the first sound block of the first track of the remix line may be set.

At step S132, the reproduction pattern control section 263 decides based on the remix pattern data whether or not a new sound block exists later than 2 bars later than the current reproduction position. In other words, the reproduction pattern control section 263 decides whether or not a new sound block exists later than the Pc.Bar+2th bar. If it is decided that a new sound block exists later than 2 bars later than the current reproduction position, then the processing advances to step S133.

At step S133, the reproduction pattern control section 263 acquires information of a sound block nearest to the current reproduction position later than 2 bars later than the current reproduction position. In other words, the reproduction pattern control section 263 acquires block data of the remix pattern data corresponding to a sound block nearest to the current reproduction position later than 2 bars later than the current reproduction position.

At step S134, the reproduction pattern control section 263 sets the start position of the sound block, from which the information is acquired, to Pn. Pn is a variable of a structure having Bar and Beat as members thereof similarly to Pc. It is to be noted that, where the value of Pn.Bar and Pn.Beat are set to −1, this signifies that Pn is in an initialized state and has no particular value set therein.

The reproduction pattern control section 263 sets the start bar number (RLBs) of the sound block, from which the information is acquired, on the remix line to Pn.Bar and sets the beat number (BCs.Beat) of the start point beat count of the sound block from which the information is acquired to Pn.Beat.

At step S135, the reproduction speed control section 261 determines the time stretch value of the sound block from which the information is acquired. In particular, the reproduction speed control section 261 calculates the time stretch value Vt of the sound block, from which the information is received, in accordance with the following expression (4):

$$Vt = BPMm \div BPMo \quad (4)$$

It is to be noted that the time stretch value Vt is a value obtained by dividing the master tempo BPMm which is an object tempo by the original tempo BPMo of the sound block.

At step S136, the pitch control section 262 determines the pitch shift value of the sound block from which the information is acquired. In particular, the pitch control section 262 calculates the pitch shift value Vp of the sound block, from which the information is acquired, in accordance with the following expression (5):

$$Vp = (BPMo \div BPMm) \times \sqrt[12]{2} \times Ds = (1/Vt) \times \sqrt[12]{2} \times Ds \quad (5)$$

where Ds represents the frequency with which the sound block is to be transposed, that is, the difference between the frequencies of the master key and the key of the sound block from which the information is acquired. Further, the constant of $$\sqrt[12]{2}$$

is a frequency ratio of a semitone in the temperament at the present time. In other words, the pitch shift value Vp which is a control amount of the reproduction pitch of the sound block is calculated based on the difference between the key of the sound block and the master key and the time stretch value Vt which is a control amount of the reproduction speed of the sound block.

In the expression (5), by multiplying the original pitch shift amount $$\left(\sqrt[12]{2} \times Ds\right)$$

by a reciprocal number to the time stretch value Vt, a pitch shift value from which a variation in pitch of sound generated by time stretch is subtracted is determined. Accordingly, when the sound block from which the information is acquired is to be reproduced, the tempo of the preproduction sound of the sound block can be adjusted to the master tempo by multiplying the tempo by Vt, and the key of the reproduction sound of the sound block can be adjusted to the master key by multiplying the frequency by Vp.

It is to be noted that the method for the time stretch and the pitch shift is not limited to that described above but some other method may be used.

Thereafter, the processing advances to step S138.

On the other hand, if it is decided at step S132 that no new sound block exists later than 2 bars later by the current reproduction position, then the processing advances to step S137.

At step S137, the reproduction pattern control section 263 sets the value of Pn.Bar to −1 and sets the value of Pn.Beat to −1.

At step S138, the reproduction pattern control section 263 reads in the value of Pc to acquire the current reproduction position (Pc).

At step S139, the reproduction pattern control section 263 decides whether or not a request to stop reproduction is issued. If it is decided that a request to stop reproduction is not issued, then the processing advances to step S140.

At step S140, the reproduction pattern control section 263 decides whether or not the beat advances. If the value of Pc.Beat does not exhibit a change after the reproduction position is acquired last, then the reproduction pattern control section 263 decides that the beat does not advance, and the processing returns to step S138.

Thereafter, the processes at steps S138 to S140 are executed repetitively until it is decided at step S139 that a request to stop reproduction is issued or it is decided at step S140 that the beat advances.

On the other hand, for example, if the user operates the operation section 214 at step S139 to input an instruction to stop remix reproduction to the reproduction pattern control section 263, then the reproduction pattern control section 263 decides that a request to stop reproduction is issued, and the remix reproduction control process is ended.

Further, at step S140, the reproduction pattern control section 263 decides, when the value of Pc.Beat exhibits a change after the reproduction position is acquired last, that the beat advances, and the processing advances to step S141.

At step S141, the reproduction pattern control section 263 decides whether or not the bar advances. If the value of Pc.Bar exhibits a change after the reproduction position is acquired last, then the reproduction pattern control section 263 decides that the bar advances, and the processing advances to step S142.

At step S142, the reproduction pattern control section 263 decides whether or not the value of Tc.Bar and the Pn.Bar−1 are equal to each other. If it is decided that the value of Tc.Bar and the Pn.Bar−1 are equal to each other, that is, if the reproduction position of the remix line advances to a bar immediately preceding to a bar at which the changeover of the sound block is to be performed, the processing advances to step S143.

Referring now to FIG. 39, at step S143, the reproduction speed control section 261 sets a time stretch value. In particular, the reproduction speed control section 261 stores the time stretch value determined at step S135 into a waiting area which is an area for storing information of a sound block to be reproduced next in the sound signal production sections 282. Consequently, the time stretch value of the sound block to be reproduced next is set to the sound signal production sections 282.

At step S144, the pitch control section 262 sets a pitch shift value. In particular, the pitch control section 262 stores the pitch shift value determined at step S136 into the waiting area in the pitch control section 262. Consequently, the pitch shift value of the sound block to be reproduced next is set to the sound signal production sections 282.

At step S145, the reproduction pattern control section 263 sets the range of music data to be reproduced upon reproduction of the next sound block. In particular, the reproduction pattern control section 263 stores, based on the remix pattern data, the values of the sample position (SPBs) indicative of the top of a bar at the start point of the sound block to be reproduced next and the sample position (SPBe) indicative of the top of a bar immediately following the start point into the waiting area in the pitch control section 262. Consequently, the range of samples of music data from the top of the bar including the start point of the sound block to the top of the bar positioned immediately following the end portion of the sound block is set as a value of music data to be reproduced upon reproduction of the next sound block into the sound signal production sections 282.

At step S146, the reproduction pattern control section 263 records the music data of the original music piece of the sound block to be reproduced next. In particular, the reproduction pattern control section 263 determines the music piece ID (IDs) of the original music piece of the sound block to be reproduced next based on the remix pattern data. The reproduction pattern control section 263 acquires music data corresponding to the music ID from the music piece storage section 219 and acquires metadata corresponding to the music data from the music metadata storage section 217. The reproduction pattern control section 263 stores the acquired music data and metadata into the waiting area in the sound signal production sections 282.

At step S147, the reproduction pattern control section 263 sets the value of BCs.Beat to ConNext. In particular, the reproduction pattern control section 263 sets, based on the remix pattern data, the value of the beat number (BCs.Beat) of the start point beat count of the sound block to be reproduced next to ConNext. In other words, the reproduction pattern control section 263 sets the value representative of from which beat in the bar in the original music piece the sound block to be reproduced next is to be started to ConNext.

At step S148, the reproduction pattern control section 263 decides whether or not the value of BCe.Beat is equal to 1. If the reproduction pattern control section 263 decides based on the remix pattern data that the value of the beat number (BCe.Beat) of the end point beat count of the sound block to be reproduced next is equal to 1, that is, if the sound block to be reproduced next ends with the beat at the end of the bar in the original music piece, then the processing advances to step S149.

At step S149, the reproduction pattern control section 263 sets the value of RLBe+1 to CoffNext.Bar and sets the value of BCe.Beat to CoffNext.Beat. CoffNext is a variable of a structure having Bar and Beat as members thereof. Thus, the reproduction pattern control section 263 sets the value of the end bar number (RLBe)+1 on the remix line of the sound block to be reproduced next to CoffNext.Bar based on the remix pattern data, and sets the value of the beat number (BCe.Beat) of the end point beat count of the sound block to be reproduced next to CoffNext.Beat. Consequently, the data representative of what numbered bar the beat immediately following the end point of the sound block to be reproduced next on the remix line is set to CoffNext. Thereafter, the processing advances to step S151.

On the other hand, if it is decided at step S148 that the value of BCe.Beat is not equal to 1, that is, if the sound block to be reproduced next ends intermediately of a bar in the original music piece, then the processing advances to step S150.

At step S150, the reproduction pattern control section 263 sets the value of RLBe to CoffNext.Bar and sets the value of BCe.Beat to CoffNext.Beat. The reproduction pattern control section 263 sets, based on the remix pattern data, the value of the end bar number (RLBe) on the remix line of the sound block to be reproduced next to CoffNext.Bar and sets the value of the bear number (BCe.Beat) of the end point beat count of the sound block to be reproduced next to CoffNext.Beat. Consequently, the data representative of what numbered beat of what numbered bar the beat immediately following the end point of the sound block to be reproduced next on the remix line is set to CoffNext.

At step S151, the reproduction pattern control section 263 sets the value of Fc to true.

Thereafter, the processing returns to step S132 so that the processes at the steps beginning with step S132 are executed.

On the other hand, if it is decided at step S142 that the value of Pc.Bar and the value of Pn.Bar−1 are not equal to each other, that is, if the reproduction position on the remix line does not advance to a bar immediately preceding to the bar at which changeover of the sound block is to be performed, the processing advances to step S152 illustrated in FIG. 40.

Referring to FIG. 40, at step S152, the reproduction pattern control section 263 decides whether or not the value of Fc is true. If it is decided that the value of Fc is true, that is, if changeover of the sound block is to be performed at a bar at the current reproduction position of the remix line, then the processing advances to step S153.

At step S153, the reproduction pattern control section 263 sets the value of ConNex to Con and sets the value of CoffNext.Bar to Coff.Bar and then sets the value of CoffNext.Beat to Coff.Beat.

At step S154, the reproduction pattern control section 263 sets the value of Fc to false. Thereafter, the processing advances to step S155.

On the other hand, if it is decided at step S152 that the value of Fc is not true, that is, if changeover of the sound block is not performed at the bar at the current reproduction position of the remix line, then the processes at steps S153 and S154 are skipped and the processing advances to step S155.

Further, if it is decided at step S141 that the bar does not advance, then the processes at steps S141 and S152 to S154 are skipped and the processing advances to step S155.

At step S155, the reproduction pattern control section 263 decides whether or not the value of Pc.Beat is equal to the value of Con. If the value of Pc.Beat is equal to the value of Con, that is, if the reproduction position on the remix line at present is the start point of the sound block to be reproduced next, then the processing advances to step S156.

At step S156, the reproduction pattern control section 263 cancels the mute. In particular, the reproduction pattern control section 263 issues an instruction to the effect processing section 291 to cancel the mute of sound to be produced by the sound signal production sections 282. The effect processing section 291 returns the volume of sound to be produced by the sound signal production sections 282 to that in the original state. It is to be noted that, if the sound is not originally placed in the mute, then the sound volume is not changed but is maintained.

Than at step S157, the reproduction pattern control section 263 sets the value of Con to −1. Thereafter, the processing advances to step S160.

On the other hand, if it is decided at step S155 that the value of Pc.Beat is not equal to the value of Con, that is, if the current reproduction position on the remix line is not the start point of the sound block to be reproduced next, then the processing advances to step S158.

At step S158, the reproduction pattern control section 263 decides whether or not the value of Pc.Beat is 1 and the value of Con is different from −1. If the value of Pc.Beat is 1 and the value of Con is different from −1, that is, if the current reproduction position on the remix line is the top of the bar at which changeover of the sound block is to be performed whereas changeover of the sound block is to be performed intermediately of a bar, then the processing advances to step S159.

At step S159, the reproduction pattern control section 263 sets the mute. In particular, the reproduction pattern control section 263 issues an instruction to set the mute of sound to be produced by the sound signal production sections 282 to the effect processing section 291. The effect processing section 291 mutes the sound value of sound to be produced by the sound signal production sections 282.

On the other hand, if it is decided at step S158 that the value of Pc.Beat is not 1 or the value of Con is 1, that is, if the current reproduction position of the remix line is not the top of the bar or the start position of the sound block to be reproduced next is not set, then the process at step S159 is skipped and the processing advances to step S160.

At step S160, the reproduction pattern control section 263 decides whether or not the value of Pc.Bar is equal to the value of Coff.Bar and besides the value of Pc.Beat is equal to the value of Coff.Beat. If the value of Pc.Bar is equal to the value of Coff.Bar and besides the value of Pc.Beat is equal to the value of Coff.Beat, that is, if the current reproduction position of the remix line is the beat immediately following the end position of the reproduction block being current reproduced, then the processing advances to step S161.

At step S161, the mute is set similarly to the process at step S159 described hereinabove.

At step S162, the reproduction pattern control section 263 sets the value of Coff.Bar to −1 and sets the value of Coff.Beat to −1.

Thereafter, the processing returns to step S138 so that the processes at the steps beginning step S138 are executed.

On the other hand, if it is decided at step S160 that the value of Pc.Bar is not equal to the value of Coff.Bar or the value of Pc.Beat is not equal to the value of Coff.Beat, that is, if the current reproduction position on the remix line is not the beat immediately following the end point of the sound block being currently reproduced, then the processes at steps S161 and S162 are skipped and the processing returns to step S138. Consequently, the processes at the steps beginning with step S138 are executed.

Now, a track reproduction process executed by the sound signal production sections 282 in a corresponding relationship to the remix reproduction control process described hereinabove with reference to FIGS. 38 to 40 is described with reference to a flow chart of FIG. 41.

It is to be noted that the flow chart of FIG. 41 illustrates a process executed for one track, and actually, the process illustrated in FIG. 41 is executed parallelly for the number of tracks of the remix line. Further, in the description given below with reference to FIG. 41, the sound signal production section 282 represents one sound signal production section corresponding to a track which makes an object of processing in the description of the flow chart.

At step S201, the sound signal production sections 282 decides whether not the bar has advanced. If the sound signal production sections 282 decides based on the information from the remix pattern reading section 251 that the bar has advanced, then the processing advances to step S202.

At step S202, the sound signal production section 282 decides whether or not information of a sound block to be reproduced next is set. If information of a sound block to be reproduced next is stored in the waiting area, then the sound signal production section 282 decides that information of a sound block to be reproduced next is set, and the processing advances to step S203.

At step S203, the sound signal production section 282 moves the information of the waiting area into a current area. In particular, the sound signal production section 282 copies the information of the sound block to be reproduced next, the time stretch value Vt and the pitch shift value Vp all stored in the waiting area into the current area provided for storing information of the sound block being currently reproduced and then the former information of the waiting area is erased.

At step S204, the sound signal production section 282 starts reproduction of the music data of the original music piece of the next sound block. In particular, the sound signal production section 282 starts reproduction of the music data of the original music piece of the next sound block from a sample position (SBPs) indicative of the top of a bar immediately preceding to the start point of the sound block to be reproduced which is set in the current area.

The sound signal production section 282 reproduces the music data at a speed equal to Vt times the reproduction speed in order to adjust the tempo of the sound block to the master tempo based on the time stretch value Vt set at step S143 of FIG. 39 described hereinabove, that is, based on the time stretch value Vt set into the current area at step S203. Further, the sound signal production section 282 outputs reproduction sound of the music data with a frequency equal to Vp times the frequency of the music data in order to adjust the key of the sound block to the master key based on the pitch shift value Vp set at step S144 of FIG. 39 described hereinabove, that is, based on the pitch shift value Vp set into the current area at step S203.

Consequently, the top of the bar which includes the start point of the sound block on the remix line on the time axis and the top of the bar which includes the start point of the sound block of the music data are reproduced in synchronism with each other irrespective of whether or not the sound block begins with the top of the bar. Further, since the tempo of the sound block is adjusted to the master tempo, the position of the beats on the remix line and the position of the beats of the sound block are synchronized with each other. Furthermore, where the rhythm set to the remix line and the rhythm of the sound block coincide with each other, also the position of the bars on the remix line and the position of the bars of the sound blocks are synchronized with each other.

On the other hand, if it is decided at step S202 that information of a sound block to be reproduced next is not set, the processing advances to step S205.

At step S205, the sound signal production section 282 decides whether or not the bar including the end point of the sound block is reproduced up to the last end. In particular, the sound signal production section 282 decides that the bar including the end point of the sound block is reproduced up to the last end if reproduction of music data is performed up to the sample position (SPBe) which indicates the top of a bar immediately following the start point of the sound block being currently reproduced. Then, the processing advances to step S206.

At step S206, the sound signal production section 282 stops the reproduction of the music data and then advances the processing to step S207. Consequently, even if the sound blocks ends intermediately of a bar, reproduction of the music data is performed up to the last end of the bar.

On the other hand, if it is decided at step S205 that the bar including the end point of the sound block is not reproduced up to the last end, then the process at step S206 is skipped and the processing advances to step S207.

On the other hand, if it is decided at step S201 that the bar has not advanced, then the processes at steps S202 to S206 are skipped and the processing advances to step S207.

At step S207, it is decided whether or not a request to stop the reproduction is issued similarly to the process at step S139 of FIG. 38 described hereinabove. If it is decided that a request to stop reproduction is not issued, then the processing returns to step S201 so that the processes at steps S201 to S207 are executed repetitively until after it is decided at step S207 that a request to stop reproduction is issued.

On the other hand, if it is decided at step S207 that a request to stop reproduction is issued, then the track reproduction process is ended.

In this manner, also where a sound block starts from an intermediate portion of a bar and ends at an intermediate portion of the bar or another bar like the sound block B of a track 2 shown in FIG. 42, reproduction of the music data is started from the top Bs of the bar which includes the start point of the sound block in synchronism with the top of the bar on the remix line and then the sound block is reproduced up to the top Be of a bar next to the bar which includes the end point of the sound block. Further, since the tempo of the sound block B is adjusted to the master tempo as described hereinabove, the position of the beats of the remix line, that is, the position of the beats of the master beat, and the position of the beats of the sound block B are synchronized with each other in reproduction.

Further, since the reproduction sound of the sound block B is muted within a period from the bar top Be to the start point Ss of a sound block and within a period from the end point Se of the sound block to the bar top Be by the processes at steps S155 to S162 of FIG. 40 described hereinabove, the interval from the start point SS to the end point Se substantially makes a reproduction period of the sound block B.

If the user performs simple operation while watching the editing screen image, a plurality of sound materials can be combined readily to produce a remix music piece in such a manner as described above. Further, since a sound material suitable for overlapping with or connection to a desired sound material can be found out simply, a remix music piece of a high degree of completeness can be produced rapidly. Furthermore, while deep music knowledge and a tool, software and so forth for exclusive use for directly editing waveform data are required in the past in order to adjust the tempo, key and beat position of different sound materials and besides very much time and labor are required. According to an embodiment of the present invention, since the tempo, key and beat position of different sound materials can be adjusted automatically without the necessity for setting and adjustment, a plurality of sound materials can be combined readily to produce a remix music piece which is high in completeness, natural and free from an unfamiliar feeling.

Accordingly, also a general user who does not have much knowledge of music can readily produce and enjoy a remix music piece conforming to the taste of the user itself. Further, by actively creating music, the user can feel enjoyment which cannot be obtained only by passively listening to music, create a manner of enjoyment of music conforming to the taste of the individual and satisfy its individual manifestation desire or appetite for creation. Furthermore, new means for self-expression by music can be provided in addition to existing means of singing by karaoke or playing a musical instrument for which high skill is required.

Further, where music data are actually edited to produce a remix music piece, the produced remix music piece cannot be distributed to other people without permission of an artist and so forth from the problem of the copyright of the music pieces. Further, a user to which such remix music piece is delivered is permitted only to listen to and enjoy the remix music passively similarly as in the case of existing music pieces.

On the other hand, remix pattern data produced making use of the embodiment of the present invention can be distributed to other people independently of the problem of the copyright of the music pieces. Further, a user to whom such remix pattern data are distributed can reproduce the same remix music piece in an environment of the user itself by acquiring music data of the original music pieces of the sound materials. Further, the user can re-edit the acquired remix pattern data to produce a remix music piece coincident with the taste of the user itself. It is to be noted that, even if the user by itself enjoys the remix music piece, such a situation that new music data are produced or music data of the original music pieces are edited does not occur as described above, but the remix music piece is reproduced on the real-time basis upon reproduction.

Further, in the embodiment of the present invention, it is possible to create a new form of communication through music by laying remix pattern data open on the Internet or the like so as to share the remix pattern data with other people or by making up one work through cooperation of a plurality of users or evaluating works of different ones of a plurality of users among the users. Accordingly, remix pattern data are preferably described using a structure describing language such as the XML (Extensible Markup Language) taking the expansibility, compatibility and so forth into consideration.

Further, in the embodiment described above, it is possible to implement a timer remix reproduction function of reproducing music pieces in a designated group such as music pieces in a designated album or music pieces registered in a predetermined folder such as a playlist such that they may fit within a predetermined period of time by changing the tempo of the music pieces or by extracting only designated portions such as catchy portions of the music pieces and performing remix reproduction of the extracted portions. Although music pieces in a group can be enjoyed only partially within a limited period of time such as commuting time in the past, the function described above allows the user to enjoy music pieces in a group in a completed form within a limited period of time. Also it is possible to gradually slow down the tempo or superpose a sound effect (SE) as the end time approaches so that, for example, an atmosphere that a destination is approaching is created.

It is to be noted that, while, in the foregoing description, a remix line includes a plurality of tracks, according to the embodiment of the present invention, the number of tracks can be reduced to one, for example, by restricting the remix method so that sound materials are merely connected to each other without any overlap therebetween.

Further, in a connection sound material search, also it is possible to search for a sound material suitable for connection to the front of a designated block. In this instance, a melody block immediately preceding to the designated block in an original music piece of the designated block is set as a reference block.

While the series of processes described above can be executed by hardware, it may otherwise be executed by software. Where the series of processes is executed by software, a program which constructs the software is installed from a program recording medium into a computer incorporated in hardware for exclusive use or, for example, a personal computer for universal use which can execute various functions by installing various programs.

FIG. 43 shows an example of a configuration of hardware of a computer which executes the series of processes described above in accordance with a program.

Referring to FIG. 43, a CPU (central processing unit) 501, a ROM (Read Only Memory) 502 and a RAM (Random Access Memory) 503 are connected to one another by a bus 504.

Also an input/output interface 505 is connected to the bus 504. An inputting section 506 including a keyboard, a mouse, a microphone and so forth, an outputting section 507 including a display unit, a speaker and so forth, a storage section 508 formed from a hard disk, and a nonvolatile memory or the like are connected to the input/output interface 505. Also a communication section 509 formed from a network interface or the like and a drive 510 for driving a removable medium 511 such as a magnetic disk, an optical disk, a magneto-optical disk, a semiconductor memory or the like are connected to the input/output interface 505.

In the computer having the configuration described above, typically the CPU 501 loads a program recorded in the storage section 508 into the RAM 503 through the input/output interface 505 and the bus 504 and executes the program to perform the series of processes described above.

The program executed by the computer (CPU 501) is provided through the removable medium 511 in the form of a package medium which may be, for example, a magnetic disk (including a floppy disk), an optical disk (including a CD-ROM (Compact Disc-Read Only Memory) and a DVD (Digital Versatile Disk)), a magneto-optical disk or a semiconductor memory in which the program is recorded. Or, the program is provided through a wired or wireless communication medium such as a local area network, the Internet or a digital satellite broadcast.

Then, the program can be installed into the storage section 508 through the input/output interface 505 by loading the removable medium 511 into the drive 510. Or, the program can be received by the communication section 509 through a wired or wireless communication medium and installed into the storage section 508. Or otherwise, the program may be installed in advance in the ROM 502 or the storage section 508.

It is to be noted that the program to be executed by the computer may be configured such that the processes are executed in a time series in accordance with the sequence described in the present application or such that the processes are executed parallelly or at necessary timing such as when they are called.

It is to be noted that, in the present specification, the term "system" is used to represent an entire apparatus composed of a plurality of apparatus, means and so forth.

While a preferred embodiment of the present invention has been described using specific terms, such description is for illustrative purpose only, and it is to be understood that changes and variations may be made without departing from the spirit or scope of the following claims.

What is claimed is:

1. A music editing apparatus for remix reproducing a plurality of sound materials, each formed from part or the entirety of a music piece, in combination, comprising:
   a reproduction pattern control section configured to control, based on remix pattern data including the combination of the sound materials and information relating to the sound materials, the position and the timing at which music data of the original music pieces of the sound materials are reproduced such that the sound materials are reproduced in the combination indicated by the remix pattern data;
   a reproduction speed control section configured to control, based on the value of original tempos which are tempos in the original music pieces of the sound materials indicated by the remix pattern data, the reproduction speed of the sound materials so that the tempos of the sound materials are adjusted to a predetermined master tempo; and
   a pitch control section configured to control, based on the difference between original keys which are keys in the original music pieces of the sound materials indicated by the remix pattern data and a predetermined master key and the control amount for the reproduction speed, the pitch of sound of the sound materials so that the keys of the sound materials are adjusted to the master key.

2. The music editing apparatus according to claim 1, wherein metadata of each of the music pieces includes beat information indicative of the position of bars of the music piece in the corresponding music data while the remix pattern data includes information indicative of the position of bars and the beat at which the sound materials are disposed on a time axis upon the remix reproduction, and
   said reproduction pattern control section controls the position and the timing at which the music data are to be reproduced based on the beat information and the remix pattern data so that the top of a bar including a start point of each of the sound materials on the time axis and the top of a bar including the start point of the sound material in the music data are synchronized with each other.

3. The music editing apparatus according to claim 2, wherein the beat information includes information representative of the position of the beat of the music pieces in the music data, and
   said reproduction pattern control section mutes, based on the beat information and the remix pattern data, the sound volume of the reproduction sound of the music data from the top of the bar including the start point of the sound material on the time axis to the beat at the start point of the sound material.

4. The music editing apparatus according to claim 1, wherein metadata of each of the music pieces includes chord information indicative of chord progressions of the music pieces and the position of chords in the corresponding music data, said music editing apparatus further comprising
a similarity calculation section configured to calculate a similarity between the chord progressions between two ones of the sound materials based on the chord information.

5. The music editing apparatus according to claim 4, further comprising
a search section configured to search, based on the similarly, for any one of the sound materials suitable for reproduction in an overlapping relationship with a designated one of the sound materials or for any one of the sound materials suitable for reproduction in a connected relationship to a designated one of the sound materials.

6. The music editing apparatus according to claim 4, wherein each of the chords indicated by the chord information is represented based on a relative position of the root of the chord with respect to the keynote of the scale of the sound material.

7. The music editing apparatus according to claim 4, wherein the metadata further includes beat information indicative of the position of the beat of the music pieces in the music data, and said similarity calculation section compares the chords of two ones of the sound materials with each other in a unit of a beat based on a similarity matrix which defines the similarity between different chords to calculate the similarity.

8. The music editing apparatus according to claim 7, wherein the similarity matrix is configured such that, where two chords coincide with each other or have a relationship of substitute chords to each other, the similarity between the chords is set higher than that where two chords do not coincide with each other nor have a relationship of substitute chords to each other.

9. The music editing apparatus according to claim 4, wherein, where both of the two sound materials are of the major or of the minor, said similarity calculation section calculates the similarity based on the relative position of the root of the chords with respect to the keynote of the scale of the sound materials, but where one of the two sound materials is of the major and the other sound material is of the minor, said similarity calculation section calculates the similarity based on the pitch of actual sounds of the chords.

10. A music editing method for remix reproducing a plurality of sound materials, each formed from part or the entirety of a music piece, in combination, comprising the steps of:

controlling, based on remix pattern data including the combination of the sound materials and information relating to the sound materials, the position and the timing at which music data of the original music pieces of the sound materials are reproduced such that the sound materials are reproduced in the combination indicated by the remix pattern data;

controlling, based on the value of original tempos which are tempos in the original music pieces of the sound materials indicated by the remix pattern data, the reproduction speed of the sound materials so that the tempos of the sound materials are adjusted to a predetermined master tempo; and controlling, based on the difference between original keys which are keys in the original music pieces of the sound materials indicated by the remix pattern data and a predetermined master key and the control amount for the reproduction speed, the pitch of sound of the sound materials so that the keys of the sound materials are adjusted to the master key.

11. A program for causing a computer to execute a music editing process for remix reproducing a plurality of sound materials, each formed from part or the entirety of a music piece, in combination, the program comprising the steps of:

controlling, based on remix pattern data including the combination of the sound materials and information relating to the sound materials, the position and the timing at which music data of the original music pieces of the sound materials are reproduced such that the sound materials are reproduced in the combination indicated by the remix pattern data;

controlling, based on the value of original tempos which are tempos in the original music pieces of the sound materials indicated by the remix pattern data, the reproduction speed of the sound materials so that the tempos of the sound materials are adjusted to a predetermined master tempo; and controlling, based on the difference between original keys which are keys in the original music pieces of the sound materials indicated by the remix pattern data and a predetermined master key and the control amount for the reproduction speed, the pitch of sound of the sound materials so that the keys of the sound materials are adjusted to the master key.

* * * * *